(12) United States Patent
Cheng

(10) Patent No.: US 12,462,004 B2
(45) Date of Patent: Nov. 4, 2025

(54) USER REGISTRATION METHOD, USER LOGIN METHOD AND CORRESPONDING DEVICE

(71) Applicant: SHENZHEN RED BRICK TECHNOLOGY CO., LTD., Shenzhen (CN)

(72) Inventor: Qiang Cheng, Shenzhen (CN)

(73) Assignee: SHENZHEN RED BRICK TECHNOLOGY CO., LTD., Guangdong (CN)

( * ) Notice: Subject to any disclaimer, the term of this patent is extended or adjusted under 35 U.S.C. 154(b) by 693 days.

(21) Appl. No.: 17/719,552

(22) Filed: Apr. 13, 2022

(65) Prior Publication Data

US 2022/0318356 A1 Oct. 6, 2022

Related U.S. Application Data

(63) Continuation-in-part of application No. PCT/CN2020/117104, filed on Sep. 23, 2020.

(30) Foreign Application Priority Data

Oct. 14, 2019 (CN) .......................... 201910977261.1

(51) Int. Cl.
*G06F 21/32* (2013.01)
*G06F 21/62* (2013.01)

(52) U.S. Cl.
CPC .......... *G06F 21/32* (2013.01); *G06F 21/6227* (2013.01)

(58) Field of Classification Search
CPC ............................ G06F 21/32; G06F 21/6227
See application file for complete search history.

(56) References Cited

U.S. PATENT DOCUMENTS

| 8,719,952 B1 | 5/2014 | Damm-Goossens |
| 2018/0227131 A1 | 8/2018 | Ebrahimi et al. |

(Continued)

FOREIGN PATENT DOCUMENTS

| CN | 102355351 A | 2/2012 |
| CN | 107196965 A | 9/2017 |

(Continued)

OTHER PUBLICATIONS

International Search Report and Written Opinion for WO 2021/073383 (PCT/CN2020/117104), dated Jan. 4, 2021, pp. 1-8 (Translation Included).

(Continued)

*Primary Examiner* — Ayoub Alata
(74) *Attorney, Agent, or Firm* — Thomas|Horstemeyer, LLP

(57) ABSTRACT

The present disclosure relates to the technical field of Internet, and provides a user registration method, a user login method and a device corresponding thereto. In these methods, a passport or the user card records identity information of the autonomous identity of a user, and the user can use the passport or the user card to access an application website, which is unlike the conventional method of performing the accessing through the account and the password. Moreover, the present disclosure further implements a series of mechanisms from the application to the use, concerning the passport and the user card.

14 Claims, 5 Drawing Sheets

(56) References Cited

U.S. PATENT DOCUMENTS

2019/0312877 A1   10/2019  Zhang et al.
2020/0067907 A1*  2/2020  Avetisov ............... H04L 67/133

FOREIGN PATENT DOCUMENTS

| CN | 107357903 A | 11/2017 |
| CN | 109005186 A | 12/2018 |
| CN | 109120597 A | 1/2019 |
| CN | 109409893 A | 3/2019 |
| DE | 202015009562 U1 | 4/2018 |

OTHER PUBLICATIONS

Chinese Office Action for Patent Application No. 201910977261.1, dated Aug. 22, 2023, pp. 1-47 (Translation Included).

* cited by examiner

USER REGISTRATION METHOD, USER LOGIN METHOD AND CORRESPONDING DEVICE

CROSS-REFERENCE TO RELATED APPLICATIONS

This application is the Continuation-in-Part of International Application No. PCT/CN2020/117104, filed Sep. 23, 2020, which claims priority to CN 201910977261.1, filed Oct. 14, 2019, which are entirely incorporated herein by reference.

TECHNICAL FIELD

The present disclosure relates to the technical field of Internet, and in particular, to a user registration method, a user login method, and a device corresponding thereto.

BACKGROUND ART

As for the Internet in the existing art, user identities are mostly allocated by a centralized organization, without the autonomy. The data correlated with these identities is owned by the centralized organizations, and an ordinary user neither has the right for obtaining the identity information (such as, name, avatar, contact number, address, etc.) submitted when registering the identity, nor has the autonomous control right over the related data derived from identity (for example, the behavioral data generated by the user accessing the Internet, and the digital assets, such as self-created articles, speeches, and music of the user). The centralized organization, after obtaining the identity information of the user and the right for using the correlated data, may use it for the commercial purposes, resulting in serious violation to the user privacy.

In February 2012, the concept of the autonomous identity was introduced for the first time. The programmer, Moxie Marlinspike, demonstrates a method for solving the autonomous identity, in which the cryptography-based strategy is used to protect the autonomy right and the control right of a user. Thus, the concept of identity autonomy right has gradually entered the public eye. With popularization of the blockchain technology, concept of the autonomous identity and the related support systems have been developed rapidly in recent years.

However, generally speaking, the autonomous identity technology is still in the early stage of development, with the technical standards not mature. Many problems in the related fields have not yet been studied. Here, as for using the autonomy identity to enable the user to access an application website, no meritorious solution has been proposed.

SUMMARY

The purposes of the present disclosure are to provide a user registration method, a user login method and a device corresponding thereto, so as to solve the above technical problems.

To achieve the above purposes, the disclosure provides the following technical solutions.

In a first aspect, the present disclosure provides a user registration method, applicable to a terminal device, the method comprising a step of: sending a user registration request to an application website, wherein the user registration request comprises a passport issued by a management website, and the passport comprises a public key of an avatar account that a user wants to register, a public key of a first account of the management website, and a signature which is made for the passport by the management website using its own private key of the first account, the passport is used to prove that the avatar account is generated by being derived from one disclosable real-name account which has been registered with a real name on the management website.

In a second aspect, the present disclosure provides a user registration method, applicable to an application website, the method comprising steps of: receiving a user registration request sent from a terminal device, wherein the user registration request comprises a passport issued by a management website, and the passport comprises a public key of an avatar account which a user wants to register, a public key of a first account of the management website, and a signature which is made for the passport by the management website using its own private key of the first account, the passport is used to prove that the avatar account is generated by being derived from one disclosable real-name account which has been registered with a real name on the management website; using the user registration request to perform registration verification, wherein verification items comprise at least one of following: verifying whether a public key of the avatar account has not been bound with a resource identifier; and using a public key of the first account of the management website to verify whether the signature for the passport is correct, wherein if results of all verification items are "yes", one resource identifier is allocated to the user, and the public key of the avatar account is bound with the resource identifier; and saving the passport or preset information items in the passport, and sending to the terminal device a response of successful registration.

In a third aspect, the present disclosure provides a user login method, applicable to a terminal device, the method comprising a step of: sending a first user login request to an application website, wherein the first user login request comprises a passport issued by a management website, the passport comprises a public key of an avatar account that the user wants to log in, a public key of a first account of the management website and a signature which is made for the passport by the management website using its own private key of the first account, and the passport is used to prove that the avatar account is generated by being derived from one disclosable real-name account which has been registered with a real name on the management website.

In a fourth aspect, the present disclosure provides a user login method, applicable to an application website, the method comprising steps of: receiving a first user login request sent from a terminal device, wherein the first user login request comprises a passport issued by the management website, and the passport comprises a public key of an avatar account that a user wants to log in, a public key of a first account of the management website, and a signature which is made for the passport by the management website using its own private key of the first account, and the passport is used to prove that the avatar account is generated by being derived from a disclosable real-name account which has been registered with a real name on the management website; using the first user login request to perform login verification, wherein verification items comprise at least one of following: verifying whether the public key of the avatar account has been bound with a resource identifier; and verifying whether the signature for the passport is correct using a public key of the first account of the management website, wherein if results of all verification items are "yes", a response of successful login is sent to the terminal device.

In a fifth aspect, the present disclosure provides a passport application method, applicable to a terminal device, the method comprising steps of: deriving an avatar account by using a disclosable real-name account which has been registered with a real name by a user on a management website; sending a passport application request to the management website, wherein the passport application request comprises a public key of the disclosable real-name account, a chain code of the disclosable real-name account, and a derivation path of deriving the avatar account from the disclosable real-name account, and a signature which is made for the passport application request by using a private key of the disclosable real-name account; receiving a passport sent by the management website, wherein the passport comprises a public key of the avatar account, a public key of a first account of the management website, and a signature which is made for the passport by the management website using its own private key of the first account, and the passport is used to prove that the avatar account is generated by being derived from one disclosable real-name account which has been registered with a real name on the management website.

In a sixth aspect, the present disclosure provides a passport application method, applicable to a management website, the method comprising steps of: receiving a passport application request sent by a terminal device, wherein the passport application request comprises a public key of a disclosable real-name account of a user, a chain code of the disclosable real-name account, a derivation path of deriving an avatar account from the disclosable real-name account and a signature which is made for the passport application request by using a private key of the disclosable real-name account; using the passport application request to perform application verification, wherein verification items comprise at least one of following: verifying whether a public key of the disclosable real-name account has been registered with a real name; and verifying whether the signature for the passport application request is correct by using a public key of the disclosable real-name account, wherein if results of all verification items are "yes", a public key of the avatar account is derived by using a public key of the disclosable real-name account, a chain code of the disclosable real-name account, and a derivation path of deriving an avatar account from the disclosable real-name account; generating a passport, wherein the passport comprises a public key of the avatar account, a public key of a first account of the management website, and a signature which is made for the passport by the management website using its own private key of the first account, and the passport is used to prove that the avatar account is generated by being derived from one disclosable real-name account which is registered with a real name on the management website; and sending the passport to the terminal device.

Through the first to sixth aspects above, a complete set of mechanisms for applying and using a passport have been established. The passport is a verifiable certificate issued by the management website. The autonomous identity information of a user is recorded on the passport. The user can use the passport to access the application website (comprising registration and login), which is different from the conventional method of performing the access through the account and password. The operation is more convenient, with no account and password needed to be memorized. The user can derive plural avatar accounts through a disclosable real-name account, and apply for one passport for each avatar account, thus realizing that the relationship between the real-name and the avatar of the user is indicated in the digital world. In addition, when accessing different application websites, users can use passports with different avatar accounts recorded. Even if the private key of the account is exposed during the access to a certain application website, it will not spread to other application websites, that is, it is realized that the user identity information is securely isolated.

In addition, the user needs to apply for a passport from the management website at first, and then use the passport to access the application website. In the previous stage, the management website cannot know how the user will use the passport specifically, because the passport does not contain information related to the application website. While in the latter stage, the application website cannot know the real owner of the passport, because the passport does not contain information of the disclosable real-name account. There is no obvious correlation between the two stages former and later, so that others cannot track the online behavior of a specific user, that is, the privacy isolation of user identity information is realized.

In a seventh aspect, the present disclosure provides a user login method, applicable to a terminal device, the method comprising a step of: sending a second user login request to the application website, wherein the second user login request comprises a user card generated in trusted execution environment (TEE), and the user card comprises a public key of a target account which a target user wants to log in and a signature which is made for the user card by the TEE using its own private key of the second account, the user card is used to prove that the application website has authorized the target user to use services provided by the application website by logging in with the target account.

In an eight aspect, the present disclosure provides a user login method, applicable to an application website, the method comprising steps of: receiving a second user login request sent from a terminal device, wherein the second user login request comprises a user card generated in TEE, and the user card comprises a public key of a target account which a target user wants to log in and a signature which is made for the user card by the TEE using its own private key of the second account, and the user card is used to prove that the application website has authorized the target user to use services provided by the application website by logging in with the target account; and using the second user login request to perform login verification, wherein verification items comprise at least one of following: verifying whether a public key of the target account has been bound with a resource identifier; and using a public key of the second account of the TEE to verify whether the signature for the user card is correct, wherein if results of all verification items are "yes", a response of successful login is sent to the terminal device.

In a ninth aspect, the present disclosure provides an authorization card application method, applicable to a terminal device, the method comprising steps of: sending an authorization card application request to an application website which a user has logged in, wherein the authorization card application request comprises an identifier of a target account, and the identifier of the target account is a public key of the target account, a derivation path of deriving the target account from an undisclosed real-name account of the user or an empty character string, wherein if the identifier of the target account is a derivation path of deriving the target account from the undisclosed real-name account or an empty character string, it means that the target user having the target account is the user itself, and if the identifier of the target account is a public key of the target account, it means that the target user is someone else; and receiving an authorization card sent by the application website, wherein the authorization card comprises a public key of an owner account of the authorization card, a public key of the account of the application website, and a signature which is made for the authorization card by the application website using its own private key of the account, and the authorization card is used as a certificate of a user card which is applied by the user from TEE provided on the TEE device so as to be used by the target user.

In a tenth aspect, the present disclosure provides an authorization card application method, applicable to an application website, the method comprising steps of: receiving an authorization card application request which is sent through a terminal device by a user who has logged in the application website, wherein the authorization card application request comprises an identifier of the target account, the identifier of the target account is a public key of the target account, a derivation path of deriving the target account from an undisclosed real-name account of the user or an empty character string, wherein if the identifier of the target account is a derivation path of deriving the target account from the undisclosed real-name account or an empty character string, it means that the target user having the target account is the user itself, and if the identifier of the target account is a public key of the target account, it means that the target user is someone else; determining, according to the identifier of the target account, that the target user is the user itself or someone else; generating an authorization card, wherein the authorization card comprises a public key of an owner account of the authorization card, a public key of the account of the application website, and a signature which is made for the authorization card by the application website using its own private key of the account, used as a certificate of the user card which is applied by the user from TEE provided on a TEE device, so as to be used by the target user, wherein if the target user is the user itself, the owner account is an account which the user currently logs in using a passport or a user card, and if the target user is someone else, a public key of the owner account of the authorization card is a public key of the target account; and sending the authorization card to the terminal device.

In an eleventh aspect, the present disclosure provides a one-way ciphertext key generation method, applicable in TEE, the method comprising steps of: the TEE receiving, through a TEE device provided with the TEE, a key generation request sent by an application website, wherein the key generation request comprises: a first command word and a plaintext key; the TEE determining to provide a service of generating a one-way ciphertext key according to the first command word, wherein content of the service comprises: the TEE encrypting the plaintext key using a specific key to obtain a one-way ciphertext key, wherein the specific key is only used in the TEE; and the TEE sending the one-way ciphertext key to the application website through the TEE device.

In a twelfth aspect, the present disclosure provides a user card application method, applicable to a terminal device, the method comprising steps of: deriving, if a target user targeted by the user card is the user itself who has obtained an authorization card, a target account of the target user from an undisclosed real-name account of the user, and determining a derivation path of deriving the target account from the undisclosed real-name account as an identifier of the target account, and determining, if the target user is someone else, a public key of the target account as an identifier of the target account; sending a first user card application request to a TEE device provided with TEE, wherein the first user card application request comprises a third command word, the authorization card and an identifier of the target account, wherein the third command word represents that the TEE is requested to provide a service of generating a user card based on an authorization card, wherein if the target user is the user itself, the first user card application request further comprises a public key of the undisclosed real-name account, a chain code of the undisclosed real-name account and a derivation path of an owner account of the authorization card; and receiving a user card sent by the TEE device, wherein the user card comprises a public key of the target account and a signature which is made for the user card by the TEE using its own private key of the second account, and the user card is used to prove that an application website issuing the authorization card has authorized the target user to use services provided by the application website by logging in with the target account.

In a thirteenth aspect, the present disclosure provides a user card application method, applicable in TEE, the method comprises steps of: the TEE receiving, through a TEE device provided with TEE, a first user card application request which is sent through a terminal device by a user who has obtained an authorization card, wherein the first user card application request comprises a third command word, the authorization card, and an identifier of the target account, wherein if the target user who owns the target account is the user itself, the first user card application request further comprises a public key of the undisclosed real-name account of the user, a chain code of the undisclosed real-name account and a derivation path of an owner account of the authorization card; the TEE determining, according to the third command word, to provide a service of generating a user card based on an authorization card, wherein content of the service comprises: the TEE using the first user card application request to perform an application verification, and verification items comprise at least one of following: the TEE using a public key of the account of an application website in the authorization card to verify whether a signature for the authorization card is correct; and the TEE judging that the target user is the user itself or someone else according to an identifier of the target account, wherein if the target user is the user itself, the TEE uses a public key of the undisclosed real-name account, a chain code of the undisclosed real-name account, an identifier of the target account, the authorization card and a derivation path of an owner account of the authorization card to verify whether the owner account belongs to the target user, wherein if results of all verification items are "yes", the TEE generates a user card, and the user card comprises a public key of the target account and a signature which is made for the user card by the TEE using its own private key of the second account, and the user card is used to prove that the application website has authorized the target user to use services provided by the application website through logging in with the target account, wherein if the target user is the user itself, a public key of the target account is obtained when verifying whether the owner account belongs to the target user, and if the target user is someone else, a public key of the target account is a public key of the owner account of the authorization card; and the TEE sending the user card to the terminal device through the TEE device.

In a fourteenth aspect, the present disclosure provides a user card application method, applicable to a terminal device, the method comprising steps of: sending a second user card application request to a TEE device provided with TEE, wherein the second user card application request comprises a fourth command word, an authorization card which a user applies for, an identifier of the target account, a public key of the disclosable real-name account of the user, the passport which the user applies for, and a derivation path of an owner account of the authorization card, wherein the fourth command word indicates that the TEE is requested to provide a service of generating a user card based on a passport and an authorization card, and the identifier of the target account is a derivation path of deriving an avatar account in the passport from the disclosable real-name account; and receiving a user card sent by the TEE device, wherein the user card comprises a public key of the target account and a signature which is made for the user card by the TEE using its own private key of the second account, and the user card is used to prove that the application website issuing the authorization card has authorized the target user who has the target account to use services provided by the application website by logging in with the target account.

In a fifteenth aspect, the present disclosure provides a user card application method, applicable in TEE, the method comprises steps of: the TEE receiving through a TEE device provided with TEE a second user card application request sent by the user through a terminal device, wherein the second user card application request comprises a fourth command word, an authorization card which a user applies for, an identifier of a target account, a public key of a disclosable real-name account of the user, a passport which the user applies for, and a derivation path of an owner account of the authorization card; the TEE determining, according to the fourth command word, to provide the service of generating a user card based on a passport and an authorization card, wherein content of the service comprises: the TEE using the second user card application request to perform an application verification, and verification items comprise at least one of following: the TEE using a public key of the account of an application website in the authorization card to verify whether a signature for the authorization card is correct; the TEE using a public key of a first account of a management website in the passport to verify whether a signature for the passport is correct; the TEE using a public key of the disclosable real-name account, the passport, an identifier of the target account, the authorization card and a derivation path of an owner account of the authorization card to verify whether an avatar account in the passport and the owner account belongs to a target user who owns the target account, wherein if results of all verification items are "yes", the TEE generates a user card, and the user card comprises a public key of the target account and a signature which is made for the user card by the TEE using its own private key of the second account, and the user card is used to prove that the application website has authorized the target user to use services provided by the application website by logging in with the target account, wherein a public key of the target account is a public key of the avatar account in the passport; and the TEE sending the user card to the terminal device through the TEE device.

Through the seventh aspect to the fifteenth aspect above, a complete set of mechanisms for applying and using a user card are established. The user card is a verifiable certificate issued by the application website. The identity information of the autonomous identity of a user is recorded on the user card. The user can use the user card to access the application website, which is different from the conventional method of performing the access through the account and password. It is more convenient in operation, with no account and password needed to be memorized. The user can derive plural avatar accounts through an undisclosed real-name account, and apply for one user card for each avatar account, thus realizing that the relationship between the real-name and the avatar of the user is indicated in the digital world. In addition, when accessing different application websites, users can use user cards with different avatar accounts recorded. Even if the private key of the account is exposed during the access to a certain application website, it will not spread to other application websites, that is, it is realized that the user identity information is securely isolated.

In the solution of the present disclosure, with the help of the mechanism of the authorization card and the user card, the user can either apply for the authority of accessing the application website for itself, or give to the target user all or part of the authority of accessing the application website, so that the target user can execute the operations within the specified range, that is, the authorization and sub-authorization (delegation of authority) of accessing a website are realized at the same time.

In addition, the user needs to first apply for an authorization card from the application website, then requests the TEE to generate a user card, and finally uses the user card to log in to the application website. In the first stage, the avatar account, which is used to log in to the application website when applying for the authorization card, is usually not the target account in the user card, and the application website cannot know when the user uses the authorization card, and also does not necessarily know what target account is bundled with the authorization card (unless it is a case of sub-authorization). In the second stage, the TEE provides the security service to generate the user card, which is beneficial to prevent the leakage of user privacy. Moreover, in some embodiments, the TEE provides the security service, which can further increase the security with the help of the distributed computing feature of the blockchain. In the third stage, the application website cannot know the real owner of the user card, because the user card does not comprise information of the disclosable or undisclosed real-name account. There is no obvious correlation between the three stages, so that others cannot track the online behavior of a specific user, that is, the privacy isolation of user identity information is realized.

In a sixteenth aspect, the present disclosure provides a passport application device, which is provided in a terminal device. The passport application device comprises: a first passport account derivation module, configured to derive an avatar account by using a disclosable real-name account that has been registered with a real name on the management website by a user; a passport application module, configured to send a passport application request to the management website, wherein the passport application request comprises a public key of the disclosable real-name account, a chain code of the disclosable real-name account, a derivation path of deriving an avatar account from a disclosable real-name account and a signature which is made for the passport application request by using a private key of the disclosable real-name account; and a passport receiving module, configured to receive a passport sent by the management website, wherein the passport comprises a public key of the avatar account, a public key of a first account of the management website, and a signature which is made for the passport by the management website using its own private key of the first account, the passport is used to prove that the avatar account is derived from one disclosable real-name account which has been registered with a real name on the management website.

In a seventeenth aspect, the present disclosure provides a passport application device, provided on a management website, the device comprising: a passport application request receiving module, configured to receive a passport application request sent by a terminal device, wherein the passport application request comprises a public key of the disclosable real-name account of a user, a chain code of the disclosable real-name account, a derivation path of deriving an avatar account from the disclosable real-name account, and a signature which is made for the passport application request by using a private key of the disclosable real-name account; a passport application verification module, configured to perform an application verification by using the passport application request, wherein verification items comprise at least one of following: verifying whether a public key of the disclosable real-name account has been registered with a real name; and using a public key of the disclosable real-name account to verify whether a signature for the passport application request is correct; a second passport account derivation module, configured to use a public key of the disclosable real-name account, a chain code of the disclosable real-name account and a derivation path of deriving the avatar account from the disclosable real-name account, to derive a public key of the avatar account, if results of verification items are all "yes"; a passport generation module, configured to generate a passport, wherein the passport comprises a public key of the avatar account, a public key of a first account of the management website, and a signature which is made for the passport by the management website using its own private key of the first account, and the passport is used to prove that the avatar account is derived from one disclosable real-name account which has been registered with a real name on the management website; and a passport sending module, configured to send the passport to the terminal device.

In an eighteenth aspect, the present disclosure provides a user registration device, provided in a terminal device, the user registration device comprising: a user registration module, configured to send a user registration request to an application website, wherein the user registration request comprises a passport issued by a management website, the passport comprises a public key of an avatar account which a user wants to register, a public key of a first account of the management website, and a signature which is made for the passport by the management website using its own private key of the first account, and the passport is used to prove that the avatar account is derived from one disclosable real-name account which has been registered with a real name on the management website.

In a nineteenth aspect, the present disclosure provides a user registration device, provided on an application website, the device comprising: a user registration request receiving module, configured for receiving a user registration request sent by a terminal device, wherein the user registration request comprises a passport issued by an management website, the passport comprises a public key of an avatar account which a user wants to register, a public key of a first account of the management website, and a signature which is made for the passport by the management website using its own private key of the first account, and the passport is used to prove that the avatar account is derived from one disclosable real-name account which has been registered with a real name on the management website; a user registration verification module, configured to perform a registration verification by using the user registration request, wherein verification items comprise at least one of following: verifying whether a public key of the avatar account has not been bound with a resource identifier; and using a public key of the first account of the management website to verify whether a signature for the passport is correct; a resource identifier binding module, configured to allocate one resource identifier to the user if results of all verification items are "yes", and bind a public key of the avatar account with the resource identifier; and a user registration response module, configured to save the passport or preset information items in the passport, and send a response of successful registration to the terminal device.

In a twentieth aspect, the present disclosure provides a user login device, provided on a terminal device, the user login device comprising: a first login module, configured to send a first user login request to an application website, wherein the first user login request comprises a passport issued by a management website, and the passport comprises a public key of an avatar account that the user wants to log in, and a public key of a first account of the management website and a signature which is made for the passport by the management website using its own private key of the first account, and the passport is used to prove that the avatar account is derived from one disclosable real-name account which has been registered with the real name on the management website.

In a twenty-first aspect, the present disclosure provides a user login device, provided on an application website, the device comprising: a first user login request receiving module, configured for receiving a first user login request sent by a terminal device, wherein the first user login request comprises a passport issued by an management website, the passport comprises a public key of an avatar account that a user wants to log in, a public key of a first account of the management website and a signature which is made for the passport by the management website using its own private key of the first account, and the passport is used to prove that the avatar account is derived from one disclosable real-name account which has been registered with a real name on the management website; a first user login request verification module, configured to perform a login verification by using the first user login request, wherein verification items comprise at least one of following: verifying whether a public key of the avatar account has been bound with a resource identifier; and using a public key of the first account of the management website to verify whether a signature for the passport is correct; and a first login response module, configured to send a response of successful login to the terminal device if results of all verification items are "yes".

In a twenty-second aspect, the present disclosure provides an authorization card application device, provided in a terminal device, the authorization card application device comprising: an authorization card application module, configured to send an authorization card application request to an application website which the user has logged in, wherein the authorization card application request comprises an identifier of a target account, and the identifier of the target account is a public key of the target account, a derivation path of deriving the target account from the undisclosed real-name account of the user or an empty character string, wherein if the identifier of the target account is a derivation path of deriving the target account from the undisclosed real-name account or an empty character string, it is indicated that a target user who owns the target account is the user itself, and if the identifier of the target account is a public key of the target account, it is indicated that the target user is someone else; and an authorization card receiving module, configured to receive an authorization card sent by the application website, wherein the authorization card comprises a public key of an owner account of the authorization card, a public key of an account of the application website, and a signature which is made for the authorization card by the application website using its own private key of the account, the authorization card is used as a certificate of a user card for the user to apply to TEE provided on a TEE device, to be used by the target user.

In a twenty-third aspect, the present disclosure provides an authorization card application device, provided on an application website, the device comprising: an authorization card application request receiving module, configured to receive an authorization card application request sent through a terminal device by a user who has logged in the application website, wherein the authorization card application request comprises an identifier of the target account, and the identifier of the target account is a public key of the target account, a derivation path of deriving the target account from an undisclosed real-name account of the user or an empty character string, wherein if the identifier of the target account is a derivation path of deriving the target account from an undisclosed real-name account or an empty character string, it is indicated that a target user who owns the target account is the user itself, and if the identifier of the target account is a public key of the target account, it is indicated that the target user is someone else; an identity judging module, configured for judging that the target user is the user itself or someone else according to the identifier of the target account; an authorization card generation module, configured to generate an authorization card, wherein the authorization card comprises a public key of an owner account of the authorization card, a public key of an account of the application website, and a signature which is made for the authorization card by the application website using its own private key of the account, and the authorization card is used as a certificate of the user card for the user to apply to TEE provided on a TEE device, to be used by the target user, wherein if the target user is the user itself, the owner account is an account which is currently logged in by the user through a passport or a user card, and if the target user is someone else, a public key of the owner account of the authorization card is a public key of the target account; and an authorization card sending module, configured to send the authorization card to the terminal device.

In a twenty-fourth aspect, the present disclosure provides a one-way ciphertext key generating device, provided in TEE, the device comprising: a key generation request receiving module, configured in such a way that the TEE receives a key generation request sent by an application website through a TEE device provided with the TEE, wherein the key generation request comprises: a first command word and a plaintext key; a one-way ciphertext key generation module, configured in such a way that the TEE determines according to the first command word to provide a service of generating a one-way ciphertext key, wherein content of the service comprises: the TEE using a specific key to encrypt the plaintext key to obtain a one-way ciphertext key, wherein the specific key is only used in the TEE; and a one-way ciphertext key sending module, configured in such a way that the TEE sends the one-way ciphertext key to the application website through the TEE device.

In a twenty-fifth aspect, the present disclosure provides a user card application device, provided in a terminal device, the user card application device comprising: an identifier acquisition module, configured for deriving a target account of a target user from an undisclosed real-name account of the user if the target user targeted by a user card is the user itself who obtains an authorization card, wherein a derivation path of deriving the target account from the undisclosed real-name account is determined as an identifier of the target account, and if the target user is someone else, a public key of the target account is determined as the identifier of the target account; a first user card application module, configured to send a first user card application request to a TEE device provided with a TEE, wherein the first user card application request comprises a third command word, the authorization card and the identifier of the target account, wherein the third command word indicates that the TEE is requested to provide a service of generating a user card based on an authorization card, wherein if the target user is the user itself, the first user card application request further comprises a public key of the undisclosed real-name account, a chain code of the undisclosed real-name account, and a derivation path of an owner account of the authorization card; and a first user card receiving module, configured to receive a user card sent by the TEE device, wherein the user card comprises a public key of the target account and a signature which is made for the user card by the TEE using its own private key of the second account, and the user card is used to prove that an application website that issues the authorization card has authorized the target user to use services provided by the application website by logging in with the target account.

In a twenty-sixth aspect, the present disclosure provides a user card application device, provided in a TEE, the device comprising: a first user card application request receiving module, configured in such a way that the TEE receives, through a TEE device provided with the TEE, a first user card application request which is sent through a terminal device by a user who has obtained an authorization card, wherein the first user card application request comprises a third command word, the authorization card, and an identifier of the target account, wherein if a target user who owns the target account is the user itself, the first user card application request further comprises a public key of an undisclosed real-name account of the user, a chain code of the undisclosed real-name account, and a derivation path of an owner account of the authorization card; a first user card generation module, configured in such a way that the TEE determines, according to the third command word, to provide a service of generating a user card based on an authorization card, wherein content of the service comprises: the TEE using the first user card application request to perform an application verification, verification items comprise at least one of following: the TEE using the public key of the account of the application website in the authorization card to verify whether a signature for the authorization card is correct; the TEE determining according to the identifier of the target account that the target user is the user itself or someone else, wherein if the target user is the user itself, the TEE uses the public key of the undisclosed real-name account, the chain code of the undisclosed real-name account, the identifier of the target account, the authorization card and the derivation path of the owner account of the authorization card to verify whether the owner account belongs to the target user, wherein if results of all verification items are "yes", then the TEE generates a user card, wherein the user card comprises the public key of the target account and a signature which is made for the user card by the TEE using its own private key of the second account, and the user card is used to prove that the application website has authorized the target user to use services provided by the application website by logging in with the target account, wherein if the target user is the user itself, the public key of the target account is obtained when verifying whether the owner account belongs to the target user, and if the target user is someone else, the public key of the target account is the public key of the owner account of the authorization card; and a first user card sending module, configured in such a way that the TEE send the user card to the terminal device through the TEE device.

In a twenty-seventh aspect, the present disclosure provides a user card application device, provided in a terminal device, the user card application device comprising: a second user card application module, configured to send a second user card application request to a TEE device provided with TEE, wherein the second user card application request comprises a fourth command word, an authorization card that the user applies for, an identifier of the target account, a public key of a disclosable real-name account of the user, a passport which the user applies for, and a derivation path of an owner account of the authorization card, wherein the fourth command word indicates that the TEE is requested to provide a service of generating a user card based on the passport and the authorization card, and the identifier of the target account is a derivation path of deriving an avatar account in the passport from the disclosable real-name account; a second user card receiving module, configured to receive a user card sent by the TEE device, wherein the user card comprises a public key of the target account and a signature which is made for the user card by the TEE using its own private key of the second account, and the user card is used to prove that an application website that issues the authorization card has authorized a target user who has the target account to use services provided by the application website by logging in with the target account.

In a twenty-eighth aspect, the present disclosure provides a user card application device, provided in TEE, the device comprising: a second user card application request receiving module, configured in such a way that the TEE receives, through a TEE device provided with the TEE, a second user card application request sent by a user through a terminal device, wherein the second user card application request comprises a fourth command word, an authorization card that a user applies for, an identifier of the target account, a public key of a disclosable real-name account of the user, a passport that the user applies for, and a derivation path of an owner account of the authorization card; a second user card generation module, configured in such a way that the TEE determines, according to the fourth command word, to provide a service of generating a user card based on a passport and an authorization card, wherein content of the service comprises: the TEE using the second user card application request to perform an application verification, and verification items comprise at least one of following: the TEE using the public key of the account of the application website in the authorization card to verify whether a signature for the authorization card is correct; the TEE using a public key of the first account of the management website in the passport to verify whether a signature for the passport is correct; the TEE using a public key of the disclosable real-name account, the passport, the identifier of the target account, the authorization card, and a derivation path of an owner account of the authorization card to verify whether an avatar account in the passport and the owner account both belong to a target user who owns the target account, wherein if results of all verification items are "yes", the TEE generates a user card, and the user card comprises a public key of the target account and a signature which is made for the user card by the TEE using its own private key of the second account, and the user card is used to prove that the application website has authorized the target user to use services provided by the application website by logging in with the target account, wherein the public key of the target account is a public key of the avatar account in the passport; and a second user card sending module, configured in such a way that the TEE sends the user card to the terminal device through the TEE device.

In a twenty-ninth aspect, the present disclosure provides a user login device, provided on a terminal device, the user login device comprising: a second login module, configured to send a second user login request to an application website, wherein the second user login request comprises a user card generated in TEE, and the user card comprises a public key of a target account that the target user wants to log in and a signature which is made for the user card by the TEE using its own private key of the second account, and the user card is used to prove that the application website has authorized the target user to use services provided by the application website by logging in with the target account.

In a thirtieth aspect, the present disclosure provides a user login device, provided on an application website, the device comprising: a second user login request receiving module, configured to receive a second user login request sent by a terminal device, wherein the second user login request comprises a user card generated in TEE, and the user card comprises a public key of a target account that the target user wants to log in and a signature which is made for the user card by the TEE using its own private key of the second account, and the user card is used to prove that the application website has authorized the target user to use services provided by the application website by logging in with the target account; a second user login request verification module, configured to use the second user login request to perform a login verification, wherein verification items comprise at least one of following: verifying whether a public key of the target account has been bound with a resource identifier; and verifying whether a signature for the user card is correct by using a public key of the second account of the TEE; and a second login response module, configured to send a response of successful login to the terminal device if results of all verification items are "yes".

In a thirty-first aspect, the present disclosure provides a terminal device, comprising: a memory and a processor, wherein computer program instructions are stored in the memory, and when the computer program instructions are read and run by the processor, the method, which is provided by any one of the first, third, fifth, seventh, ninth, twelfth, and fourteenth aspects or its possible embodiment, is executed.

In a thirty-second aspect, the present disclosure provides a server for an management website, comprising: a memory and a processor, wherein computer program instructions are stored in the memory, and when the computer program instructions are read and run by the processor, the method, which is provided by the sixth aspect or its possible embodiment, is executed.

In a thirty-third aspect, the present disclosure provides a server for an application website, comprising: a memory and a processor, wherein computer program instructions are stored in the memory, and when the computer program instructions are read and run by the processor, the method, which is provided by any one of the second, fourth, eighth, and tenth aspects or its possible embodiment, is executed.

In a thirty-fourth aspect, the present disclosure provides a TEE, comprising: a memory and a processor, wherein computer program instructions are stored in the memory, and when the computer program instructions are read and run by the processor, the method, which is provided by any one of the eleventh, thirteenth, and fifteenth aspects or its possible embodiment, is executed.

In a thirty-fifth aspect, the present disclosure provides a TEE device, wherein the TEE device is provided with the TEE provided by the thirty-fourth aspect.

In a thirty-sixth aspect, the present disclosure provides a computer-readable storage medium, wherein computer program instructions are stored on the computer-readable storage medium, and when the computer program instructions are run by a computer, the method, which is provided by any one of the first to fifteenth aspects or its possible embodiment, is executed.

BRIEF DESCRIPTION OF DRAWINGS

In order to explain the technical solutions of the present disclosure more clearly, the drawings that need to be used in the present disclosure will be briefly introduced as follows. It should be understood that the following drawings only show some embodiments of the present disclosure, therefore should not be regarded as a limitation to the scope. For those ordinarily skilled in the art, other related drawings can also be obtained from these drawings without any creative efforts.

DETAILED DESCRIPTION OF EMBODIMENTS

Figure 1:
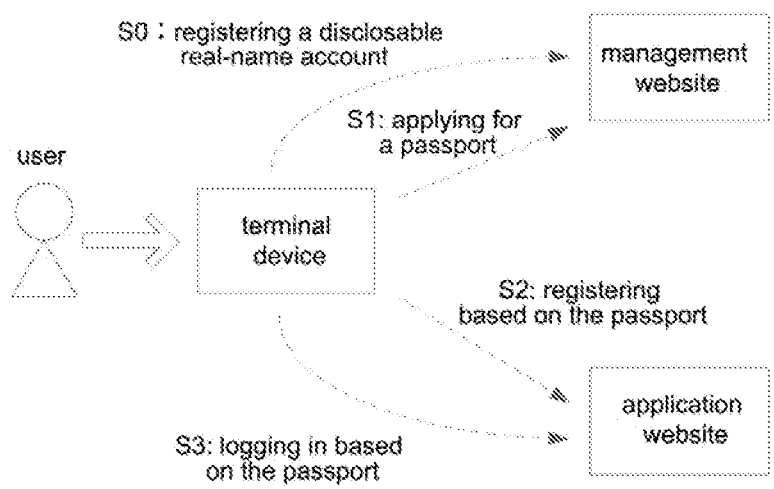
FIG. 1 shows a schematic diagram of a passport application and use method provided by the present disclosure.

The technical solutions in the present disclosure will be described below with reference to the drawings in the present disclosure. It should be noted that similar numerals and letters refer to similar items in the following drawings, so that once a certain item is defined in one drawing, it is not required to further define and explain it in subsequent drawings. Meanwhile, in description of the present disclosure, the terms "first", "second", etc. are only used to distinguish one entity or operation from another entity or operation, and cannot be construed as indicating or implying importance of relativity, they also should not be construed to require or imply any such actual relationship or order between these entities or operations. The terms "comprising", "including" or any other variation thereof are intended to encompass non-exclusive inclusion, such that a process, method, article or device comprising a list of elements comprises not only those elements, but also other elements which are not expressly listed, or also comprises elements inherent to such a process, method, article or device. Without further limitation, an element defined by the phrase "comprising a . . . " does not preclude the presence of additional identical elements in a process, method, article or device that comprises the element.

The blockchain technology originated from Bitcoin. Non-deterministic Wallet and Hierarchical Deterministic Wallet (HD Wallet) of Bitcoin started a mode of autonomous identity creation. Users, on their own, create identities, which are not allocated by a certain central organization. The user has the control right over the created identity, and achieves the authorization for specific tasks (such as, transfers) by means of signature, based on the private key. Other individuals or institutions cannot counterfeit, interfere, freeze, or delete the account. Especially, the HD wallet can derive multi-level sub-accounts from a root account. The derived sub-accounts include private keys and public keys. The owner of one HD wallet not only has the control right over the root account, but also has the control right over all of individual levels of sub-accounts derived from the root account. The Bitcoin BIP-32 technical specification may be referred to for the definition and technical details of the HD wallet, which will not be elaborated here. The behavior of deriving sub-accounts is similar to the concept of real name and avatar in the real world, wherein there is only one real name, which represents the unique and real identity of the user; and there can be plural avatars, which represents the identity of the user when completing a specific job or in a specific scene. Of course, both the real name and the avatar ultimately point to the same user.

BIP-32 also specifies two ways of deriving sub-accounts from a parent account, i.e., Normal Derivation and Hardened Derivation, wherein the normal derivation uses the public key of the parent account, while the hardened derivation only uses the private key of the parent account. The hardened derivation has an isolation effect on the derivation tree. For example, when the private key of the sub-account is accidentally leaked, others cannot use the public key of the parent account to infer the private key of the parent account, therefore it is more secure than the normal derivation.

For the normal derivation, it further distinguishes whether to derive the private key of the sub-account in combination with the private key of the parent account. If deriving in combination with the private key of the parent account, since amount of calculation is small, it is efficient and the derivation of the public key of a sub-account from its private key is also fast after the private key of the sub-account is obtained. If the private key of the parent account is not used for derivation, that is, the public key of the sub-account is derived from the public key of the parent account, the amount of calculation is much more, the derived sub-account has no private key, and the public key derived in this way can be used to receive money, but cannot used in paying money (because it does not have the ability to sign).

The autonomous identity of the user involved in the present disclosure can be created according to the method specified in the HD wallet, and this method is mainly used as an example in the description, but other implementation methods are not excluded.

The concept of autonomous identity covers a wide range of topics. The present disclosure mainly focuses on using autonomous identities to enable users to access application websites (comprising registration and login to application websites), and focuses on solving the following problems.

First, how to present a real name of the user as a number of avatars (these avatars are correlated with the real name), so that the user can use different avatars to access different application websites.

Second, how to realize the isolation between the association lines when one real name is correlated with many avatars, that is, the exposure of identify of one avatar will not affect other avatars and even the real name, which will further cause the user to lose control over identity autonomy right, which is referred to as the security isolation.

Third, how to avoid the exposure of the correlation relationship when associating one real name with many avatars, that is, to prevent the application website from learning that the avatar belongs to a certain real name or that plural avatar accounts belong to the same real name (so that the application website can perform data mining and other operations, tracking the online behavior of the user for commercial interests), which is referred to as the privacy isolation.

Fourth, how to realize that the application website gives the authorization for the access of the user, and how the user can undertake these authorizations through their autonomous identity.

Fifth, how to realize the sub-authorization of the user, that is, the user grants all or part of his or her own authority to access the application website to the target user, so that the target user can perform operations within a specified range.

It can be understood that the above problems are only some crucial problems solved by the present disclosure, and therefore they are specially explained, but it does not mean that the solutions provided by the present disclosure only cover the above content. In fact, a complete system of accessing the application website using the autonomous identity is created by the solutions provided by the present disclosure, which will be introduced in detail as follows.

FIG. 1 shows a schematic diagram of a passport application and using method according to the present disclosure. Referring to FIG. 1, the method involves the following participants: a terminal device, a management website, and an application website, wherein the terminal device can be the computer, mobile phone, smart wearable device, vehicle-mounted device etc. used by the user; the management website is used to manage the real identity of the user and can be operated by an authoritative organization, which can specifically refer to the server set up by the authoritative organization; the application website is used to provide users with certain specific services, such as web browsing services and application-related services, which may specifically refer to servers set up by service providers. A browser, client software, etc. can be installed on the terminal device to achieve the access to the management website and application website. In particular, for the application website, users can register and log in to obtain the operation permissions that match the login account, which is the problem that the solution of the present disclosure is mainly concerned with. It should be pointed out that the above terminal device, the server for the management website, and the server for the application website may be either a physical device or a virtual device, which is not limited.

In addition, it should also be pointed out that in the present disclosure, in order to simplify the description, it is often stated that the user performs a certain operation, which means that the user performs a certain operation through the functions of the software and hardware on the terminal device or other devices, and should not be understood that the user manually performs the operation.

The steps shown in FIG. 1 comprise the following steps.

Step S0, the user registers a disclosable real-name account on the management website through the terminal device, and the management website performs the true-name authentication on the user.

Step S1, the user applies for a passport to the management website through the terminal device, and after the management website verifies it is correct, a passport is issued to the user.

Step S2, the user registers on the application website based on the passport through the terminal device, and after the application website verifies it is correct, an account is registered for the user.

Step S3, the user logs in the application website based on the passport through the terminal device, and after the application website verifies it is correct, the user is allowed to log in with the account.

Figure 2:
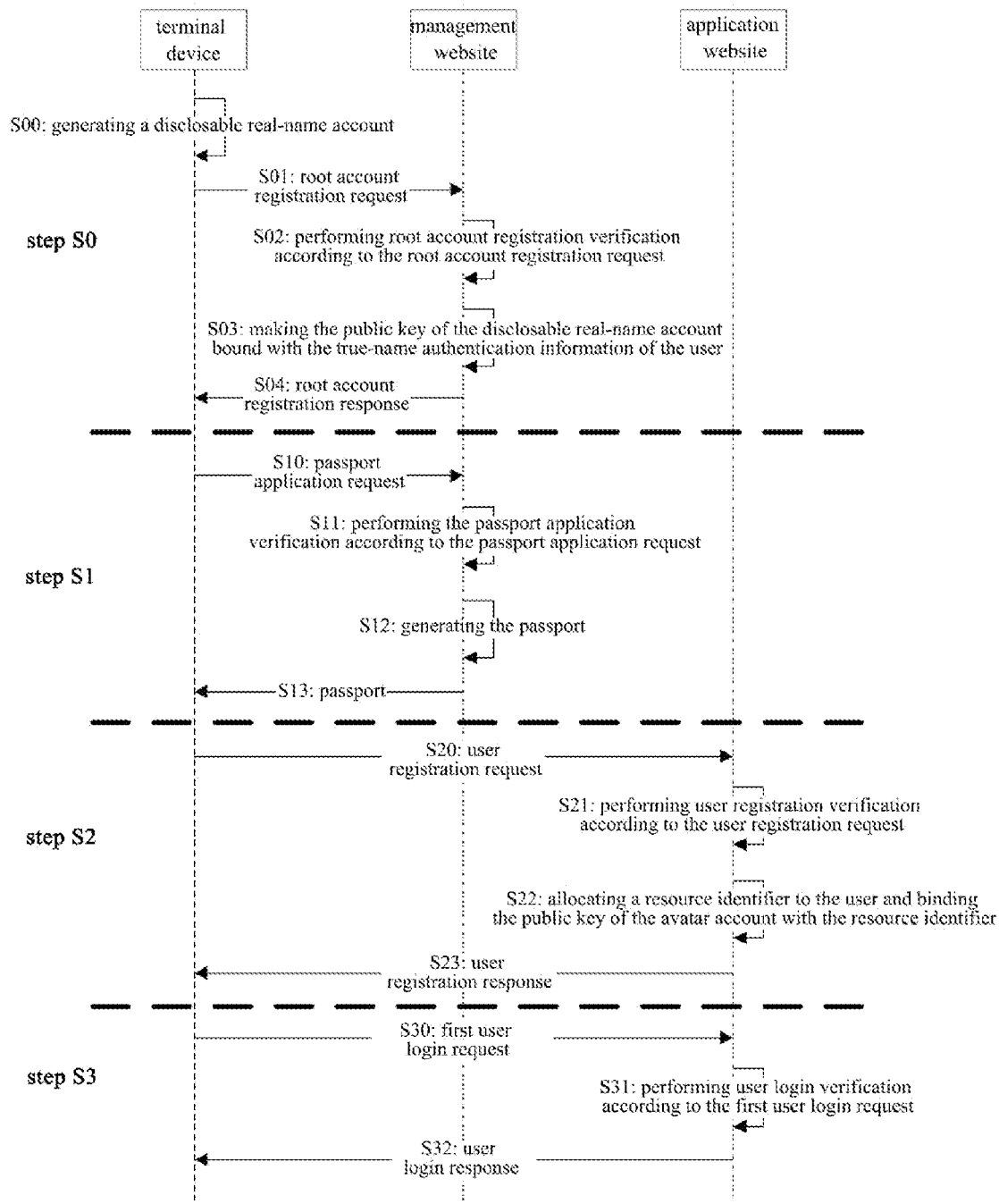
FIG. 2 shows a flowchart of steps S0 to S3 in the method provided by the present disclosure.

Steps S0 to S3 are further described below in conjunction with FIG. 2. Referring to FIG. 2, Step S0 may comprise the following steps.

Step S00, the terminal device generates a disclosable real-name account.

Step S01, the terminal device sends a root account registration request to the management website.

Step S02, the management website performs root account registration verification according to the root account registration request.

Step S03, the management website makes the public key of the disclosable real-name account bound with the true-name authentication information of the user.

Step S04, the management website sends a root account registration response to the terminal device.

Steps S00 to S04 will be described in combination. In the present disclosure, when realizing the autonomous identity, the above-mentioned meanings of the real name and the avatar in the real world are continuously used. The concept of real-name account and avatar account is proposed, wherein the real-name account represents the unique and real identity of the user; the avatar account is derived from the real-name account and represents the identity that the user uses when completing a specific job (mainly referring to registering and logging in the application website in the present disclosure). Here, the method of deriving the avatar account from the real-name account can be the derivation method specified in the HD wallet, and of course, other methods are not excluded.

In BIP-32, the tree structure for the account derivation is proposed, and in the BIP-44 technical specification, on the basis of BIP-32, special meaning is given to each layer in the tree structure, so that the HD wallet can better support plural currencies and plural accounts. According to the provisions of BIP-44, users can derive sub-accounts used for different purposes according to the following path:

m/purpose'/coin_type'/account'/change/address_index.

The m in the above path represents the root account of the HD wallet, which can be created by the HD wallet. In addition, it comprises 5 predefined tree-like hierarchical structures, wherein purpose' has a fixed value of 44', which indicates a multi-account structure that conforms to BIP-44; coin_type' is set as different values, which indicate different types of digital currencies; account' is a logical sub-account, indicating that it is used by different departments (or different accounting purposes) within a company; the "change" means it is used for change or other purposes; and "address_index" is used to derive many terminal accounts that are actually used. Of course, after the address_index, more sub-accounts can be derived according to actual needs. In addition, the symbol' in the above path indicates that the account at this level is derived through hardened derivation, wherein if this symbol is not attached, it means that the account at this level is derived through the ordinary derivation. The regulations in BIP-44 may be referred to, for the specific meaning of the above hierarchical structure, which will not be explained in detail here.

Further, the real-name account in the present disclosure can also be divided into a disclosable real-name account and an undisclosed real-name account. The public key of the disclosable real-name account representing the account is in a public state, and the undisclosed real-name account represents that the public key of the account is in the state of not being disclosed to the public (it can be recommended not to be disclosed to the public or forced not to be disclosed to the public). Not disclosing the public key of the account to the public will help reduce the possibility of others attacking the account. Therefore, the undisclosed real-name account can be used to the occasions with higher security being required (such as in the TEE). In Step S0 to Step S3, it is possible that only the disclosable real-name account is used instead of the undisclosed real-name account (whether to generate at this time an undisclosed real-name account is depending on different implements, i.e., it may or may not be generated). The above-mentioned so-called "to the public" may refer to the outside of the terminal device or security environment (such as, TEE) used by the user.

In an embodiment, a disclosable real-name account and an undisclosed real-name account may be defined according to the BIP-44 specification. For example, the derivation path of the undisclosed real-name account may be m/44'/0'/0'/0/0, wherein the "0'" on the left side indicates that the sub-account is derived by using the hardened derivation, such that even if the private key of a certain level below it is accidentally leaked, it is still able to block others from deriving reversely the private key level by level, thereby preventing the spread of security incidents to other derivation paths. The derivation path of the disclosable real-name account can be m/44'/0'/0'/0/0/0/0, that is, the disclosable real-name account can be derived from the undisclosed real-name account through the fixed relative path /0/0, and specifically:

disclosable_realname_account=undisclosed_realname_account.child(0).child(0).

It should be pointed out that the above-mentioned derivation paths or the derivative methods in the above-mentioned derivation paths are not necessarily required to be used for the disclosable real-name account and the undisclosed real-name account, but the disclosable real-name accounts should be the sub-account of the undisclosed real-name account (which can be a direct child level or a non-direct child level), that is, the disclosable real-name account can be derived from the undisclosed real-name account, but the undisclosed real-name account cannot be reversely derived from the disclosable real-name account, that is, one-way isolation is implemented, and this requirement is on the one hand to ensure the security of the undisclosed real-name account (the undisclosed real-name account is originally suitable for occasions with high security requirements), and on the other hand, to use the correlation relationship between the undisclosed real-name account and the disclosable real-name account to perform the affiliation verification, which will be explained later. As mentioned before, if only the method of Step S0 to Step S3 is implemented (only the passport is used, the user card is not used), it is possible that the undisclosed real-name account is not used. As understandable, accordingly, at this time, the relationship between the disclosable real-name account and the undisclosed real-name account is not limited any more.

The avatar account can be derived from the real-name account, which represents that the avatar is derived from the real name in the real world. For example, two types of avatar accounts can be derived as follows:

the_first_type_of_avatar_account=undisclosed_realname_account.child(index);

the_second_type_of_avatar_account=disclosable_realname_account.child(index), wherein index is the serial number of the avatar account, and the index has the value ranging from 1 to 0x7fffffff, and the number thereof can reach 2.1 billion, thus the number of avatar account is more than enough for regular applications. In the above derivation method, the avatar account is the direct child level of the real-name account. Of course, in some other embodiments, the avatar account can also be a non-direct child level of the real-name account, which is not limited, and however the account of the direct child level has the derivation more efficient. In addition, deriving the avatar account from the real-name account can use the ordinary derivation or the hardened derivation, which is not limited. The first type of avatar accounts and the second type of avatar accounts above are used in passports and user cards, respectively, and the use of the avatar account will be introduced in detail in the following method.

The HD wallet application can be installed on the terminal device. The HD wallet application can create a disclosable real-name account and derive the avatar account according to the preset derivation path under instructions of the user (if necessary, an undisclosed real-name account can also be created at this time). Creating of the real-name account means that the autonomous identity of the user is created. It can be understood that although BIP-32 and BIP-44 are both related technical specifications of Bitcoin, the account creation process therein is not necessarily related to Bitcoin and blockchain, etc. Therefore, in the present disclosure, the above HD wallet application has the main function of creating and managing the autonomous identity of the user, which may or may not implement functions related to digital currency transactions. For the sake of convenience, it is still called as "wallet".

After generating a disclosable real-name account on the terminal device, the user needs to submit the public key of the account to the management website for registration, so that the disclosable real-name account can be correlated with individuals in the real world (of course, it may be a group, institute and organization). Only after the association, the disclosable real-name account can truly reflect the meaning of the real name of the user in the real world. Since associating an account in the digital world with an identity in the real world, it inevitably involve the distribution of rights and interests, and thus during registration, the management website will perform the true-name authentication on the user. If the authentication is passed, the public key of the disclosable real-name account is bound with the true-name authentication information of the user. On the one hand, the true-name authentication ensures that the public key registered by the user corresponds to a real person, which is credible, and on the other hand, uniqueness of the registration is ensured, that is, one real person in the true world can register the public key of the disclosable real-name for only once. The specific process is as follows.

The terminal device sends a root account registration request to the management website, and the root account registration request comprises the true-name authentication information of the user and the public key of the disclosable real-name account. After receiving the root account registration request, the management website uses the root account registration request to perform the root account registration verification, and the verification items comprise at least one of the following:

(1) verifying whether the true-name authentication information is correct; and
(2) verifying whether the public key of the disclosable real-name account has not been bound with true-name authentication information.

Here, item (1) is to verify the validity of true-name authentication information. Item (2) is to verify whether the public key of the disclosable real-name account has been registered, to ensure that one disclosable real-name account can be registered on the management website for only once.

If results of all verification items are "yes", the management website will bind the public key of the disclosable real-name account with the true-name authentication information of the user. At this time, the registration is completed, and the management website sends a root account registration response to the terminal device to inform the user of the successful registration. If the result of a certain one of the verification items is "no", the management website may also send a root account registration response to the terminal device to inform the user that the registration fails, wherein it is also possible to further inform the user of the reason for the failed registration. It can be understood that the verification sequence of the above verification items is not limited, and if verification of a certain verification item is verified as failed, the remaining verification items that have not been executed can no longer be executed.

The true-name authentication information of the user refers to information that can represent the actual identity of the user, such as a mobile phone number, ID number, photo, etc. In a relatively common implementation, the true-name authentication information may comprise the user's mobile phone number and the SMS verification code provided by the management website. After the management website receives the verification code submitted by the user, it is determined whether it is consistent with the one provided by itself, thereby completing the verification on the true-name authentication information. Here, although the mobile phone number does not directly indicate the actual identity of the user, since the real-name registration has been already performed when applying for a mobile phone number in many countries (such as China), the management website can also query the actual identity of the user based on the mobile phone number. This method can be called as weak true-name authentication. Although the weak true-name authentication is an indirect authentication method, since users do not need to submit too much information, the operation is relatively simple.

No restriction is made to the way in which users submit root account registration requests. For example, they can be submitted directly to the management website through the HD wallet application, or they can be submitted in such a way that one accesses the page of the management website through a browser, and fills in the true-name authentication information and the public key of the disclosable real-name account on the page, then clicks the button on the page to submit, etc. In addition, in some embodiments, the submission process of the information may also be divided into plural steps. For example, the user is required to input the mobile phone number and the verification code first, and the management website allows the user to submit the public key of the disclosable real-name account just after the verification is passed.

Further, the verification on the true-name authentication information may be completed by the management website itself, or may be completed by the management website with the help of a third party, as long as the management website may obtain the verification result from the third party.

In an embodiment, the root account registration request may further comprise specific information and a signature for the specific information using the private key of the disclosable real-name account, so that the management website can verify the signature using the public key of the disclosable real-name account submitted by the user, to confirm that the user does have a disclosable real-name account. The specific information may comprise a random character string provided by the management website. Using the random character string as the content to be signed is beneficial to avoid replay attacks. For example, the management website may attach the random character string to the root account registration page provided for the user to browse. Of course, the specific information may also comprise other contents, for example, the public key of the disclosable real-name account, true-name authentication information, etc., and the management website can also confirm whether these contents have been tampered by verifying the signature.

The user, after completing the registration of the disclosable real-name account on the management website, can apply for a passport to the management website, that is, Step S1 is performed. Before applying for a passport, the user derives, on its own, an avatar account from the disclosable real-name account, and then requests the management website to issue a certificate to prove that the avatar account belongs to a certain disclosable real-name account that has been registered with the real name on the management website. After obtaining the passport, the user can register (Step S2) and log in (Step S3) the application website that recognizes the validity of the passport. Of course, these application websites will also verify the authenticity of the passport.

Continuously referring to FIG. 2, Step S1 may comprise the following steps:

Step S10, the terminal device sends a passport application request to the management website.

Step S11, the management website performs the passport application verification according to the passport application request.

Step S12, the management website generates a passport.

Step S13, the management website sends the passport to the terminal device.

Steps S10 to S13 are described in combination. First, the user derives an avatar account on the terminal device from the disclosable real-name account which has been registered with the real name, and the derivation method has been described above.

Then, the terminal device sends a passport application request to the management website. The passport application request at least comprises the public key of the disclosable real-name account, the chain code of the disclosable real-name account, and the derivation path of deriving the avatar account from the disclosable real-name account and the signature which is made for the passport application request using the private key of the disclosable real-name account. Here, the chain code is the information which is required by deriving the sub-account from the parent account, and the BIP-32 technical specification can referred to for its meaning, which will not be explained in detail here. As for the signature which is made for the passport application request using the private key of the disclosable real-name account, the object of its signature can be other information other than the signature itself in the passport application request.

According to requirements, the passport application request may also comprise one or more of the following information: the current time of the terminal device, the target time of the passport, and the time-period category of the passport. Here, the target time of the passport is the current time of the terminal device, or the historical time specified by the application website that allows to perform the registration or login using the passport that has been obtained by application.

In addition, considering that there are some sensitive information in the passport application request, such as chain codes and derivation paths, the leakage of these information is not fatal (because the private key is not leaked), but it does not rule out that others can use this information to derive sub-accounts (if it is only to derive the public key of the sub-account, then in BIP-32, it does not need the private key of the parent account) to fake the user identity, and therefore in an optional solution, it is possible that the passport application request is asymmetrically encrypted by using the public key of the second account of the management website or symmetrically encrypted by using ECDH negotiation key. In Step S11, after receiving the passport application request, the management website can use its own private key of the second account or ECDH negotiation key to decrypt the passport application request and then process it. Here, the second account of the management website is constituted by a public-private key pair, which may indicate the identity of the domain administrator of the management website, and of course, does not rule out indicating other identities. In this solution, as for the signature carried in the passport application request, the object of the signature can be either the plaintext before encryption (encrypting after making the signature) or the encrypted ciphertext.

The purpose of each information item in the passport application request will be explained in detail later when it is used. The passport application request can only contain the required information items, and the remaining information items are not presented at all, or the passport application request can also be in a fixed format. For example, each possible information item is presented as a corresponding field. If a certain information item is necessary to be used, the value of the corresponding field is not null, and otherwise the value of the corresponding field is null.

After receiving the passport application request, the management website uses the passport application request to verify the passport application. The verification items comprise at least one of the following:

(1) verifying whether the public key of the disclosable real-name account has been registered with the real name;
(2) using the public key of the disclosable real-name account to verify whether the signature for the passport application request is correct; and
(3) obtaining the current time of the management website, and verifying whether the interval between the current time of the terminal device and the current time of the management website is less than the first preset time interval.

Here, item (1) is to verify whether the user is eligible to apply for a passport, because one disclosable real-name account can be registered for only once. Item (2) is to verify whether the user really has a disclosable real-name account and whether the content of the passport application request has been tampered with. The precondition to perform the verification item (3) is that the passport application request comprises the current time of the terminal device. Item (3) is to verify whether the interval between the current time of the terminal device and the current time of the management website is relatively large. If the interval is relatively large (not less than the first preset time interval), the request may be a replay attack and should be rejected. The specific value of the first preset time interval is not limited, and for example, it may be 30 minutes or 1 hour, etc.

If results of all verification items are "yes", the management website uses the public key of the disclosable real-name account and the derivation path of deriving the avatar account from the disclosable real-name account, to derive the public key of the avatar account, and the derivation method has been described above. Since the management website has confirmed through the signature in the passport application request that the disclosable real-name account is indeed owned by the user, and the information, such as the chain code and derivation path in the passport application request is authentic and credible, such that the avatar account which is derived by the management website itself must also belong to the user, therefore a passport can be issued to him or her to prove that the avatar account belongs to a disclosable real-name account that has been registered with the real name on the management website. If the result of a certain verification item is "no", the management website can also inform the user that the application for a passport has failed, and can further inform the user of the reason for the failure of the application. It can be understood that the verification sequence of the above verification items is not limited, and if verification of a certain verification item fails, the remaining verification items that have not been executed can no longer be executed.

The management website organizes several information items to generate a passport. The passport at least comprises the public key of the avatar account derived by the management website itself, the public key of the first account of the management website, and the signature which is made for the passport by the management website using its own private key of the first account. As required, the passport may also comprise one or more of the following information: the verification root code of the passport, the time-period unique code of the passport, the identifier of the management website, the user's group, the time-period category of the passport, the validity period of the passport, and the target time of the passport.

Here, the first account of the management website is constituted by a public-private key pair, which can represent that the management website has the identity as a passport issuing officer and of course, does not rule out indicating other identities. The first account and the second account mentioned above of the management website may or may not be the same. The public key of the first account of the management website is carried in the passport, so as to verify the signature in the passport, so as to confirm that the passport is indeed issued by the management website and the content of the passport is authentic and credible. As for the signature in the passport, the object of the signature can be the information in the passport, other than the signature itself.

The verification root code of the passport is used to check the identity of the passport. The verification root code can be calculated according to the public key of the disclosable real-name account and the total derivation path of the avatar account. Here, the total derivation path of the avatar account may be defined as a derivation path with the undisclosed real-name account as the derivation starting point. The derivation path is obtained by splicing two parts of paths: one part is the derivation path of deriving the avatar account from the disclosable real-name account, and the other part is the relative path between the undisclosed real-name account and the disclosable real-name account of the user (as mentioned earlier, the relative path can be a preset fixed value). Since the undisclosed real-name account can be used to derive the disclosable real-name account and the disclosable real-name account can be used to derive the avatar account of the passport, what is obtained after splicing the two paths is the derivation path of deriving the avatar account from the undisclosed real-name account. For example, the derivation path of the undisclosed real-name account (with the root account m of the HD wallet as the derivation starting point) is m/44'/0'/0'/0/0, and the derivation path of the disclosable real-name account is m/44'/0'/0'/0/0/0/0. The derivation path of deriving the avatar account from the disclosable real-name account is /1, and the relative path between the undisclosed real-name account and the disclosable real-name account is 0/0. After splicing (splicing with the relative path as the prefix), the derivation path 0/0/1 of deriving the avatar account from the undisclosed real-name account (that is, the total derivation path of the avatar account) is obtained. For example, the two items of information can be spliced and then the verification code is calculated, and the obtained verification code is the verification root code of the passport. The verification code may be calculated in many ways, such as, Cyclic Redundancy Check (CRC). Alternatively, it is possible to perform a Hash operation on the spliced information, and take the first few bits of the operation result as the verification code, etc. Here, since it is difficult to forge a character string at the source to collide to obtain a determined Hash value of the result, the method of calculating the verification root code using Hash operation has a strong anti-forgery capability.

The time-period category of the passport and the target time of the passport are obtained from the passport application request. The time-period unique code of the passport is calculated according to the public key of the disclosable real-name account and the time period where the target time of the passport is located, and the time period where the target time of the passport is located is calculated according to the target time of the passport and the time-period category of the passport.

For example, in an embodiment, as for the calculation of the time-period unique code of the passport, it can concatenate the two items of information, i.e., the public key of the disclosable real-name account and the time period in which the target time of the passport is located, to form a character string, and the Hash digest operation is performed to the character string, and the obtained Hash value is the time-period unique code, which can be expressed as the following formula:

LoginSession=hash(OpenPublicKey+TimeSegment).

Here, OpenPublicKey is the public key of the disclosable real-name account, TimeSegment is the time period (time segment) where the target time of the passport is located (seeing below for the calculation method), hash means the Hash operation, and + means the character string splicing. As long as the disclosable real-name account and the time period where the target time is located are determined, the time-period unique code, which is obtained by selecting the digest, is also determined and can be used as a unique identifier.

The time-period category of the passport reflects the length of the time period, and for example, it can be a time period of a week (7 days), a time period of half a month (15 days), a month (31 days), or a quarter (92 days), etc. The target time of the passport is one moment (the current time of the terminal device or the historical time specified by the application website). In one calculation method, it is possible to convert this moment to the number of seconds, starting from a certain reference moment (for example, 00:00:00, Jan. 1, 1970) and then divide it by the number of seconds of the time-period of unit corresponding to the time-period category of the passport, so as to obtain the time period in which the target time of the passport is located. For example, if it is a time period of 7 days, the calculation method of TimeSegment of the time period in which the target time of the passport is located is as follows:

TimeSegment=TIME/604800.

Here, the TIME is the number of seconds obtained by converting the target time of the passport; 604800 is the number of seconds corresponding to 7 days; and the "/" operator means the division with no remainder, with the result value being an integer.

The time-period unique code of the passport represents a certain determined character string which is used by the same user within a certain time period, which is used as a unique identification. The passports which are applied for by the same user with different avatar accounts in the same time period (referring to the time period in which the target time of the passport is located) have the time-period unique codes fully identical. However, if the passports are applied for by different users in the same time period, or the passports are applied by the same user in different time periods, the time-period unique codes in the passports are different.

When taking the current time of the terminal device as the target time of the passport, it represents the time when the management website issues the passport. When a certain historical time specified by an application website is used as the target time of the passport, the purpose is to limit the same user to be able to obtain only one time-period unique code, no matter how many passports are applied for. For example, the time when the application website goes online may be used as the historical time.

The identifier of the management website is filled by the management website itself, and for example, it may be the name given to itself by the management website. The user's group can be uniformly set to 0 or other fixed values (the user's group will be explained later when Step S4 is introduced).

The validity period of the passport can be filled by the management website on its own, according to the requirements of the application website. If the current time of the terminal device is used as the target time of the passport, the validity period and the target time of the passport form a time period, during which the passport is valid. The starting point of the time period is the time when the management website issues the passport, which is represented by the target time of the passport, and the length of the time period is determined by the validity period. The validity period may be in the form of duration, or moment (the ending moment of the time period).

The purpose of each information item in the passport will be explained in detail later when it is used. The passport can only contain the required information items, and the remaining information items are not presented at all, or the passport can also be in a fixed format. For example, each information item possibly contained is presented as one corresponding field. If a certain information item is to be used, the value of the corresponding field is not null, and otherwise the value of the corresponding field is null. After the management website generates the passport, the passport is sent to the terminal device.

Continuously referring to FIG. 2, Step S2 may comprise the following steps.

Step S20, the terminal device sends a user registration request to the application website.

Step S21, the application website performs user registration verification according to the user registration request.

Step S22, the application website allocates a resource identifier to the user and binds the public key of the avatar account with the resource identifier.

Step S23, the application website sends a user registration response to the terminal device.

Steps S20 to S23 are described in combination. After applying for and obtaining a passport, the user sends a user registration request to the application website, and the passport is carried in the user registration request. In some embodiments, the user can also use the private key of the avatar account derived in Step S1 to sign the user registration request, the avatar account should be consistent with the avatar account in the passport, and the object of the signature can be the content of the user registration request other than the signature itself.

The process of the user applying for a passport and the process of the user requesting to register on the application website may be two relatively independent processes. For example, the user first applies for a passport to the management website, and then submits the passport to the application website when registering on the application website. However, it is not excluded that in some solutions, these two processes are executed continuously. For example, a piece of code logic is built in the registration page of the application website. After the terminal device accesses the page, the code logic will be executed, wherein it first goes to the management website to apply for a passport, and then submits the passport to the application website for registration. In this solution, the user can complete the passport application and send the registration request directly with one click without being aware of the passport application process, which is friendlier in operation.

After receiving the user registration request sent by the terminal device, the application website uses the user registration request to perform registration verification, and the verification items comprise at least one of the following:

(1) verifying whether the public key of the avatar account in the passport has not been bound with the resource identifier;

(2) using the public key of the first account of the management website to verify whether the signature for the passport is correct;

(3) verifying whether the time-period unique code of the passport is different from the time-period unique code in the passport used by any registered user; and (4) using the public key of the avatar account in the passport to verify whether the signature for the user registration request is correct.

Here, item (1) is to verify whether the avatar account has been registered, because only the registered avatar account will be bound with the resource identifier (seeing below for details), and only the unregistered avatar account can be registered. Item (2) is to verify whether the passport is issued by the management website and whether the content of the passport has been tampered with. The public key of the first account of the management website is carried in the passport.

The precondition for verification item (3) is that the passport contains the time-period unique code, and the target time of the passport is the historical time specified by the application website. When the definition of the time-period unique code of the passport was explained, it was noted that since the target time of the passport is limited to a specific historical time, therefore no matter how many passports the same user applies for, he or she can obtain only one time-period unique code. Therefore, item (3) is to verify whether the same user attempts to use different avatar accounts to register multiple times. If there is such a registration behavior, the time-period unique code in the current passport must be the same as the time-period unique code in the passport used by a registered user. Whether to perform the verification item (3) depends on the application website. Some application websites allow the same user to register plural accounts. For example, a certain application website is just a forum mainly intended for text communication, and it is of no great importance to allow the same user to register plural accounts. However, some application websites do not allow the same user to register plural accounts. For example, a certain website allocates network disk space for registered users. If a user registers plural accounts, it will cause him or her to obtain an unreasonable amount of resources and increase operation costs of the website.

The precondition for the verification item (4) is that the user registration request comprises the signature which is made for the request using the private key of the avatar account of the user, and the public key of the avatar account is carried in the passport. Item (4) is to verify whether the user does own the avatar account and whether the content of the request has been tampered with.

If results of all verification items are "yes", the application website allocates one resource identifier to the user, and binds the public key of the avatar account with the resource identifier. The binding relationship can be stored in the database of the application website for the user to use when logging in. The concept of the resource identifier will be briefly introduced as follows.

The services, which are provided by the application website for users, will inevitably consume website resources. The application website will set up an identifier for the consumed resources, called resource identifier (ResourceId). The resource identifiers correspond to the registered users of the application website one to one, that is, the application website can use resource identifiers to identify different users. According to the resource identifier, the application website has the ability to implement a certain degree of data mining on user behavior, which is a normal phenomenon. Only with data mining analysis, merchants can serve customers better. However, the present disclosure attempts to limit the data mining behavior of the application website to a certain range for preventing its abuse and reducing the invasion of user privacy (seeing the analysis below for details).

In addition to binding the resource identifier, the application website can also save the passport or preset information items in the passport for use in subsequent steps. In addition, the application website will also send a user registration response to the terminal device to inform the user that the registration is successful. If the result of a certain verification item is "no", the application website may also send a user registration response to the terminal device to inform the user that the registration of the website fails, and may further inform the user of the reason for the failure of registration. It can be understood that the verification sequence of the above verification items is not limited, and if verification of a certain verification item fails, the remaining verification items that have not been executed can no longer be executed.

In the prior art, when a user registers on an application website, he or she often needs to input a user name and password. However, in the present disclosure, since the identity information of the user (the public key of the avatar account) is already included in the passport, the registration can be performed just by submitting directly the passport to the application website. It is a completely different registration method, and it is also simpler for users in operation.

Continuously referring to FIG. 2, Step S3 may comprise the following steps.

Step S30, the terminal device sends a first user login request to the application website.

Step S31, the application website performs user login verification according to the first user login request.

Step S32, the application website sends a user login response to the terminal device.

Steps S30 to S32 are described in combination. After the user successfully registers on the application website using the passport, the first user login request is sent to the application website, and the passport is carried in the first user login request. In some embodiments, the user can also use the private key of the avatar account derived in Step S1 to sign the first user login request, the avatar account should be consistent with the avatar account in the passport, and the object of the signature can be the content in the first user login request, other than the signature itself.

After receiving the first user login request sent by the terminal device, the application website uses the first user login request to perform login verification, and the verification items comprise at least one of the following:

(1) verifying whether the public key of the avatar account in the passport has been bound with the resource identifier;
(2) using the public key of the first account of the management website to verify whether the signature for the passport is correct;
(3) obtaining the current time of the application website, and verifying whether the interval between the current time of the application website and the target time of the passport is less than the second preset time interval;
(4) obtaining the current time of the application website, and verifying whether the current time of the application website is within the time period specified by the validity period of the passport and the target time of the passport;
(5) using the public key of the avatar account in the passport to verify whether the signature for the first user login request is correct; and
(6) verifying whether the time-period unique code of the passport is different from the time-period unique code in the passport used by any logged-in user.

Here, item (1) is to verify whether the avatar account has been registered, because only the registered avatar account will be bound with the resource identifier, and the unregistered avatar account should not be allowed to log in. Item (2) is to verify whether the passport is issued by the management website and whether the content of the passport has been tampered with. The public key of the first account of the management website is carried in the passport.

The precondition to perform the verification item (3) is that the target time is included in the passport, and the target time of the passport is the current time of the terminal device. Item (3) is to verify whether the passport has expired. As mentioned above, the target time of the passport, when it is the current time of the terminal device, represents the time when the passport is issued by the management website. If the passport is not used in time after being issued (the interval between the target time of the passport and the current time of the application website is not less than the second preset time interval), the passport has expired and the user should not be allowed to log in using it, for ensuring the security. The specific value of the second preset time interval is not limited, for example, it may be 1 hour, 1 day, or the like.

The precondition for performing the verification item (4) is that the passport comprises the target time and the validity period, and the target time of the passport is the current time of the terminal device. Item (4) is to verify whether the passport has expired. If the passport is not used in time after being issued (the current time of the application website is no longer within the time period determined by the target time and validity period of the passport), the passport has expired, and the user should not be allowed to continue to use it to log in for ensuring the security. The specific value of the validity period is not limited, and for example, it may be 1 hour, 1 day, etc. In practice, since the validity of the passport depends on the approval of the application website, there is also the possibility that the application website does not perform the verification based on the validity period in the passport. For example, although the validity period in the passport is 1 day, the application website only approves the validity of the passport within 1 hour after being issued.

If it is desired to verify whether the passport has expired, it is possible to choose one of (3) and (4) when implementing the technical solution. In addition, it should also be pointed out that whether the passport has expired can also be verified when using the passport to register, which is omitted from the above.

The precondition of the verification item (5) is that the first user login request comprises the signature which is made for the request using the private key of the avatar account of the user, and the public key of the avatar account is carried in the passport. Item (5) is to verify whether the user does own the avatar account and whether the content of the request has been tampered with.

The precondition for verification item (6) is that the passport contains the time-period unique code. According to the calculation method of the time-period unique code, the same user applies for passports with different avatar accounts in the same time period (referring to the time period in which the target time of the passport is located), and the time-period unique codes thereof are exactly identical. However, if the passports are applied for by different users in the same time period, or the passports are applied for by the same user in different time periods, the time-period unique codes in the passports are different. Therefore, item (6) is to verify whether the same user attempts to log in with passports which are applied for with different avatar accounts in the same time period. If such behavior exists, the time-period unique code in the current passport is inevitably the same as that in the passport which is used by the logged-in user. Whether to perform the verification item (6) depends on the application website. For example, some application websites will allocate resources (such as storage resources, computing resources, reward points, etc.) with a certain value to the logged-in user. If one user logs in through a large number of avatar accounts, it will lead to the serious imbalance of resource allocation and even affect the normal operation of the website. Therefore, these application websites can perform the verification item (6). Further, these application websites can require users to specify the target time of the passport as a fixed historical time when applying for a passport, so that it is more strictly restricted that one user can log in to the application website through only one avatar account for ensuring the fairness of resource allocation.

If results of all verification items are "yes", the application website sends a user login response to the terminal device to inform the user that the login is successful. If result of any one of verification items (1) to (5) is "no", the application website may also send a user login response to the terminal device, informing the user of the failure of logging in to the website, and may further inform the user of the reason for the failure of logging in. It can be understood that the verification sequence of verification items (1) to (5) is not limited, and if verification of a certain verification item fails, the remaining verification items that have not been executed can no longer be executed (if there is (6), it comprises (6)).

The (6) is slightly special. If the verification result is "no", and results of remaining verification items are "yes" at this time, then there are two processing methods, wherein in one processing method, the account, which is logged in by the logged-in user already mentioned in (6), is made to be logged out, and the avatar account in the current passport is made to become a new login account of the logged-in user. At this time, since the current passport is successfully logged in, the application website can send a response of successful login to the terminal device; in the other processing method, the logged-in account of the logged-in user is continuously kept in the logged-in state, and the login of the avatar account in the current passport is rejected. At this time, since the login using the current passport fails, the application website can send a login failure response to the terminal device. It is enough to choose one of the two methods to execute. In short, both of them are to ensure that the avatar accounts in the two passports of the same user with the same time-period unique code cannot be logged in at the same time. It can be understood that the verification item (6) may be performed before or after any one of the verification items (1) to (5).

It should be pointed out that the performing of Step S3 is only the mainstream situation of user login, that is, within a period of time after the user has successfully registered based on the passport, the user, again based on the passport, logs into the application website which he or she has registered, which is also the mainstream situation of user login. Of course, it is not excluded that some application websites directly mark the user as being logged in after the user has successfully registered. This situation is only a simplified version of Step S3, which will not be described separately.

In the prior art, a user, when logging-in to an application website, often needs to input a user name and password. In the present disclosure, since the identity information of the user (the public key of the avatar account) is already included in the passport, it is possible to perform the login by directly submitting the passport to the application website, which is a completely different way of logging in, and it is simpler for users in operation.

The issues related to security isolation and privacy isolation in the solutions of FIGS. 1 and 2 is analyzed as follows.

First, users are allowed to derive different avatar accounts from the disclosable real-name account for different application websites, and the different passports applied for with these avatar accounts are respectively used for the registration and login in these application websites. When registering or logging in to a certain application website, it is possible to use the private key of the corresponding avatar account to sign the registration or login request. That is to say, the same user accesses different application websites, with adopting different identities, and using different private keys. If the private key of the account is accidentally exposed when accessing a certain application website, it will not spread to other login points, which is a security isolation. However, it should be pointed out that the above practices are not mandatory in some embodiments. For example, in these embodiments, if the user must use one passport to register on multiple application websites, this behavior is not restricted.

Secondly, when the passport is used to access individual application websites, its validity period can be limited to a short period of time (this limitation can be achieved regardless of whether the validity period information is added to the passport, seeing Step S3 above for details), so that even the private key of the account is accidentally exposed when accessing a certain application website, because the passport will expire soon, the caused impact is limited, which is also a kind of security isolation.

In the above method, first a passport is applied for, from the management website (Step S1), and then the passport is used for the registration and the login to the application website (Step S2 and Step S3), that is, it is generally divided into two stages, and such implementation helps achieve the privacy isolation. In the first stage, although the management website can know the real identity of the user who applies for the passport, but cannot know how the user will use the passport, because the passport does not contain information related to the application website; and in the second stage, although the application website can know that the user has registered or logged in through a certain avatar account, since the passport does not contain information about the disclosable real-name account, the application website cannot know the real owner of the passport. In this way, there is no obvious correlation between the two stages, and others cannot track the online behavior of a specific user, so that the user privacy can be protected.

Further, in some embodiments, if the operations for each website (comprising the management website and the application website) are all performed in the browser, each website may also be required to add to the head segment of the relevant html web page file (for example, related to registration and login) the following meta configuration:

<meta name="referrer" content="never">.

This configuration instructs the browser to no longer transfer the URL information of the referrer page to the website, so as to cut off the correlation relationship between the accessed URLs former and later. If it is not set, the website can obtain the URL of the previous accessed page of the user through document.referer (by default, the browser will transfer this information to the website). In this way, the website may use this relationship to analyze the behavioral characteristics of the user, resulting in the user privacy exposed. For example, a certain application website finds that the user has just accessed the management website, and then immediately accesses the present website. If the two actions of the user are correlated, the application website is likely to infer what the user was doing in the previous step (such as, applying for a passport), and further the application website may analyze and know a certain connection between the avatar account in the passport and the real identity of the user.

Figure 4:
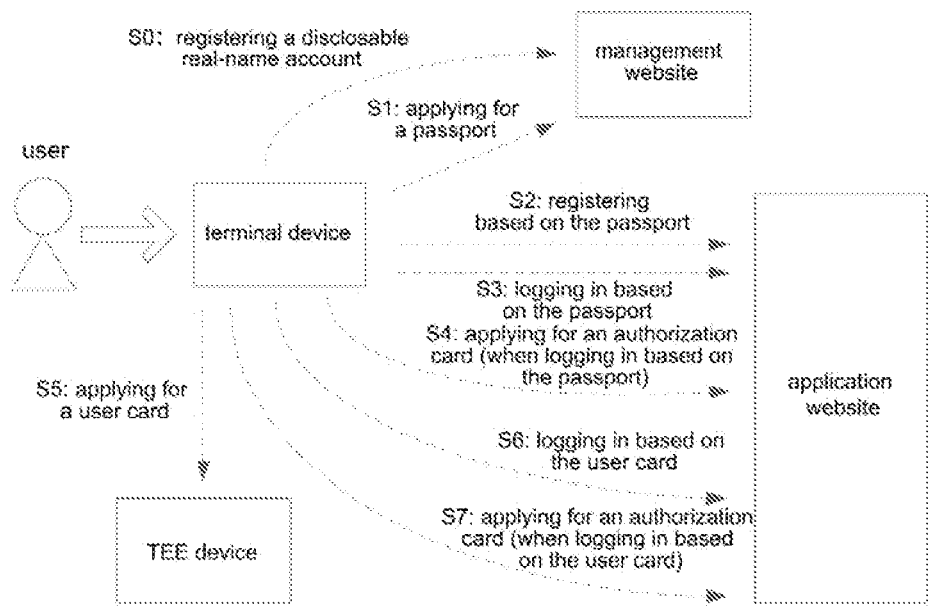
FIG. 4 shows a schematic diagram of a user card application and use method provided by the present disclosure.

Before introducing FIG. 4, TEE, the TEE device, and the distributed security service implemented with the help of blockchain are introduced first.

TEE usually does not work independently, but is provided on a certain electronic device (referred to as the TEE device in the present disclosure) to provide a running environment coexisting with a rich operating system (RichOperatingSystem, RichOS, such as Android, etc.) on the device, to achieve a specific function. TEE has its own execution space, and the hardware and software resources it can access are separated from RichOS. TEE not only provides a secure execution environment for trusted applications, but also protects the confidentiality, integrity and access rights of resources and data of the trusted application. In order to ensure the trusted root of the TEE itself, the TEE must be authenticated and isolated from RichOS during the secure boot process. In TEE, all of the trusted applications are independent of each other and cannot access each other without authorization.

The TEE can be implemented in, but not limited to, the following two ways.

First, it builds a trusted execution environment with the help of security protection capabilities provided by a specific CPU chip, such as IntelSGX, ARMTrustZone, etc. In order to ensure security strength, trusted hardware support can also be added at the bottom layer of the trusted execution environment, such as, using a security chip that conforms to the Trusted Platform Module (TPM) standard, or using a security chip that conforms to the Trusted Cryptography Module (TCM) standard.

Second, it uses an encryption lock (commonly known as a software dog (dongle)) to implement a trusted execution environment. Common software dog is often packaged as a Universal Serial Bus (USB) device, and the software dog not only provides function of file storage, but also supports the running of customized programs. Using the software dog, it is not necessary to limit the device type of the device, and as long as the device has a USB interface, the TEE can be connected, which reduces the hardware and software requirements for the device.

If something outside the TEE is to use the functions of the TEE or obtain the data stored in the TEE, it must use the method of calling the external interface provided by the TEE, such as an Application Programming Interface (API).

Either the chip of the device itself supports TEE (for example, the first method above), or the TEE is implemented by connecting a software dog, or other methods can be used in the solution of the present disclosure. Moreover, since there are both Rich OS and TEE on the TEE device, in order to distinguish the two in the elaboration, it is agreed that when it is mentioned that the TEE device performs a certain operation, it refers to the operation which is achieved by the Rich OS on the TEE device or a certain application program therein. If it is the operation performed by the TEE in the TEE device, it will directly indicate that the operation is performed by the TEE, but will not say that the operation is performed by the TEE device.

In the present disclosure, the main function implemented by TEE is external security service, comprising but not limited to the following four items: a service for generating one-way ciphertext key, a service for performing transfer-encryption on the one-way ciphertext key, a service of generating a user card based on an authorization card and a service of generating a user card based on a passport and an authorization card. The objects of its services comprise but are not limited to terminal devices and application websites, hereinafter referred to as service demanders in short.

TEE provides the security service through the way of the network, which can be either the ordinary Internet or some special networks, such as blockchain networks. Considering that the blockchain network has the advantages of decentralization, non-tampering and good anonymity, it is easy to be used as a carrier for TEE to provide the security service, and thus the implementation of the distributed security service realized with help of blockchain is mainly introduced as follows, but it is required to emphasize again that as long as an the information channel can be provided between the TEE and the service demander, the service demander can request the security service from the TEE, and therefore the blockchain network is not the only implementation method.

Figure 3:
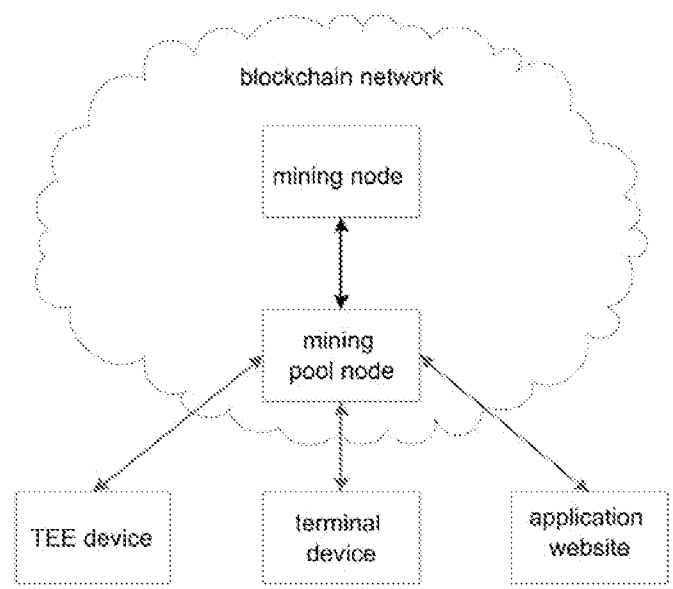
FIG. 3 shows a schematic diagram of a scenario in which the distributed security service is implemented by means of blockchain.

FIG. 3 shows a schematic diagram of a scenario in which the distributed security service is implemented by means of blockchain. Referring to FIG. 3, the blockchain network comprises mining nodes and mining pool nodes. Each miner can access the blockchain network through the mining pool node to participate in the competition for bookkeeping rights (commonly known as mining), and the blocks generated by mining can be recorded in the local blockchain of the mining node and broadcasted to other mining nodes. For the specific functions of mining nodes and mining pool nodes, the description of the existing digital currency system (such as the Bitcoin system) may be referred to, which is not explained specifically here. In addition, it should be pointed out that mining pool nodes and mining nodes are only defined from the function of nodes, and they are of various forms of implementation. For example, they can be divided into two physical nodes, or they can be implemented on the same physical node.

The mining pool node can be used as a service access point for TEE to access the blockchain network and provide the security service. For example, a TEE device can establish a communication connection with the mining pool node, to achieve the remote access. For another example, the mining pool node provides plural USB interfaces. If TEE is in the form of a software dog, it can also be directly locally connected to the mining pool node. It is understandable that in the some implementations, it is possible that the blockchain network does not comprise mining pool nodes. At this time, the mining node can also be used as the service access point for TEE.

In the blockchain network, there can be many mining pool nodes or mining nodes, so that there can be many TEE service access points, and these access points are in the state of being distributed in the blockchain network. The service demander is to request the TEE to provide the security service, and can also access the blockchain network from the TEE service access point. The service demander requests the service from the TEE service access point, and then the server of the access point selects one TEE accessed at the present access point, to provide services. The selection strategy is not limited. For example, it is possible to dynamically and randomly select one currently online and idle TEE to provide services, or select according to some preset load balancing policies. If there is no idle TEE locally at the access point, the server of the access point can also forward the request to other access points. In particular, if the service demander is also the service provider, for example, the terminal device used by the user is also provided with a TEE (that is, the terminal device itself is also a TEE device), then the terminal device can also directly request the security service from the TEE provided in the terminal device itself, without going through the TEE service access point, unless the TEE provided in the terminal device itself is in a non-idle state.

In one implementation, with the help of the distributed computing characteristics of the blockchain, the service demander has the right to independently decide which TEE service access point the security service is requested at, and which access point the service request is initiated at, that is, the service results are obtained at this access point. This helps prevent the central organization from doing bad things of a certain type. Since there may be plural service demanders requesting the security service at the same TEE service access point at the same time and however only idle TEEs can provide the security service, it may take a long time (such as several minutes) from the timing of sending the service request to the timing of obtaining the response, and therefore in an optional solution, the initiating of the service request and the obtaining of the service results can be implemented asynchronously. The service demander, after sending the request to the server of the access point, can perform other tasks without waiting for the result returned by the server. The server, after forwarding the service request to the TEE device, collects and stores the service results returned by the TEE device, and the service demander can periodically check on the server whether the service results have been obtained until the results are obtained or it is overtime.

In the blockchain network, the TEE service access point is responsible for providing the functions of scheduling and forwarding messages. In an embodiment, the service request, which is sent by the service demander to the TEE service access point, can be asymmetrically encrypted using the public key of the first account provided by the TEE or symmetrically encrypted using ECDH negotiation key. In the TEE, the private key of the first account or ECDH negotiation key is used to decrypt the request and then the corresponding service is provided, wherein the first account of the TEE is constituted by a public-private key pair, which can represent the identity of the TEE as a security service administrator. Of course, it does not rule out representing other identities. In addition, in content of the request, it is also possible to specify a key for encrypting the service result. After the TEE completes the service calculation, it symmetrically encrypts the returned service result using this key and returns it. Because the sent service request and the returned service results are all ciphertext, the TEE service access point or others cannot detect the content of the exchanged messages in the process of scheduling and forwarding messages. In other words, the TEE provides the security service for the service demander in a black-box manner, which is very secure.

The above-mentioned TEE providing the security service in a black-box manner can also solve the problem related to the power source of providing the services. Distributed services are beneficial to improving fairness, security and stability. Otherwise, centralized services are easy to encourage the central institution to do bad things, and they are also vulnerable to single-point attacks. A better way to construct the distributed services is to provide economic benefits for everyone to share their TEE, which is similar to the way of the blockchain providing the mining rewards to miners. In the black-box mode, the messages outside the TEE are all ciphertext, which is difficult to be forged and attacked. Therefore, the statistical function for the number of service calls can be added in the TEE, and it can be periodically or aperiodically aggregated and sent to the blockchain operators or the mining pool operators in exchange for corresponding remuneration (its type comprises but is not limited to digital currency, points and physical rewards issued on the blockchain), such remuneration can motivate more people to contribute their own TEE as a security service provider. Further, the statistical information of the number of calls, transmitted from the TEE, can be signed using the private key of the first account of the TEE, to ensure the authenticity of the information. In addition, this statistical information can also be recorded in the blockchain, which is easy for verification at any time.

In some implementations of the blockchain, in addition to providing the security service, the TEE can also run the consensus algorithms to participate in the competition for bookkeeping rights in the blockchain network, that is, as a miner. In these implementations of blockchain, TEE can provide the security service in a black-box manner. Not only the request for the security service is asymmetrically encrypted using the public key of the first account of the TEE, but also the request for competing bookkeeping rights is also asymmetrically encrypted using the public key of the first account of the TEE (alternatively, both types of requests can also be symmetrically encrypted using the ECDH negotiation key). In such a way, before the TEE decrypting request, the request type cannot be distinguished, so that the service requests cannot be screened, that is, the TEE can only respond to all requests equally. On the contrary, if the request types can be distinguished outside the TEE, service requests can be screened, and only specific types of requests therein are responded to, resulting in that fairness is lacked in the TEE providing the services.

For example, the TEE device, before calling the security service interface provided by the TEE, has already analyzed that a certain request is a security service request, and then it can be filtered out and the calling of the interface is not performed. The motivation is that in some implementations of blockchain, it may require the TEE to provide the security service for free or with only a small amount of remuneration. In short, the benefits obtained by service providers are significantly lower than the benefits of mining on the blockchain using the TEE, and therefore the service providers may hope that the TEE will be used more in response to the request of competing for bookkeeping rights, rather than a security service request. This problem can be avoided by adopting the above black-box method.

For the case of the TEE participating in the competition for the bookkeeping right, if the TEE obtains the bookkeeping right, it needs to transmit the certificate and record it on the blockchain. At this time, if the number of service calls is counted in the TEE, it can also be transmitted along with the certificate, which may later be used as a basis for obtaining the service rewards.

The service of generating the one-way ciphertext key and the service of performing the transfer-encryption on the one-way ciphertext key, provided by TEE, are introduced as follows. As for the service of generating a user card based on an authorization card and the service of generating a user card based on a passport and an authorization card will be explained later when the user card is introduced.

In order to generate an authorization card, the application website needs to obtain a one-way ciphertext key (seeing the description of Step S4 below for its purpose), and the security service provided by TEE also comprise the service of generating a one-way ciphertext key, and therefore the application website can apply for a one-way ciphertext key from the TEE. The process of obtaining the one-way ciphertext key will be first described as follows, and then the meaning of the one-way ciphertext key is introduced.

When needing to obtain the one-way ciphertext key, the application website sends a key generation request to the TEE device. Of course, according to the above description, the key generation request can be sent to the TEE service access point first, and then forwarded to the TEE device by the TEE service access point. However, for the sake of simplicity, the description of request forwarding process is omitted below.

The key generation request comprises the first command word and a plaintext key. Here, the first command word represents that the TEE is requested to provide a service of generating a one-way ciphertext key, and the TEE uses the command word carried in the request to distinguish security service requests for different purposes. According to the above description, if the TEE provides the security service in a black-box manner in some embodiments, the key generation request may be asymmetrically encrypted using the public key of the first account of the TEE or symmetrically encrypted using ECDH negotiation key, and the key generation request may also comprise the first result encryption key, and the first result encryption key is used for the TEE to encrypt the generated one-way ciphertext key (that is, the returned service result).

After receiving the key generation request, the TEE device can call the security service interface provided by the TEE and transfer the request to the TEE. The TEE can provide a unified interface for all the security services, and then identify the requests for different purposes within the TEE, to avoid the TEE device from identifying the purpose of the requests.

The TEE, after obtaining the key generation request, determines, according to the first command word therein, that the service of generating a one-way ciphertext key is to be provided, and then the content of the service is executed, wherein the TEE uses a specific key to encrypt the plaintext key in the key generation request, to obtain a one-way ciphertext key, and the specific key can be pre-provided in the TEE. Herein, if the key generation request is asymmetrically encrypted using the public key of the first account of the TEE or symmetrically encrypted using ECDH negotiation key, the TEE needs to first decrypt the request using its own private key of the first account or ECDH negotiation key, and then parse the content of the request.

After executing the content of the service, the TEE transfers to the TEE device the one-way ciphertext key as the returned result of the calling of the security service interface. The TEE device returns the one-way ciphertext key to the application website, and the application website obtains the one-way ciphertext key. Here, if the key generation request comprises the first result encryption key, the TEE needs to perform the symmetric encryption on the key before returning the one-way ciphertext key to the TEE device, and the application website, after receiving the encrypted one-way ciphertext key, is also necessary to use the first result encryption key for performing the decryption.

On one hand, the specific key used by the TEE generating the one-way ciphertext key is only used in the TEE and will not be leaked to the outside of the TEE. On the other hand, the TEE only provides to the outside the service of encrypting the plaintext key into the one-way ciphertext key and however does not provide to the outside the service of decrypting the one-way ciphertext key back to the plaintext key. Due to the asymmetry of encryption and decryption capabilities, this type of key is called as "one-way ciphertext key". The one-way ciphertext key cannot be decrypted outside the TEE, but can be temporarily decrypted back to the plaintext key for some specific purposes within the TEE. However, it will never provide to the outside of the TEE any capacity of decrypting the one-way ciphertext key. It will also not transfer the plaintext key obtained by the temporary decryption to the outside of the TEE.

The one-way ciphertext key has the effect of asymmetrically converting information. The party who obtains the one-way ciphertext key can safely provide it for others for use, and others cannot reversely derive the plaintext key from the one-way ciphertext key. As the extreme case, the one-way ciphertext key is transferred to the TEE to undergo operations with certain specific purposes. However, even if the TEE temporarily decrypts the one-way ciphertext key, the plaintext key will not be transferred to the outside of the TEE, and therefore the outside cannot obtain the plaintext key.

After generating the one-way ciphertext key, the TEE can convert it into a suitable form to facilitate the input and use of the key. For example, the one-way ciphertext key can be subjected to the Base64 encoding, and converted into a character string composed of printable characters.

The TEE also provides a service of performing the transfer-encryption on the one-way ciphertext key, which is used for the party that obtained the one-way ciphertext key to verify whether the one-way ciphertext key can work normally. For example, after obtaining the one-way ciphertext key, the application website can encrypt an original plaintext by using the plaintext key corresponding to the one-way ciphertext key, to obtain the original ciphertext corresponding thereto. Then, the application website sends a request of transfer-encryption to the TEE device, wherein the request of transfer-encryption comprises the second command word, one transfer-encryption key, a one-way ciphertext key, and the above-mentioned original ciphertext. Here, the second command word indicates that the TEE is requested to provide a service of performing transfer-encryption on the one-way ciphertext key.

The TEE, after obtaining transfer-encryption request, according to the second command word therein, determines that transfer-encryption service of the one-way ciphertext key is to be provided, and then the content of the service is executed, wherein the TEE uses first the specific key to decrypt the one-way ciphertext key to obtain the plaintext key, and then uses the plaintext key to decrypt the original ciphertext to obtain original plaintext corresponding thereto, and finally encrypts the original plaintext with the transfer-encryption key in the transfer-encryption request, to obtain the verification ciphertext. It can be seen that this process is to convert the original plaintext from one ciphertext state to another ciphertext state, and therefore it is also called transfer-encryption. Herein, if the transfer-encryption request is asymmetrically encrypted using the public key of the first account of the TEE or symmetrically encrypted using ECDH negotiation key, the TEE needs to first decrypt the request using its own private key of the first account or ECDH negotiation key, and then parse the content of the request.

After executing the content of the service, the TEE transfers to the TEE device the verification ciphertext as the returned result of the calling of the security service interface, and the TEE device returns the verification ciphertext to the application website. After the application website obtains the verification ciphertext, it first uses the transfer-encryption key to decrypt the verification ciphertext to obtain the verification plaintext, and then judges whether the original plaintext and the verification plaintext are the same. If they are the same, it means that the one-way ciphertext key can work normally, and otherwise, it means that the one-way ciphertext key cannot work normally. The essence thereof is to judge whether the plaintext key corresponding to the one-way ciphertext key can be encrypted and decrypted normally.

It should be pointed out that since the returned result of the transfer-encryption service of the one-way ciphertext key is originally in the ciphertext state, there is no need to worry about the exposure of the content, and therefore it is possible that the transfer-encryption request does not carry the key used to the returned result of the encryption service, but in practice, in order to facilitate the unified processing, for example, each of service requests comprises a fixed field, and it is also possible to carry the key used to the returned result of the encryption service through this field in the transfer-encryption request. At this time, TEE can also perform the unified processing, using the key to encrypt the verification ciphertext again.

According to the foregoing, in some embodiments, the TEE may also count the number of times of calling for the service of generating a one-way ciphertext key and/or the service of performing transfer-encryption on a one-way ciphertext key, and transmit to the outside the counted result when appropriate, as the basis for the service provider receiving the rewards.

With the above content as a basis, FIG. 4 can be continuously introduced below. FIG. 4 shows a schematic diagram of a method for applying and using a user card provided by the present disclosure. Referring to FIG. 4, the method involves the following participants: a terminal device, a management website, a TEE device, and an application website. These participants have been introduced in the foregoing and will not be repeated.

The present disclosure provides two ways to access the application website, which are respectively registering or logging in to the application website using a passport, and logging in to the application website using a user card. The former method has been introduced above. In this method, it is possible to only use the passport and the user card is not involved at all. In the latter method, both the passport and the user card are used. Since the user card is issued by the TEE by means of providing the security service (seeing the description of Step S5 below), it has relatively high security (it is possible to further provide the distributed security service with the help of the blockchain so as to further improve the security). Therefore, in situations with relatively high security requirements, the application website can require users to log in mainly using the user card. Although the passport still has its value, it is restricted to be used for two purposes, wherein the first one is to register on the application website (seeing the description of Step S2 in the foregoing); and the second one is to apply for an authorization card after logging in to the application website (seeing the description of Step S4 below), wherein after logging in using the passport, other operations are restricted or completely prohibited (if it is desired to perform other operations, it is possible to log in again using the user card and then operate). The steps shown in FIG. 4 comprise the following steps.

Step S0, the user registers the disclosable real-name account on the management website through the terminal device, and the management website performs true-name authentication on the user.

Step S1, the user applies for a passport to the management website through the terminal device, and after the management website verifies it is correct, a passport is issued to the user.

Step S2, the user registers on the application website using the passport through the terminal device, and after the application website verifies it is correct, an account is registered for the user.

Step S3, the user logs in to the application website using the passport through the terminal device, and after the application website verifies it is correct, the user is allowed to log in with the account.

Steps S0 to S3 in FIG. 4 are basically the same as steps S0 to S3 in FIG. 1, therefore it will not be repeated. Only the verification root code of the passport needs to be described, wherein if the solution in FIG. 1 is adopted (accessing the application website only using a passport), the verification root code of the passport does not need to be calculated in Step S1, and even the passport does not need to contain this information item, because the solution in FIG. 1 does not involve the affiliation verification (seeing the following for the specific meaning of the affiliation verification). If the solution of FIG. 4 is adopted (using the passport and the user card to access the application website), in some implementations of the affiliation verification, the verification root code of the passport may need to be calculated, and the calculation method can be the method given when introducing Step S1. When introducing Step S1, the calculation of the verification root code of the passport is explained mainly for the sake of simplicity.

Step S4, after the user logs in to the application website using the passport, the user applies for an authorization card to the application website, and the application website issues an authorization card to the user.

In the solution of the present disclosure, applying for a user card comprises two stages. In the first stage, the user applies for an authorization card to the application website, and in the second stage, the user applies for a user card to the TEE using the authorization card (and some other information). The authorization card is a verifiable certificate, that is, the certificate for the user to apply for a user card to the TEE. The authorization card contains information related to authorization. The application website expresses its identity based on a public-private key pair, and uses the private key to sign the information in the authorization card, indicating the approval or authorization on the signed information, and its public key can be used by all parties to verify the authenticity of the signature.

The logged-in user can either apply for an authorization card for itself (that is, in order to log in, by itself later, to the application website using the user card, which is applied for using the authorization card), or apply for an authorization card for others (that is, in order to log in, by others later, to the application website using the user card, which is applied for using the authorization card). The former method is the so-called authorization which is mentioned above when analyzing several key problems to be solved in the present disclosure, and the latter method is the so-called sub-authorization mentioned above. The "itself" or "others" mentioned here, i.e., the authorized object, is called as the target user in many occasions below.

Step S5, the user applies for, through the terminal device, a user card, to TEE provided on the TEE device, and after the TEE verifies that it is correct, the user card is issued to the user.

Obtaining a user card is equivalent to obtaining an identity recognized by the TEE. This identity belongs to the target user and is directionally used for the application website limited by the authorization card. If the application and issuance of the user card are realized by means of the blockchain, such an identity can also be called as an on-chain identity, that is, it is the identity recognized by the blockchain system. It should be pointed out that both the application for an authorization card and the application for a user card can be completed by the currently logged-in user, regardless of whether the user card is ultimately used by the user itself or others.

In some embodiments, the authorization card can be valid for a long time or even permanently, that is, when the authorized objects are the same and the authorization scope is unchanged, Step S4 can be performed only a few times or even once, while Step S5 can be executed repeatedly for multiple times, for example, when the user wishes to log in to different application websites using different avatar accounts.

Step S6, the target user logs in to the application website through the user card, and after the application website verifies that it is correct, the target user is allowed to log in with the account.

Step S7, after the user logs in to the application website using the user card, the user applies for an authorization card to the application website, and the application website issues an authorization card to the target user.

Step S7 is similar to Step S4, wherein the user can apply for an authorization card regardless of whether the user logs in using a passport or a user card. At the same time, for the target user who was originally sub-authorized, in most cases, it is not allowed that this target user authorizes others (that is, it is not allowed to apply for an authorization card), and at this time, it can be considered that the user in Step S7 and the user in Step S4 are the same user.

Steps S4 to S7 are further described below in conjunction with FIG. 4. Referring to FIG. 4, Step S4 may comprise the following steps.

Step S40, the terminal device sends an authorization card application request to the application website.

Step S41, the application website performs the authorization card application verification according to the authorization card application request.

Step S42, the application website generates an authorization card.

Step S43, the application website sends an authorization card to the terminal device.

Steps S40 to S43 are described in combination. In the case that the user has logged in to the application website using the passport, an authorization card application request can be sent to the application website through the terminal device. The authorization card application request comprises at least the identifier of the target account. The target account is the account owned by the target user. When the target user subsequently uses the user card to log in to the application website, the user card records the public key of the target account, and what is logged in is also the target account.

In the solution of the present disclosure, the target account represents the autonomous identity of the target user, which may be specifically in form of a public-private key pair, wherein for the case in which the target user is the user itself who applies for the authorization card, the target account can be an avatar account derived from the undisclosed real-name account of the target user; and for the case in which the target user is not the user itself who applies for the authorization card, the target account can be provided by the target user to the user applying for the authorization card, and for example, it can be an avatar account of the target user, but in fact, at this time, the user who applies for the authorization card does not need to care about the generation path of the target account.

The identifier of the target account not only comprises the information of the target account, but also can distinguish, through the identifier, whether the user applies for the authorization card for the user itself or others.

For example, in the first implementation, the identifier of the target account is either based on the derivation path of deriving the target account from the undisclosed real-name account of the user, or based on the public key of the target account. If it is the path, it represents that it is authorized to user itself, and if it is the public key, it represents that it is authorized to others. It should be pointed out that if the identifier of the target account is a derivation path, it does not mean that at this time, the authorization card application must be initiated only after deriving the target account from the undisclosed real-name account of the user. The derivation of the account can be performed when applying for the user card (for details, seeing the description of Step S5 later).

As another example, in the second implementation, the identifier of the target account is based on an empty character string, or the public key of the target account. If it is the empty character string, it represents that it is authorized to user itself, and if it is the public key, it represents that it is authorized to others. In some solutions, the application website does not need to know the specific target account when issuing the authorization card (in the case of non-sub-authorization), but it is necessary to know whether the applied authorization card is to be used for the user itself or others. Therefore, transferring of an empty character string does not affect the application of the authorization card, which is however beneficial to the reduction of the leakage of user privacy.

Of course, the first implementation and the second implementation can also be combined together. For example, the authorization card application request comprises the identifier of the target account, which is a fixed field, into which the derivation path, an empty character string, or the public key can be filled. If what is filled in is any one of the first two, it is considered as being authorized to the user itself, and if the third one is filled in, it is considered as being authorized to others.

As another example, in the third implementation, the identifier of the target account can be divided into two parts, wherein the first part is the public key of the target account. If authorized to oneself, it is the public key of the avatar account derived from the undisclosed real-name account of the user. If authorized to others, it is the public key of an account provided by the target user. Since the first part is the public key in both cases, it is impossible to distinguish whether it is authorized to oneself or others only through the first part. The other part is the distinguishing symbol, which can have two different values. For example, the value is 0 which means it is authorized to oneself, and 1 means it is authorized to others.

Of course, there are many ways to realize the identifier of the target account, and which will not be explained one by one here.

According to requirements, the authorization card application request may also comprise one or more of the following information items: the time-period category of the authorization card, the target time of the authorization card, the validity period of the authorization card, the target user's group, and the task of the target user. If the implementation is going smoothly, the above five information items (if any) will be recorded in the authorization card, and finally recorded in the user card, therefore these information can be regarded as representing the scope of rights that the user wants to obtain, and for example, the validity period of the authorization card expresses the validity period of the user card which it is desired to obtain, the target user's group expresses the group which the target user is desired to obtain, and so on, and their specific uses will be described later. The authorization card application request may only contain the required information items, and the remaining information items are not presented at all, or the authorization card application request may also be in a fixed format. For example, each information item possibly contained is presented as a corresponding field. If a certain information item needs to be used, the value of the corresponding field is not null, and otherwise the value of the corresponding field is null.

Herein, the target user's group is used to mark the grade granted to the target user on the application website, and mark whether the target user is the user itself or others who apply for the authorization card. The task of the target user is used to describe the operations which the target user is authorized to perform on the application website. The group and the task are attributes given to user by the application website. The concepts of the two are briefly introduced as follows.

Application websites provide to the outside the services based on resources (such as computing resources, storage resources, etc.), and the services often need to be divided to service levels. The better the service provided is, the higher the remuneration that the user may need to pay is. The division of service levels also means that users are grouped (because each user has its own subordinate level). However, the act of dividing to the service levels can easily allow application websites to lock specific users and implement data mining, thereby easily infringing on the user privacy. For example, as an extreme case, the number of service levels divided by the application website is not limited. Assuming that the application website uses a 4-byte unsigned integer to group the users, there can theoretically be about 4.2 billion groups, so that the application website can assign a unique group to each user, so that no matter what account the user uses to log in, the user can be precisely locked through the grouping information, so as to achieve the accurate data mining and analysis.

Therefore, in the solution of the present disclosure, certain requirements can be placed on the application website to limit the maximum number of service levels it can divide. For example, users can be grouped only by 1-byte unsigned integer, that is, as for each user, the grouping information of 1 byte is correspondingly stored, which indicates the service level to which it belongs, with a maximum of 256 groups (with a value of 0~255) to prevent the excessive mining of user privacy information.

The grouping information can also be used to distinguish whether a certain user is an authorized user or a sub-authorized user. For example, if the highest position of the grouping information of 1-byte is 0, it is indicated that the user is an authorized user (with a value of 0~127), and if the highest position is 1, it is indicated that the user is a sub-authorized user (with a value of 128~255). Alternatively, it can also be considered that the first 128 groups belong to the authorized users, and the last 128 groups belong to the sub-authorized users.

In the authorization card application request, the information item of the target user's group can be filled according to the description of the grouping information above.

In most cases, tasks are used in conjunction with groups, because users of the different groups are allowed by the application website to perform different operations.

For example, if a certain user is an authorized user, it can read and write to its own network disk space on the application website. If a certain user is a sub-authorized user, it can only read the specified directories in the network disk space (e.g., the user A grants the right to use its own network disk to the user B, allowing the user B to download specific files therein, but not allowing it to perform other operations). Of course, for different authorized users, the grouping may also be different. For example, the network disk download speed limit of ordinary authorized users is 200 k/s, and the network disk download speed limit of VIP users is 10 M/s.

In the authorization card application request, the information item of the task of the target user can be filled with the description information of the item that the application website allows the target user to perform. For example, it can be the text description of the item, or it can be the code of the item. The application website can learn the operation which the target user can do, according to the code. If the target user is the user itself who applies for the authorization card, generally speaking, the user will not take the initiative to reduce its authority and limit itself to only perform certain specific operations. Therefore, at this time, the task of the target user can be forced to be filled in an empty character string, indicating that there is no restriction, or indicating that it has all the permissions below the current user level. In addition, filling in an empty character string also helps to avoid the revealing of user privacy.

As another example, when handling the traffic accident insurance claims, the driver should first register an account on the website of the Traffic Management Bureau (application website), and he or she authorizes the representative of the insurance company (that is, the sub-authorized user) to go to the website of the Traffic Management Bureau to check the details of a certain traffic accident related to him or her, or allows the representative of the insurance company to request a responsibility confirmation for a traffic accident (it can be a verifiable certificate, in the format complying with the W3C Verifiable Credential specification). In the authorization card application request initiated by the driver, the target user's group indicates that the representative of the insurance company can only log in and access the Traffic Management Bureau website at the certain level of a sub-authorized user, and the task of the target user indicates that the authorization card can only be used in a certain specific task (such as, traffic accident claims). Once the Traffic Management Bureau website issues an authorization card to the driver according to the authorization card application request of the driver, the authorization scope defined by the target user's group and the task of the target user will take effect, and the representative of the insurance company can log in to the website of the Traffic Management Bureau using the user card which is further applied for based on the authorization card, and perform the limited operations that are allocated to it.

Further, in the information item of the task of the target user, necessary parameters can also be attached, and the item description and these parameters can be filled according to the preset format. For example, the item and the parameter are separated by a colon, and individual parameters are separated by a semicolon, etc. For example, in the task, "Traffic Claims: Accident Responsibility Confirmation", "Traffic Claims" is an item, and "Accident Responsibility Confirmation" is a parameter.

The user's group and/or task may change. For example, if a certain user was originally a normal user, but was later upgraded to a VIP user, and its level was improved, and the it must apply for a new authorization card and fill new grouping information into the request.

As mentioned in the introduction of Step S1 above, the passport may also contain the information item of the user's group, and its value may be set as 0 or other fixed value uniformly, indicating that the users are not grouped. Of course, if the application website wants to group the users, the grouping information can also be submitted in the request when applying for a passport, but sometimes this is not necessary, especially in the scenario of FIG. 4. First of all, the passport is only used by the applicant itself. There is no sub-authorization situation, and therefore there is no need to distinguish the authorized user and the sub-authorized user by grouping. Secondly, in some implementations of FIG. 4, the use of passports is likely to be limited (only used for registration and application for authorization cards). It is not meaningful to distinguish user levels as for such limited operations.

After receiving the authorization card application request, the application website can use the authorization card application request to verify the authorization card application, and the verification content comprises but is not limited to one or more of the following items.

(1) The authorization card application request contains the identifier of the target account. According to the identifier, it can be distinguished whether the target user is the user itself who applies for the authorization card or someone else. The description of the identifier of the target account above may be referred to for the determination method. At the same time, if the authorization card application request also comprises the information item of the target user's group, it can also be distinguished, through the target user's group, whether the target user is the user itself who applies for the authorization card or someone else. The application website can verify whether the determination results of the two are consistent with each other, wherein if consistent, the verification is passed, and otherwise it is not passed.

(2) If the authorization card application request contains two information items, i.e., the target user's group and the task of the target user, it is possible to verify whether the format meets the requirements, such as whether the specified separator is used between the item and the parameter, and between parameters, wherein if it meets the requirements, the verification is passed, and otherwise it is not passed.

(3) If the application website determines that the authorization card is applied for user itself and the authorization card application request also contains the information item of the task of the target user, then the application website can check whether the task of the target user is an empty character string. It has been mentioned that in some embodiments, in this case, it is mandatory that the task of the target user must be set as an empty character string, so as to avoid the leakage of the user privacy. If it is an empty character string, the verification is passed, and otherwise it is not passed.

(4) If the authorization card application request contains two information items, the target time of the authorization card and the validity period of the authorization card, the application website can verify whether the settings of the two are reasonable, for example, the validity period cannot be set too long to exceed the limit of the application website. If it is reasonable, the verification is passed, and otherwise it is not passed.

If all verification items are passed, the application website can organize several information items to generate an authorization card. If verification of a certain verification item is not passed, then the application website can also inform the user that the application for an authorization card has failed, and can further inform the user of the reason for the failure of the application. It can be understood that the verification sequence of the above verification items is not limited, and if verification of a certain verification item is not passed, the remaining verification items that have not been executed may not be executed any more.

If the operation of distinguishing whether the target user is the user itself applying for the authorization card or someone else is not performed during the verification process, it is possible to first determine whether the target user to be authorized is the user itself applying for the authorization card or someone else based on the identifier of the target account, and then generate the authorization card, because the generation of some information items in the authorization card is related to the determination result.

The authorization card at least comprises the public key of the owner account of the authorization card, the public key of the account of the application website, and the signature which is made for the authorization card by the application website using its own private key of the account. According to requirements, the authorization card can also comprise one or more of the following information items: the verification root code of the authorization card, the identifier of the application website, the target user's group, the time-period category of the authorization card, the target time of the authorization card, the validity period of the authorization card, the resource identifier allocated to the user by the application website, the task of the target user, and the seed cipher of the authorization card.

Here, if the target user is the user itself who applies for the authorization card, the owner account is the account which is currently logged in by the user through the passport (if the user currently logs in through the user card, seeing Step S7), since the user is in the login state when applying for the authorization card, the application website must be able to obtain the public key of the account; and if the target user is someone else, the public key of the owner account of the authorization card is the public key of the target account, that is, at this time, it is the identifier of the target account carried in the authorization card application request.

The account of the application website is constituted by a public-private key pair, which may represent the identity of domain administrator of the application website. Of course, it does not rule out representing other identities. The object of its signature can be other information in the authorization card except the signature itself. The public key of the account of the application website can also be carried in the authorization card for the signature verification.

If the target user is the user itself who applies for the authorization card, the verification root code of the authorization card is the verification root code in the passport used when the user is currently logging in (if the user is currently logging in through the user card, seeing Step S7). As mentioned earlier, after the user successfully logs in, the application website will save the passport or the preset information items in the passport, and therefore the verification root code in the passport can be obtained by the application website. If the target user is someone else, the verification root code of the authorization card is calculated based on the public key of the disclosable real-name account of the user and the public key of the target account. For example, the verification code can be calculated after splicing the above two information items, as the verification root code of the authorization card.

The identifier of the application website is filled by the application website itself. For example, it can be the name which is given by the application website to itself. The resource identifier allocated to the user by the application website is bound with the public key of the account which the user logs in, and the application website can obtain it.

The time-period category of the authorization card, the target time of the authorization card, the validity period of the authorization card, the target user's group, and the task of the target user are obtained from the authorization card application request.

Before introducing the seed cipher of the authorization card, first the concept of the security code (Secret) is introduced.

In the present disclosure, the control right, that the application website authorizes to the outside to provide services, is summarized as a security code, and the security code may be a character string that is not disclosed to the outside. In short, if the serviced person holds this security code, it means that he or she has the right to enjoy the services provided by the servicer. For example, an Enterprise X develops a WeChat APP, and builds a backend server used for the APP. When the server is running, it will call some resources provided by WeChat. At this time, the background of WeChat and the server of Enterprise X can agree to use one security code. If the server holds the security code same as the one stored in the WeChat background, it means that it has the right to access the resources. In practice, it is easy to leak the secret if the security code is directly transmitted or held by the serviced one, and therefore the security code may be appropriately converted in form (such as, encryption or other operations).

In the present disclosure, in order to make the authorization process more convenient and secure, a security code mechanism is also introduced. In short, the information of the security code is included in the information item of the authorized seed cipher. When applying for a user card according to the authorization card, the information of the security code is integrated into the time-period unique code of the user card (seeing the description of step S5 below), so that the application website can verify the security code when the user logs in through the user card.

Specifically, the seed cipher of the authorization card may comprise the one-way ciphertext key and the ciphertext of the security code. Here, the ciphertext of the security code is obtained by encrypting the plaintext of the security code using the plaintext key corresponding to the one-way ciphertext key, and the one-way ciphertext key is generated by the TEE providing the security service, as described above. Since the security code in the seed cipher is in the ciphertext state, there is no need to worry about the leakage of the security code. According to the definition of the one-way ciphertext key, to obtain the plaintext of the security code, the seed cipher must be transferred to the TEE. The TEE first decrypts the one-way ciphertext key to obtain the plaintext key, and then uses the plaintext key to decrypt the ciphertext of the security code in the seed cipher. Since the TEE itself is a security environment, there is no security problem even if the plaintext of the security code is exposed in the TEE. When applying for a user card later, the authorization card will be transferred to the TEE, and the seed cipher will also be transferred into the TEE at the same time.

The purpose of each information item in the authorization card will be explained in detail later when it is used. The authorization card can only contain the required information items, and the remaining information items are not presented at all, or the authorization card can also be in a fixed format. For example, each possible information item is presented as one corresponding field. If a certain information item is to be used, the value of the corresponding field is not null, and otherwise the value of the corresponding field is null. After the application website generates the authorization card, the authorization card is sent to the terminal device, as the certificate of the user card, which is applied for the user applying for the authorization card, to the TEE provided on the TEE device, for being used by the target user.

The user logging in using the passport and the user applying for the passport can be two processes independent relatively. For example, the user first logs in to the application website using the passport, and will apply for the authorization card only when the user card is required. However, it is not excluded that in some solutions, these two processes are executed continuously. For example, a piece of code logic is built in the login page of the application website. After the terminal device accesses the page, the code logic will be executed, wherein the passport is submitted to the application website for login, and the authorization card is automatically applied for after logging in. Users can complete the login using a passport and applying for an authorization card directly with one click without being aware of the process of applying for an authorization card, which is more user-friendly in operation.

After obtaining the authorization card, the user can apply to the TEE for a user card for logging in to the application website. According to the difference in the submitted information, the Step S5 of applying for a user card comprises at least two implementation modes, which are respectively shown in FIG. 4, wherein the first mode is of applying for a user card based on the authorization card and some other information, and the second mode is of applying for a user card based on the authorization card, the passport and some other information. TEE also provides corresponding two security services, namely, the service of generating a user card based on the authorization card and the service of generating a user card based on the passport and the authorization card, for responding. The specific process is as follows.

The first implementation of Step S5 of applying for a user card may comprise the following steps.

Step S50a, the terminal device sends a first user card application request to the TEE device.

Step S51a, the TEE provided on the TEE device provides the service of generating a user card based on the authorization card according to the first user card application request.

Step S52a, the TEE device sends the user card to the terminal device.

Steps S50a to S52a are described in combination. After the user applies for and obtains the authorization card, the user can send a first user card application request to the TEE device through the terminal device. The first user card application request comprises at least the third command word, the authorization card and the identifier of the target account.

Here, the third command word indicates that the TEE is requested to provide the service of generating a user card based on the authorization card. If the target user targeted by the user card (that is, the user who will use the user card to log in to the application website) is the user itself who has obtained the authorization card (that is, the user itself who applies for the user card), an avatar account is derived from the undisclosed real-name account of the user on the terminal device, as the target account of the target user. The derivation method has been described above. At the same time, the derivation path of deriving the avatar account is used as the identifier of the target account. If the target user targeted by the user card is someone else, the public key of the target account provided by the target user is used as the identifier of the target account.

Further, if the target user is the user itself who has obtained the authorization card, the first user card application request also comprises the public key of the undisclosed real-name account, the chain code of the undisclosed real-name account, and the derivation path of the owner account of the authorization card. The derivation path of the owner account of the authorization card can be obtained as follows.

According to the above description, the disclosable real-name account can be derived from the undisclosed real-name account, and the relative path between the two is fixed. If the user logs in through the passport when applying for the authorization card, the owner account of the authorization card is an avatar account derived from a disclosable real-name account. The derivation path for deriving the avatar account from a disclosable real-name account is a derivation path that uses the disclosable real-name account as the derivation starting point. After the derivation path is spliced with the relative path between the two real-name accounts, a derivation path that uses the undisclosed real-name account as the derivation starting point can be obtained by the conversion, and the path obtained by the conversion is determined as a derivation path of the owner account of the authorization card. For example, the derivation path of the undisclosed real-name account (with the root account m of the HD wallet as the derivation starting point) is m/44'/0'/0'/0/0, and the derivation path of the disclosable real-name account is m/44'/0'/0'/0/0/0/0, the derivation path of deriving the owner account from the disclosable real-name account is /3, and the relative path between the undisclosed real-name account and the disclosable real-name account is 0/0. After the splicing (splicing with the relative path as the prefix), the derivation path 0/0/3 of deriving the owner account from the undisclosed real-name account (that is, the derivation path of the owner account of the authorization card) is obtained. If the user logs in by means of a user card when applying for an authorization card, the method for calculating the derivation path of the owner account of the authorization card will be introduced in Step S7.

It should be pointed out that the derivation path of the owner account of the authorization card is not necessarily calculated when applying for a user card. For example, it can be calculated just after the user successfully applies for a passport and saved in the local database of the terminal device, and the historical records in the database can be read directly when applying for a user card.

According to requirements, the first user card application request may further comprise one or more of the following information items: the target time of the user card and the second result encryption key.

Here, the target time of the user card represents the time when the user expects that the user card is to be used, and this information item can be set as the value same as the target time in the authorization card, because the target time in the authorization card will eventually be copied to the user card, as the target time of the user card (seeing below) and therefore, the two have the same meaning essentially. This information item is separately added into the first user card application request, which can play a role of verifying the target time in the authorization card. It should be pointed out that the target time of the user card or the target time of the authorization card can be a precise moment. Of course, the user card is not required to be used strictly at this moment. For example, as long as the application website determines that this moment and the timing when the user card is actually used are within the same time period, it is considered that the use of the user card meets the requirements of the target time.

As for the purpose of each information item in the first user card application request that is not mentioned, it will be explained in detail when it is used later. The first user card application request may only contain the required information items, and the remaining information items may not be presented at all, or the first user card application request may also be in a fixed format, and for example, each information item possibly contained is presented as a corresponding field. If a certain information item needs to be used, the value of the corresponding field is not null, and otherwise the value of the corresponding field is null.

According to the above description, if the TEE provides the security service in a black-box manner in some embodiments, the first user card application request may be asymmetrically encrypted using the public key of the first account of the TEE or symmetrically encrypted using the ECDH negotiation key, and the key generation request may also comprise a second result encryption key, and the second result encryption key is used for the TEE to encrypt the generated user card (i.e., the returned service result).

After receiving the first user card application request, the TEE device can call the security service interface provided by the TEE, and transfers the request to the TEE. After the TEE obtains the first user card application request, it determines, according to the third command word therein, that the service of generating a user card using the authorization card is to be provided, and then the content of the service is executed, wherein the first user card application request is used to verify the user card application, wherein a user card is generated if the verification is passed. Herein, if the first user card application request is asymmetrically encrypted using the public key of the first account of the TEE or symmetrically encrypted using the ECDH negotiation key, the TEE needs to first decrypt the request using its own private key of the first account or ECDH negotiation key, and then parses the content of the request.

Here, the verification items of the user card application verification comprise at least one of the following.

(1) TEE uses the public key of the account of the application website in the authorization card to verify whether the signature for the authorization card is correct.

(2) The TEE determines whether the target user is the user itself or someone else according to the identifier of the target account, wherein if the target user is the user itself who has obtained the authorization card, the TEE uses the public key of the undisclosed real-name account carried in the first user card application request, the chain code of the undisclosed real-name account, the identity of the target account, the authorization card, and the derivation path of the owner account of the authorization card to verify whether the owner account of the authorization card belongs to the target user.

Here, item (1) is to verify whether the authorization card is issued by the application website and whether the content of the authorization card has been tampered with. Item (2) of the verification can also be called as the affiliation verification, that is, to verify whether the owner account of the authorization card belongs to the target user, or, in other words, to verify whether the determination result that the user who obtained the authorization card and the target user are the same person is true and credible. The permissions obtained by authorization and sub-authorization are different. As for the former, since it is still operated by the same user (it is operated by a changed avatar account), so that the permissions remain unchanged, while as for the latter, the permission is likely to be reduced. The affiliation verification has the main purpose of ensuring the accuracy of permission assignments. It should be pointed out that if the target user is not the user itself who obtained the authorization card, no affiliation verification is required.

There are different ways to implement the affiliation verification (2), two of which are described below.

Way I

Step A: the TEE uses three items of information, i.e., the public key of the undisclosed real-name account, the chain code of the undisclosed real-name account and the identifier of the target account carried in the first user card application request, to derive the public key of the target account. Since it has been determined that it is the affiliation verification scenario, the identifier of the target account at this time is the derivation path of deriving the target account from the undisclosed real-name account. The public key of the target account will be recorded in the user card which will be generated in the subsequent steps.

Step B: TEE uses the public key of the undisclosed real-name account, the chain code of the undisclosed real-name account, and the derivation path of the owner account of the authorization card to derive the public key of the verification account. According to the definition of the derivation path of the owner account of the authorization card mentioned above, the path is a path with an undisclosed real-name account as the derivation starting point, and therefore the above derivation is feasible.

Step C: the TEE determines whether the public key of the verification account is the same as the public key of the owner account of the authorization card. If same, it means that the owner account of the authorization card can be derived from the undisclosed real-name account. According to step A, the public key of the target account to be recorded on the user card is derived from the public key of the undisclosed real-name account, indicating that the undisclosed real-name account belongs to the target user, and therefore once it is determined that the public key of the undisclosed real-name account can be used to derive the public key of the owner account of the authorization card, it certainly indicates that the owner account of the authorization card also belongs to the target user which is targeted by the user card to be generated, which is also the user who obtained the authorization card. If they are not the same, it means that the owner account of the authorization card does not belong to the target user.

Way II

Step A: the TEE derives the public key of the target account by using the public key of the undisclosed real-name account, the chain code of the undisclosed real-name account, and the identifier of the target account. Step A of Way II is similar to Step A of Way I, and will not be repeated.

Step B: the TEE uses the public key of the undisclosed real-name account, the chain code of the undisclosed real-name account, and the relative path pre-provided in the TEE to derive the public key of the disclosable real-name account. The relative path refers to a derivation path of deriving the disclosable real-name account from an undisclosed real-name account. It has been pointed out above that the relative path can be a fixed path, and therefore it can be pre-configured.

Step C: the TEE calculates the first-verification verification root code according to the public key of the disclosable real-name account and the derivation path of the owner account of the authorization card. For example, the above two information items can be spliced to calculate a verification code as the first-verification verification root code.

Step D: the TEE determines whether the first-verification verification root code is the same as the verification root code of the authorization card. According to the above description, when the target user is the user itself who has obtained the authorization card, the verification root code of the authorization card is the verification root code in the passport used when the user is logging in (if the user logs in using the user card, seeing Step S7 for details), and the verification root code in the passport is calculated based on the public key of the disclosable real-name account of the user and the total derivation path of the avatar account. According to the above definition, the total derivation path of the avatar account is the derivation path of deriving the avatar account from the undisclosed real-name account. Compared with the calculation method of the first-verification verification root code in step C (to ensure that the calculation methods of the two verification root codes are exactly the same), if the two verification root codes are the same, it is indicated that the owner account of the authorization card can be derived from the undisclosed real-name account corresponding to the disclosable real-name account, and the derivation sources of the two are the same undisclosed real-name account. According to step A, the public key of the target account to be recorded on the user card is derived from the public key of the undisclosed real-name account, indicating that the target account to be recorded on the user card and the owner account of the authorization card belong to the same real user, or it is proved that the owner account of the authorization card belongs to the target user targeted by the user card to be generated. Conversely, if the two verification root codes are different, it is proved that the target account and the owner account of the authorization card do not belong to the same real user, or it is proved that the owner account of the authorization card does not belong to the target user targeted by the user card to be generated.

If results of all verification items are "yes", the TEE organizes several information items to generate a user card, and transfers to the TEE device the user card as the returned result of calling the security service interface, and the TEE device returns the user card to the terminal device. Then, the user obtains a user card, which is a verifiable certificate, used to prove that the application website has authorized the target user to use the services provided by the application website by logging in with the target account recorded in the user card (seeing the description of the user card later). In the case of sub-authorization, the user can forward the obtained user card to the target user. Of course, the TEE device can also be required to send the user card directly to the target user, or the target user can be informed where to obtain the user card. Herein, if the first user card application request carries the second result encryption key, the user card returned by the TEE may be encrypted using the second result encryption key.

If the result of a certain verification item is "no", the TEE can also inform the user that the user card application fails, and can further inform the user of the reason for the failure of application. It can be understood that the verification sequence of the above verification items is not limited, and if verification of a certain verification item fails, the remaining verification items that have not been executed can no longer be executed.

The user card at least comprises the public key of the target account and the signature which is made for the user card by the TEE using its own private key of the second account. According to requirements, the user card also comprises one or more of the following information items: the verification root code of the user card, the identity of the application website, the target user's group, the public key of the account of the application website, the time-period category of the user card, the target time of the user card, the validity period of the user card, the resource identifier allocated to the user by the application website, the task of the target user, the time-period derivation code of the user card, and the time-period unique code of the user card.

Here, if the target user is the user itself who has obtained the authorization card, the public key of the target account can be derived when performing the verification item (2) above; and if the target user is someone else, the target account is the identifier of the target account carried in the first user card application request.

Here, the second account of the TEE is constituted by a public-private key pair, which may represent the identity of the TEE as the user card issuing commissioner. Of course, it does not rule out representing other identities. The second account of the TEE and the first account of the TEE mentioned above may or may not be the same. The public key of the second account of TEE can be disclosed to the public, and anyone has the right to obtain it. With the public key of the second account of TEE, the signature in the user card can be verified to confirm that the user card is indeed issued by TEE and the content of the user card is authentic. As for the signature in the user card, the object of the signature may be other information in the user card except the signature itself.

The verification root code of the user card is calculated according to the public key of the disclosable real-name account of the user and the identifier of the target account carried in the first user card application request. How to derive the public key of the disclosable real-name account has been introduced above in step B of the implementation Way II of verification item (2).

The identifier of the application website, the target user's group, the public key of the account of the application website, the time-period category of the user card, the target time of the user card, the validity period of the user card, the resource identifier allocated to the user by the application website, and the task of the target user are copied from the corresponding information items in the authorization card carried in the first user card application request. For example, the time-period category of the user card is copied from the time-period category in the authorization card, and so on.

The target time of the user card represents the time when the user expects the user card to be used. The validity period of the user card and the target time of the user card form a time period during which the user card is valid. The starting point of the time period is the time when the user expects the user card to be used. Through the target time of the user card, it is represented that the length of the time period is determined by the validity period. The validity period may be in the form of a period of time, or a timing (the ending timing of the period of time). If the time period for which the user card can be used is exceeded (the user card has expired), a new user card must be applied for. For convenience, the user can apply for user cards once that can be used for plural time periods in the future. The target time of the user card can be set as a timing in the future and therefore it supports the operation that the user prepares more than one user card.

It is noted that there is no necessary relationship between the length of the above time-period and the length of the unit time-period corresponding to the time-period category of the user card, but in some embodiments, if the user card does not contain validity period information, it is also defaulted that the unit time-period corresponding to the time-period category of the user card is the validity period of the user card.

The resource identifier allocated to the user by the application website is used to locate resources, and especially in the case of sub-authorization, for example, the user A sub-authorizes the user B to access its network disk space, and the user card used by the user B carries the resource identifier allocated to the user A by the application website. After the user B logs in, the application website can obtain the network disk directory of the user A based on the resource identifier, so that the user B can access the directory with certain operation authority.

The time-period derivation code of the user card is related to the calculation of the time-period unique code of the user card (seeing the description of Step S6 later), and the calculation methods of the two are briefly introduced here.

The time-period derivation code of the user card can be calculated according to the public key of the disclosable real-name account of the user, the specified character string, the time period in which the target time of the user card is located, the identifier of the application website in the user card, and the target user's group in the user card, and the calculation method is not limited. The time period in which the target time of the user card is located can be calculated according to the target time of the user card and the time-period category of the user card (for the specific calculation method, it is possible to refer to the time period in which the target time of the passport is located above).

The time-period unique code of the user card can be calculated according to the security code provided by the application website, the public key of the disclosable real-name account, and the above specified character string.

The derivation method of the public key of the disclosable real-name account has been introduced in the previous section. The security code of the application website is decrypted from the seed cipher of the authorization card (seeing description of Step S4 for the obtaining method), the authorization card is carried in the first user card application request, from which the seed cipher can be obtained.

For example, in one embodiment, the specified character string nonce_string is calculated according to the following formula:

nonce_string=TimeSegment+Domain+Group.

The time-period derivation code TimeSession of the user card is calculated according to the following formula:

TimeSession=hash(OpenPublicKey+nonce_string)^hash(TimeSegment+Domain+Group).

The time-period unique code LoginSession of the user card is calculated according to the following formula:

LoginSession=hash(Secret+hash(OpenPublicKey+nonce_string)).

Here, TimeSegment is the time period in which the target time of the user card is located, TimeSegment is calculated according to the target time of the user card and the time-period category of the user card, Domain is the identifier of the application website, Group is the target user's group, OpenPublicKey is the public key of the disclosable real-name account, hash means the Hash operation, + means the character string splicing, and ^ means the XOR operation (performing XOR, byte by byte).

In the above embodiment, neither TimeSession nor LoginSession contains the plaintext of the Secret, and therefore no one can reversely derive the plaintext of the Secret through the TimeSession and LoginSession, outside the TEE, preventing the Secret from being leaked to the outside of the TEE. In addition, in the calculation process of TimeSession and LoginSession, the character string is generated in combination with OpenedPublicKey and then the Hash value is calculated, which not only locks the disclosable real-name account of the user (even if one user applies for more than one user card using different avatar accounts therein (target account), the user still has only one disclosable real-name account), and at the same time, the disclosable real-name account of the user is isolated through the Hash transformation, so that others cannot determine the correspondence relationship between the avatar account on the user card and the disclosable real-name account of the user, so as to avoid the exposure of the identity of the user.

The nonce_string is used to "sprinkle salt" when performing the Hash calculation, which is helpful for making the calculation result of TimeSession more uncertain, helping to prevent forgery, especially for the situation in which as for the same user, based on the user card used for other application website, the TimeSession field is used for reverse derivation, so as for cracking. In addition, since nonce_string is used to "sprinkle salt", it is also possible to use other deterministic values in some other embodiments.

When the target user logs in to the application website using a user card containing the time-period derivation code and the time-period unique code, the application website will calculate the verification time-period code according to the security code of the application website, the time-period derivation code of the user card, a time period in which a current time of the application website is located, the identifier of the application website, and the target user's group, and verify whether the verification time-period code is the same as the time-period unique code of the user card. The verification time-period code can be calculated in the method which is same or essentially same as that of calculating the time-period unique code of the user card. The time period in which the current time of the application website is located may be calculated according to the current time of the application website and the time-period category of the user card.

For example, if corresponding to the above formula for calculating TimeSession and LoginSession, the verification time-period code LoginSession' is calculated according to the following formula:

$$\text{LoginSession'} = \text{hash}(\text{Secret} + (\text{hash}(\text{TimeSegment'} + \text{Domain} + \text{Group}) \char`\^ \text{TimeSession})),$$

wherein TimeSegment' is the time period in which the current time of the application website is located, TimeSegment' is calculated according to the current time of the application website and the time-period category of the user card, Domain is the identifier of the application website recorded in the user card, and Group is the target user's group recorded in the user card, TimeSession is the time-period derivation code recorded by the user card, hash means the Hash operation, + means the character string splicing, and $\char`\^$ means the XOR operation.

The calculation method of LoginSession' is substantially the same as the calculation method of LoginSession. Considering the situation in which the current time of the application website and the target time of the user card are in the same time period (which can be the time period calculated according to the time-period category of the user card), LoginSession' can be written as:

$$\text{LoginSession'} = \text{hash}(\text{Secret} + (\text{hash}(\text{TimeSegment} + \text{Domain} + \text{Group}) \char`\^ \text{TimeSession})),$$

which is substituted to the calculation formula of TimeSession:

$$\text{TimeSession} = \text{hash}(\text{OpenPublicKey} + \text{nonce\_string}) \char`\^ \text{hash}(\text{TimeSegment} + \text{Domain} + \text{Group})$$

obtaining:

$$\text{LoginSession'} = \text{hash}(\text{Secret} + \text{hash}(\text{OpenPublicKey} + \text{nonce\_string})).$$

This is the same as the calculation formula of LoginSession. Since the calculation method of LoginSession' is substantially the same as that of LoginSession, it is reasonable to compare the two to verify whether LoginSession has been forged. Of course, even if the LoginSession in the user card is not forged, the two are not necessarily equal to each other, because it is likely that TimeSegment'≠TimeSegment, and for example, the time period in which the target time of the user card is located has ended, and the target user is still using the user card to log in, which will be rejected because it cannot pass the verification of LoginSession. At this time, the user can apply for a user card again.

The verification of Secret is also implied in the above process. If the Secret held by the target user (referring to the Secret integrated into the LoginSession) is inconsistent with the local Secret of the application website, it will inevitably lead to different calculation results of LoginSession' and LoginSession. At this time, the application website can reject the login of the user.

The time-period unique code of the user card and the time-period unique code of the passport both contain the public key of the disclosable real-name account and the time-period information (wherein the time-period information of the user card is presented in the specified character string), and therefore its basic function is similar to that of the time-period unique code of the passport, and it can be used for application websites to prevent the same user from logging in with different avatar accounts on the user card during the same time period. Of course, the time-period unique code of the user card, when being calculated, is also in combination with the security code, the identifier of the application website in the user card and the target user's group in the user card, and thus it is richer in connotation. For example, with the above calculation formula as an example, LoginSession' is calculated according to the above formula, achieving at least the following purposes.

(1) The calculation result is related to the Secret. As long as the Secret is not leaked, the calculation result cannot be counterfeited.

(2) The calculation result is related to Domain and Group, thus achieving natural isolation between different application websites (different Domains) and between users of different levels (different Groups).

(3) The calculation result is related to TimeSegment, and different time-periods will affect the calculation of LoginSession (this item is similar to that of the passport).

(4) The calculation result is related to TimeSession, and the calculation of TimeSession is in turn related to the disclosable real-name account of the user. The uniqueness of the disclosable real-name account for the same user is reused, so that the application website can also calculate LoginSession' without knowing the OpenPublicKey.

The Hash operation in the above formulas can also be uniformly changed to a digest algorithm, such as HMAC. For example, the formula in TEE can be replaced by:

LoginSession=hmac(Secret,hash(OpenedPublicKey+ nonce_string)).

The formula in the application website can be replaced by:

LoginSession'=hamc(Secret+(hash(TimeSegment+ Domain+Group)^TimeSession)).

Here, hmac represents the HMAC algorithm, and the meanings of remaining contents are unchanged.

In addition, the splicing of character strings represented by "+" in the above formulas is more flexible, and it is not necessary to perform the splicing in the order in the above formulas. For example, TimeSegment+Domain+Group can also be replaced by Domain+Group+TimeSegment, as long as the order of splicing in all parts of the formula can be kept as being coincident. In addition, several hyphens, such as colons, slashes, etc., can be added when performing the splicing, so as to make it easier to read in debugging situations.

The purposes of individual information items in the user card, if not mentioned, will be explained in detail when it is used later. The user card can only contain the required information items, and the remaining information items are not presented at all, or the user card can also be of a fixed format. For example, each information item contained possibly is presented as a corresponding field. If a certain information item is to be used, the value of the corresponding field is not null, and otherwise the value of the corresponding field is null.

According to the foregoing, in some embodiments, the TEE may also count the number of times of calling the service of generating the user card using the authorization card, and transfer the statistical results at an appropriate time, as a basis for the service provider obtaining the rewards.

The second implementation of Step S5 of applying for a user card may comprise the following steps.

Step S50b, the terminal device sends a second user card application request to the TEE device.

Step S51b, The TEE provided on the TEE device provides, according to the second user card application request, the service of generating a user card based on the passport and the authorization card.

Step S52b, The TEE device sends the user card to the terminal device.

First of all, it should be emphasized that the method of applying for a user card based on a passport and an authorization card can only be used in the situation in which the target user is the user itself who has obtained the authorization card. This method cannot be used to apply for a user card during the sub-authorization.

Steps S50b to S52b are described in combination, because the second method of applying for a user card and the first method of applying for a user card have many similarities, the difference between the two will be mainly described as follows, and the explanation of Step S50a to Step S52a can be referred to for the remaining content. After the user applies for and obtains the authorization card, the user can send the second user card application request to the TEE device through the terminal device. The second user card application request comprises at least a fourth command word, an authorization card, one passport that user applies for, the identifier of the target account, the public key of the disclosable real-name account of the user, and the derivation path of the owner account of the authorization card.

Herein, the fourth command word indicates that the TEE is requested to provide the service of generating a user card based on the passport and the authorization card. The passport which the user applies for can be the one used to log in when the user applies for the authorization card, or it can also be a passport newly applied by the user, which is not limited. If the application is smooth, the public key of the avatar account recorded in the passport will be recorded to the user card, as the public key of the target account of the user card, so that the identifier of the target account is a derivation path of deriving the avatar account in the passport from the disclosable real-name account of the user.

After receiving the second user card application request, the TEE device can call the security service interface provided by the TEE, and transfer the request to the TEE. After the TEE obtains the second user card application request, it determines, according to the fourth command word therein, to provide the service of generating the user card based on the passport and the authorization card, and then executes the content of the service, wherein the second user card application request is used to verify the user card application, and a user card is generated if the verification is passed.

Here, the verification items of the user card application verification comprise at least one of the following.

(1) TEE uses the public key of the account of the application website in the authorization card to verify whether the signature for the authorization card is correct.

(2) TEE uses the public key of the first account of the management website in the passport to verify whether the signature for the passport is correct.

(3) TEE uses the public key of the disclosable real-name account, the passport, an identifier of the target account, the authorization card, and the derivation path of the owner account of the authorization card to verify whether the avatar account in the passport and the owner account of the authorization card belong to the target user.

Here, item (1) is to verify whether the authorization card is issued by the application website and whether the content of the authorization card has been tampered with. Item (2) is to verify whether the passport was issued by the management website and whether the contents of the passport have been tampered with.

Item (3) of verification is the affiliation verification, that is, to verify whether the owner account of the authorization card and the avatar account of the passport belong to the target user. If both accounts belong to the target user, that is, the object authorized by the authorization card is the target user, and at the same time the avatar account in the passport also belongs to the target user, then the public key of the avatar account in the passport is filled into the user card to be generated, as the public key of the target account of the user card, which indicates that the application website has authorized the target user who has the target account to use the service provided by the application website by logging in using the target account, which is reasonable. In the first method of applying for a user card, in the case of authorizing to the user itself, it is necessary to derive an avatar account from an undisclosed real-name account as the target account of the user card. In the second method of applying for a user card, combining with the authentication function of the authorization card, the avatar account in the passport is directly used as the target account of the user card, which is easier to operate. This method can also be called as upgrading the passport to the user card.

There are different ways to implement the affiliation verification item (3), one of which is described below.

Step A: the TEE calculates the second-verification verification root code by using the public key of the disclosable real-name account and the derivation path of the owner account of the authorization card. For example, the verification code can be calculated as the second-verification verification root code after splicing the above two items of information, and then the TEE verifies whether the second-verification verification root code is the same as the verification root code of the authorization card. The verification root code of the authorization card is the verification root code in the passport used by the user when logging in (it is noted that it is not necessarily the same passport as the passport in the second user card application request) (if the user logs in through the user card, seeing Step S7). If the two verification root codes are the same, it means that the owner account of the authorization card can be derived from the disclosable real-name account carried in the second user card application request.

Step B: the TEE calculates the third-verification verification root code by using the public key of the disclosable real-name account and the identifier of the target account. For example, the verification code can be calculated after splicing the above two items of information, as the third-verification verification root code, and then the TEE verifies whether the third-verification verification root code is the same as the verification root code of the passport carried in the second user card application request. If the two verification root codes are the same, it means that the avatar account in the passport carried in the second user card application request can be derived from the disclosable real-name account carried in the second user card application request.

Step C: if the results of the above two verification items are both "yes", it means that the avatar account in the passport and the owner account in the authorization card, carried in the second user card application request, belong to the same disclosable real-name account, and since the avatar account in the passport carried in the second user card application request is the target account to be recorded in the user card, at this time, TEE determines that both the avatar account in the passport and the owner account belong to the target user, and otherwise TEE can determine that the avatar account in the passport and the owner account do not all belong to the target user.

If results of all verification items are "yes", the TEE organizes several information items to generate a user card, and transfers to the TEE device the user card, as the returned result of calling the security service interface, and the TEE device returns the user card to the terminal device. The user then obtains a user card.

The user card at least comprises the public key of the target account and the signature which is made for the user card by the TEE using its own private key of the second account. According to requirements, the user card also comprises one or more of the following information items: the verification root code of the user card, the identifier of the application website, the target user's group, the public key of the account of the application website, the time-period category of the user card, the target time of the user card, the validity period of the user card, the resource identifier allocated to the user by the application website, the task of the target user, the time-period derivation code of the user card, and the time-period unique code of the user card.

Here, the public key of the target account is the public key of the avatar account in the passport carried in the second user card application request, and the verification root code of the user card is also set as the verification root code in the passport, and does not need to be recalculated. The contents of these two items can be copied directly from the passport after confirming the affiliation relationship. The first method of applying for a user card may be referred to for the determination methods of the remaining information items, which will not be repeated.

According to the foregoing, in some embodiments, the TEE can also count the number of times of calling the service of generating a user card based on a passport and an authorization card, and transfer the statistical results when appropriate, as a basis for the service provider obtaining the rewards.

Continuously referring to FIG. 4, Step S6 may comprise the following steps.

Step S60, the terminal device sends a second user login request to the application website.

Step S61, the application website performs the user login verification according to the second user login request.

Step S62, the application website sends a user login response to the terminal device.

Steps S60 to S62 are described in combination. After obtaining the user card, the target user sends a second user login request to the application website, and makes the user card carried in the second user login request. In some embodiments, the target user can also use the private key of the target account to sign the second user login request. Since the user card carries the public key of the target account, the signature can be verified on the side of the application website. The object of the signature may be the content of the second user login request other than the signature itself.

After receiving the second user login request sent by the terminal device, the application website uses the second user login request to perform the login verification, and the verification items comprise at least one of the following:
(1) using the public key of the second account of the TEE to verify whether the signature for the user card is correct;
(2) obtaining the current time of the application website, and verifying whether the current time of the application website is within the time period specified by the validity period of the user card and the target time of the user card;
(3) using the public key of the target account to verify whether the signature for the second user login request is correct;
(4) calculating the verification time-period code according to the security code of the application website in the user card, the time-period derivation code of the user card, a time period in which a current time of the application website is located, the identifier of the application website and the target user's group in the user card, and verifying whether the verification time-period code is the same as the time-period unique code of the user card; and
(5) verifying whether the time-period unique code of the user card is different from the time-period unique code in the user card used by any logged-in user.

Here, item (1) is to verify whether the user card is issued by the TEE and whether the content of the user card has been tampered with.

The precondition to perform the verification item (2) is that the user card comprises the target time and the validity period. Item (2) is to verify whether the user card has expired. As mentioned above, the target time of the user card represents the time when the user expects the user card to be used. If the user card is not used in time after being issued (the current time of the application website is no longer within the time period determined by the target time and validity period of the user card), the user card has expired and the user should not be allowed to continuously use it to log in, so as to ensure safety.

The precondition for the verification item (3) is that the second user login request comprises the signature which is made for the request using the private key of the target account, and the public key of the target account is carried in the user card. Item (3) is to verify whether the target user actually owns the target account and whether the content of the second user login request has been tampered with.

The precondition of the verification item (4) is that the user card contains the time-period unique code, the time-period derivation code, the time-period category, the identifier of the application website and the target user's group. The verification process has been introduced in the previous section, and will not be repeated here. The main purpose thereof is to verify whether the time-period unique code of the user card is forged, verify whether the time period in which the target time of the user card is located has ended, verify the security code, and so on.

The precondition for verification item (5) is that the user card contains the time-period unique code. According to the calculation method of the time-period unique code (referring to the calculation formula of the time-period unique code of the user card above), in the situation that it is the same user (having the same public key of the disclosable real-name account and the same user's group), in the same time period (the same time period in which the target time of the user card is located), in the same website (the same identifier of the application website in the user card), having the same service certificate (the same security code provided by the application website, and e.g., it is possible to provide the same security code for all users), the avatar account is used to apply for more than one user card, wherein the time-period unique codes are exactly the same. Therefore, item (5) is to verify whether there is a same user who attempt to log in to the same application website through different target accounts on multiple user cards during the same time period. If yes, the time-period unique code in the current user card must be the same as the time-period unique code in the user card used by the logged-in user. Whether to perform the verification item (5) depends on the application website.

Comparing the time-period unique code in the passport and the time-period unique code in the user card, it is not difficult to find that there is a certain difference in the calculation methods of the two. Therefore, if the same user logs in respectively through the passport and the user card which it applies for in the same time period, the application website is also difficult to judge whether the two logged-in accounts point to the same person through the time-period unique code. Therefore, one measure that can be taken, as mentioned earlier, is to limit the scope of use of the passport, so that it can only be used to register the application website and apply for an authorization card after logging-in. Of course, if the application website does not verify the time-period unique code, it may also be an allowed behavior for the same user to log in respectively through the passport and the user card which it applies for in the same time period.

If results of all verification items are "yes", the application website sends a user login response to the terminal device to inform the target user that the login is successful. If the result of any one of the verification items (1) to (4) is "no", then the application website may also send a user login response to the terminal device to inform the target user that the login to the website fails, and may further inform the user of the reason for the login failure. It can be understood that the verification sequence of verification items (1) to (4) is not limited, and if verification of a certain verification item fails, the remaining verification items (comprising (5), if (5) exists), which has not been executed, can no longer be executed.

As for (5), it is slightly special. If the verification result thereof is "no", and results of the remaining verification items are "yes" at this time, there are two processing methods: one is to make the logged-in account, mentioned in (5), of the logged-in user log out, and make the target account in the current user card become the new login account of the logged-in user. At this time, since the current user card is successful to log in, the application website can send to the terminal device a response of the successful login; and the other one is to keep the logged-in account of the logged-in user in the logged-in state, and reject the target account in the current user card to log in. At this time, because the current user card fails to log in, the application website can send to the terminal device a response of login failure. It is possible to choose one of the two methods to execute. In a word, both of them ensure that two target accounts in the user cards of the same user, with the same time-period unique code, cannot log in at the same time. It can be understood that the verification item (5) may be performed before or after any one of the verification items (1) to (4).

In addition, if the user successfully logs in, the application website may also save the user card or preset information items in the user card for use in subsequent steps. As for the operation of determining what permission the target user can perform on the application website after the successful login, it can be limited by the user's group and the task of the user in the user card.

In the prior art, when a user logs in to an application website, he or she often needs to input a user name and password. However, in the present disclosure, since the user card already contains the identity information of the target user (the public key of the target account), the login can be achieved just by submitting directly the user card to the application website, which is a completely different way of logging in and is simpler in the user operation.

After obtaining a user card, the user can log in through the user card, and can also apply for a new authorization card in the logged-in state. For the target user who is originally of a sub-authorization, in common cases, it is not allowed to perform the secondary authorization (that is, the user A applies for an authorization card to be sub-authorized to the user B, and the user B applies for an authorization card and secondarily sub-authorizes to the user C the permission which is granted by the user A). Therefore, for the sake of simplicity, it may be considered that the user involved in Step S7 is still the user in Step S4, this user applied for an authorization card in Step S4, applied for a user card based on the authorization card in Step S5, and logs in to the application website by virtue of the user card in Step S6, and then executes Step S7 to apply for a new authorization card. The purpose of the new authorization card is no different from that of the authorization card which is applied for in Step S4.

Continuously referring to FIG. 4, Step S7 may comprise the following steps.

Step S70, the terminal device sends an authorization card application request to the application website (the user has logged in based on the user card).

Step S71, the application website generates an authorization card.

Step S72, the application website sends an authorization card to the terminal device.

Steps S70 to S72 are described in combination. The steps for the user to apply for an authorization card in the mode of logging in based on a user card are roughly the same as the steps for applying for an authorization card in the mode of logging in based on a passport. Therefore, the difference between the two will be mainly described as follows, and the descriptions on steps S40 to S42 may be referred to for the remaining contents.

After the application website receives the authorization card application request, it can use the authorization card application request to verify the authorization card application, wherein an authorization card is generated if it is passed. The authorization card comprises the public key of the owner account of the authorization card. If the target user targeted by the authorization card is the user itself who applies for the authorization card, the owner account is the account which is being currently logged in by the user through the user card (if the user is currently logged in through the passport, Seeing Step S4). Since the user is in the logged-in state when applying for the authorization card, the application website must be able to obtain the public key of the account. If the target user is someone else, the public key of the owner account of the authorization card is the public key of the target account, that is, it is the identifier of the target account carried in the authorization card application request at this time.

In some embodiments, the authorization card may also comprise a verification root code. If the target user is the user itself who applies for the authorization card, the verification root code of the authorization card is the verification root code in the user card which is used by the user when logging in currently (if the user logs in currently through the passport, seeing Step S4). As mentioned before, after the user successfully logs in, the application website will save the user card or the preset information items in the user card, and thus the verification root code in the user card can be obtained by the application website; and if the target user is someone else, the verification root code of the authorization card is calculated according to the public key of the disclosable real-name account of the user and the public key of the target account.

If the user obtains the authorization card through Step S7, when using the authorization card to apply for the user card, there are several details that need to be supplemented.

When applying for a user card, the terminal device needs to prepare a derivation path of the owner account of the authorization card for performing the affiliation verification (thus, the sub-authorization scenario is not needed to be considered for the following content). As mentioned above, if the user logs in through the passport when applying for the authorization card, the owner account of the authorization card is an avatar account derived from the disclosable real-name account, and the derivation path of deriving the avatar account from the disclosable real-name account is a derivation path with the disclosable real-name account as the derivation starting point. After splicing the derivation path with the relative path between the two real-name accounts, it can be converted into a derivation path with the undisclosed real-name account as the derivation starting point. The path obtained by conversion is defined as the derivation path of the owner account of the authorization card.

If the user logs in through the user card when applying for an authorization card, the owner account of the authorization card is an avatar account derived from an undisclosed real-name account. The derivation starting point of the avatar account is originally the undisclosed real-name account, and the derivation path of the avatar account can be directly defined as the derivation path of the owner account of the authorization card. It should be pointed out that the derivation path of the owner account of the authorization card is not necessarily obtained when applying for a user card. For example, it can be saved in the local database of the terminal device after the user successfully applies for a user card, and the historical record of the database can be directly read when applying for a user card.

When applying for a user card based on an authorization card, in step D of the second method of performing the affiliation verification, the TEE will judge whether the first-verification verification root code is the same as the verification root code of the authorization card. The verification root code of the authorization card is the verification root code in the user card which is used when the user logs in, and the verification root code in the user card is calculated based on the public key of the disclosable real-name account of the user and the derivation path of deriving the target account from the undisclosed real-name account (or, it may be copied from a certain passport to be upgraded, which can be analyzed similarly). If the two verification root codes are the same, it means that the owner account of the authorization card can be derived from the undisclosed real-name account. According to step A, the public key of the target account to be recorded on the user card is derived from the public key of the undisclosed real-name account, indicating that the undisclosed real-name account belongs to the target user, and therefore once it is determined that the public key of the owner account of the authorization card can be derived from the public key of the undisclosed real-name account, it must indicate that the owner account of the authorization card also belongs to the target user targeted by the user card to be generated.

When applying for a user card based on a passport and an authorization card, in step A of performing the affiliation verification, the TEE will use the public key of the disclosable real-name account and the derivation path of the owner account of the authorization card to calculate the second-verification verification root code, and verify whether the second-verification verification root code is the same as the verification root code of the authorization card. The verification root code of the authorization card is the verification root code in the user card used when the user logs in, and the verification root code in the user card is calculated based on the public key of the disclosable real-name account of the user and a derivation path of deriving the target account from the undisclosed real-name account (or, it may be copied from a certain passport to be upgraded, which can be analyzed similarly). If the two verification root codes are the same, it means that the owner account of the authorization card can be derived from the undisclosed real-name account corresponding to the disclosable real-name account carried in the second user card application request.

Figure 5:
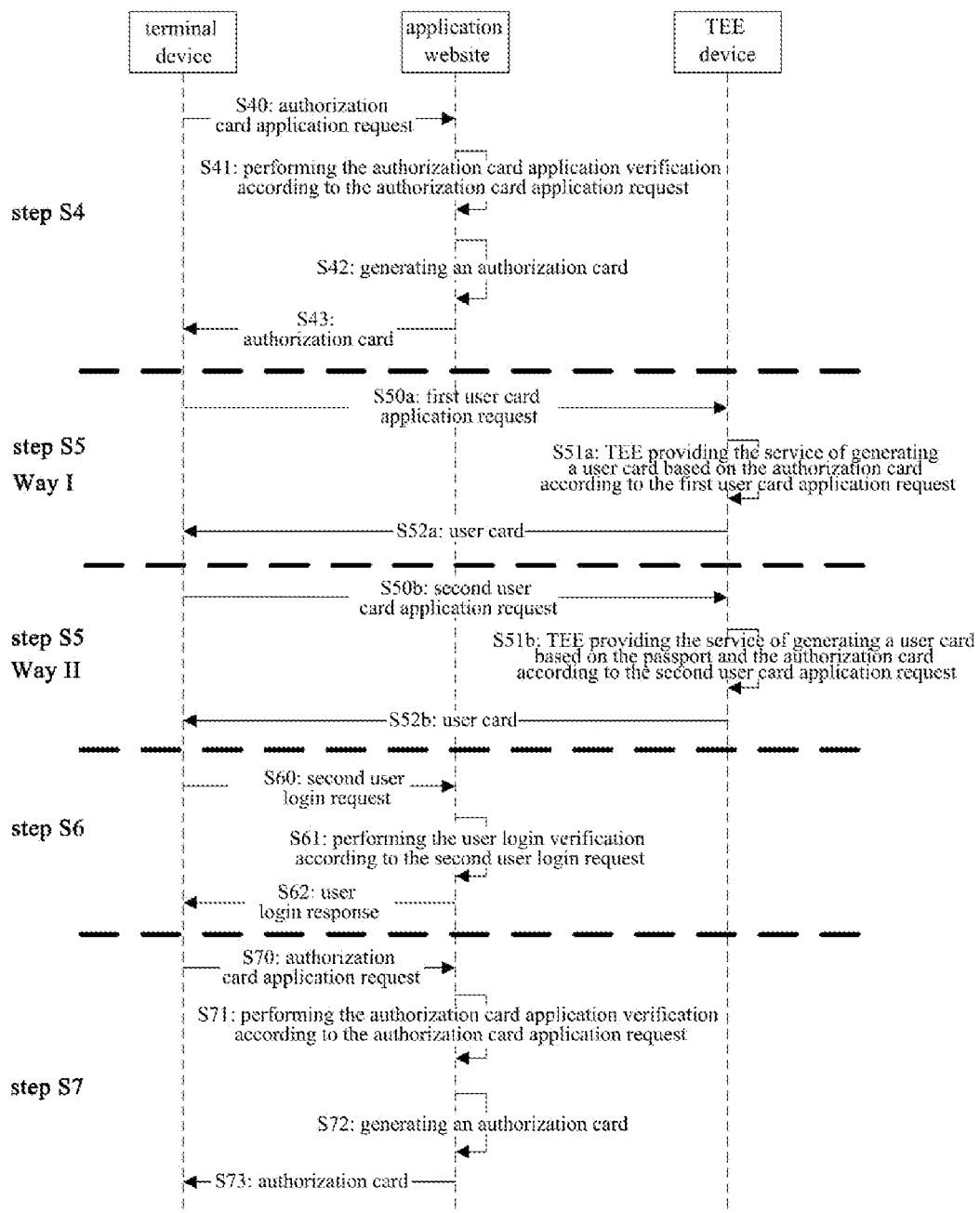
FIG. 5 shows a flowchart of steps S4 to S7 in the method provided by the present disclosure.

The issues related to security isolation and privacy isolation in the solutions of FIGS. 4 and 5 are analyzed below.

First, users are allowed to derive different avatar accounts for different application websites from undisclosed real-name account, and use these avatar accounts to apply for different user cards to log in these application websites, respectively (of course, it is also possible to upgrade the user card based on a passport). If the private key of the account is accidentally exposed when accessing a certain application website, it will not spread to other login points, which is a kind of security isolation.

Secondly, when the user card is used to access various application websites, its validity period can be limited to a short period of time, so that even if the private key of the account is accidentally exposed when accessing a certain application website, since the user card will be expired soon, the caused impact is limited, which is also a kind of security isolation.

In the above method, first, an authorization card is applied for from the application website (Step S4 and Step S7), then it is requested that the TEE generates a user card (Step S5), and finally the user card is used to log in to the application website (Step S6), that is, in general, it is divided into three stages. Such implementation helps to achieve the privacy isolation. In the first stage, the avatar account used to log in to the application website is usually not the target account in the user card, and the application website cannot know when the user will use the authorization card, nor does it necessarily know which target account the authorization card will be bundled with (unless it is a case of sub-authorization), such that it difficult to lock the identity of the user. In the second stage, when the user requests the TEE connected to the blockchain network to generate a user card, the TEE can provide the security service in form of the black-box, so that in the message path, no one can detect the content of the service or the returned results, which ensures that user privacy will not be leaked. Moreover, with the help of the distributed computing characteristics of the blockchain, the user can independently choose the access point at which a service request will be submitted, as well as, which TEE to undertake the request can be dynamically determined by the TEE service access point, such that it further increases security. In the third stage, although the application website can know that the user has logged in through a certain target account, because the user card does not comprise the information of the disclosable real-name account or undisclosed real-name account, and thus the application website cannot know the real owner of the user card. In short, there is no obvious relationship between the three stages, from the first to the third, and others cannot track the online behavior of a specific user, so that the user privacy can be protected.

Finally, it is summarized that the various types of accounts which may be used in the technical solutions of the present disclosure roughly include the following categories:
(1) the first account and the second account residing in the TEE, which are able to be used to represent respectively the security service administrator and the user card issuing commissioner;
(2) the first account and the second account of the management website, which can be used to respectively represent the identity of the passport issuing commissioner and the identity of the domain administrator of the management website;
(3) the account of the application website, which can be used to represent the identity of domain administrator of the application website; and
(4) various user accounts, including: the undisclosed real-name account, the disclosable real-name account, and various avatar accounts derived from these two accounts.

Among these accounts, the item (4) can use the elliptic curve cryptography (ECC) to construct an account (for example, Bitcoin uses ECC secp256k1), and other accounts (i.e., items 1, 2, and 3) can choose any one of RSA or ECC to accomplish. The reason why the ECC is currently recommended for the user account is that the current HD wallet is limited to this technology in order to support the derivation of hierarchical accounts.

For example, if the second account (domain administrator account) of the management website adopts the RSA account, the passport application request, which is initiated by the user when applying for a passport to the management website, can be encrypted using the public key of the RSA account of the management website, and the management website after receiving the ciphertext, uses the private key of the RSA account to decrypt the content of request. The RSA is an industry-standard asymmetric encryption technology, which can ensure the security of point-to-point communication. If other accounts are constructed using the RSA technology, the encrypted communication can also be implemented similarly, which will not be repeated.

As another example, if the second account of the management website is constructed using ECC secp256k1 (secp256k1 is a type of ECC), the passport application request, which is initiated by the user when applying for a passport to the management website, can obtain the key through the ECDH password negotiation technology (the second account will be used during the negotiation, but it is impossible to directly use its public key to encrypt, with the following example to be referred to), and this key is used to symmetrically encrypt the passport application request. After the management website receives the ciphertext, it also obtains the same key through the ECDH technology, and use the key to decrypt the content of the request to achieve the same effect as the above asymmetric encryption. If other accounts are constructed using the ECC technology, the encrypted communication can also be implemented similarly, which will not be repeated.

Based on the second example, the general way that ECDH performs the key negotiation is explained as follows.

The user first generates a 32-byte (of course, other values are also possible) random number array on the terminal device, and then uses the 32-byte data as the private key of the temporary ECC secp256k1 account (referred to as the temp account for short). This private key, together with the public key of the second account of the management website, uses the ECDH algorithm to derive a key, which is used to symmetrically encrypt the passport application request, and then the encrypted ciphertext, together with the public key of the temp account, is transferred to the management website. The program running in the management website, after receiving the ciphertext, also correspondingly uses the private key of the second account held by the management website and the public key of the temp account together to derive the key, by using the ECDH algorithm. The obtained key must be same as the key used for encryption, which derived at the terminal device and therefore this key can be used to correctly perform the symmetric decryption on the transferred ciphertext. It is noted that in this way, one temp account can be regenerated when every transmission of encrypted information is performed between the terminal device and the management website.

To sum up, whether RSA or ECC ECDH technology is used for encrypted data transmission in the above, the encryption of the data is carried out according to the known public key of the account of the other party (for example, the other party of the terminal device is the management website), and the decryption of data can be carried out according to only the private key of the account held by itself.

Generally speaking, it is "public key for encryption" and "private key for decryption". It is nothing but as for the RSA account, the process is asymmetric encryption and decryption, while as for ECC account, it is symmetric encryption and decryption.

In addition, two additional points are explained.

First, although the ECDH symmetric key is a key which is obtained by negotiation in principle, if both parties know the public key of the other party during the point-to-point communication, the process is actually free of negotiation, wherein when the initiator encrypts the message, creating a temporary account and deriving the ECDH symmetric key does not depend on the feedback information of the other party, and the receiver obtains the public key of the temporary account along with the ciphertext when decrypting, and the derivation of the ECDH symmetric key does not need to interact with the other party.

Second, the RSA account mentioned above belongs to the asymmetric-encryption-and-decryption account, which is similar to the State Bureau Secrecy SM2, etc. In the present disclosure, SM2 is also applicable in any situation where RSA is applicable and the accounts of this type can be collectively referred to as "asymmetric accounts". The ECC secp256k1 mentioned above is a type of ECC elliptic curves, which is similar to secp384r1, x25519, etc. These accounts can be collectively referred to as "ECC elliptic curve accounts", that is, the RSA and secp256k1 accounts used in the above example are only examples of these two types of accounts. The above examples should not be intended to limit the scope of protection of the present disclosure.

The present disclosure also provides a passport application device, which is provided on a terminal device, and the passport application device comprises: a first passport account derivation module, for deriving an avatar account by using a disclosable real-name account which is registered by a user on a management website with a real name; a passport application module, used to send a passport application request to the management website, wherein the passport application request comprises the public key of the disclosable real-name account, the chain code of the disclosable real-name account, the derivation path of deriving the avatar account from the disclosable real-name account, and a signature which is made for the passport application request using the private key of the disclosable real-name account; and a passport receiving module, used to receive the passport sent by the management website. The passport comprises the public key of the avatar account, the public key of a first account of the management website, and the signature which is made for the passport by the management website using its own private key of the first account, and the passport is used to prove that the avatar account is derived from a disclosable real-name account which has been registered on the management website with the real name.

The present disclosure further provides a passport application device, which is provided on a management website, and the device comprises: a passport application request receiving module, used to receive a passport application request sent by a terminal device, wherein the passport application request comprises the public key of the disclosable real-name account of the user, the chain code of the disclosable real-name account, the derivation path of deriving the avatar account from the disclosable real-name account, and the signature which is made for the passport application request using the private key of the disclosable real-name account; a passport application verification module, used to perform the application verification by using the passport application request, wherein the verification items comprise at least one of the following items: verifying whether the public key of the disclosable real-name account has been registered with a real name; and using the public key of the disclosable real-name account to verify whether the signature for the passport application request is correct; a second passport account derivation module, used to derive the public key of the avatar account by using the public key of the disclosable real-name account, the chain code of the disclosable real-name account, and the derivation path of deriving the avatar account from the disclosable real-name account, if results of all verification items are "yes"; a passport generation module, used to generate a passport, wherein the passport comprises the public key of the avatar account, the public key of a first account of the management website, and the signature which is made for the passport by the management website using its own private key of the first account, and the passport is used to prove that the avatar account is derived from the disclosable real-name account which is registered with the real name on the management website; and a passport sending module, used to send to the terminal device the passport.

The present disclosure further provides a user registration device, provided in a terminal device, the user registration device comprising: a user registration module, used to send a user registration request to an application website, wherein the user registration request comprises a passport issued by a management website, the passport comprises a public key of an avatar account which a user wants to register, a public key of a first account of the management website, and a signature which is made for the passport by the management website using its own private key of the first account, and the passport is used to prove that the avatar account is derived from a disclosable real-name account which has been registered with a real name on the management website.

The present disclosure further provides a user registration device, provided on an application website, the device comprising: a user registration request receiving module, used for receiving a user registration request sent by a terminal device, wherein the user registration request comprises a passport issued by an management website, the passport comprises a public key of an avatar account which a user wants to register, a public key of a first account of the management website, and a signature which is made for the passport by the management website using its own private key of the first account, and the passport is used to prove that the avatar account is derived from a disclosable real-name account which has been registered with a real name on the management website; a user registration verification module, used to perform a registration verification by using the user registration request, wherein verification items comprise at least one of following: verifying whether a public key of the avatar account has not been bound with a resource identifier; and using a public key of the first account of the management website to verify whether a signature for the passport is correct; a resource identifier binding module, used to allocate one resource identifier to the user, if results of all verification items are "yes", and bind a public key of the avatar account with the resource identifier; and a user registration response module, used to save the passport or preset information items in the passport, and send a response of successful registration to the terminal device.

The present disclosure further provides a user login device, provided on a terminal device, the user login device comprising: a first login module, used to send a first user login request to an application website, wherein the first user login request comprises a passport issued by a management website, and the passport comprises a public key of an avatar account that the user wants to log in, and a public key of the first account of the management website and a signature which is made for the passport by the management website using its own private key of the first account, and the passport is used to prove that the avatar account is derived from a disclosable real-name account which has been registered with the real name on the management website.

The present disclosure further provides a user login device, provided on an application website, the device comprising: a first user login request receiving module, used for receiving a first user login request sent by a terminal device, wherein the first user login request comprises a passport issued by an management website, the passport comprises a public key of an avatar account that a user wants to log in, a public key of a first account of the management website and a signature which is made for the passport by the management website using its own private key of the first account, and the passport is used to prove that the avatar account is derived from one disclosable real-name account which has been registered with a real name on the management website; a first user login request verification module, used to perform a login verification by using the first user login request, wherein verification items comprise at least one of following: verifying whether a public key of the avatar account has been bound with a resource identifier; and using a public key of the first account of the management website to verify whether a signature for the passport is correct; and a first login response module, used to send a response of successful login to the terminal device if results of all verification items are "yes".

The present disclosure further provides an authorization card application device, provided in a terminal device, the authorization card application device comprising: an authorization card application module, used to send an authorization card application request to an application website which the user has logged in, wherein the authorization card application request comprises an identifier of a target account, and the identifier of the target account is a public key of the target account, a derivation path of deriving the target account from the undisclosed real-name account of the user or an empty character string, wherein if the identifier of the target account is a derivation path of deriving the target account from the undisclosed real-name account or an empty character string, it is indicated that a target user who owns the target account is the user itself, and if the identifier of the target account is a public key of the target account, it is indicated that the target user is someone else; and an authorization card receiving module, used to receive an authorization card sent by the application website, wherein the authorization card comprises a public key of an owner account of the authorization card, a public key of the account of the application website, and a signature which is made for the authorization card by the application website using its own private key of the account, the authorization card is used as a certificate of a user card for the user to apply to TEE provided on a TEE device, to be used by the target user.

The present disclosure further provides an authorization card application device, provided on an application website, the device comprising: an authorization card application request receiving module, used to receive an authorization card application request sent through a terminal device by a user who has logged in the application website, wherein the authorization card application request comprises an identifier of the target account, and the identifier of the target account is a public key of the target account, a derivation path of deriving the target account from an undisclosed real-name account of the user or an empty character string, wherein if the identifier of the target account is a derivation path of deriving the target account from an undisclosed real-name account or an empty character string, it is indicated that a target user who owns the target account is the user itself, and if the identifier of the target account is a public key of the target account, it is indicated that the target user is someone else; an identity judging module, used for judging whether the target user is the user itself or someone else according to the identifier of the target account; an authorization card generation module, used to generate an authorization card, wherein the authorization card comprises a public key of an owner account of the authorization card, a public key of the account of the application website, and a signature which is made for the authorization card by the application website using its own private key of the account, the authorization card is used as a certificate of the user card for the user to apply to TEE provided on a TEE device, to be used by the target user, wherein if the target user is the user itself, the owner account of the authorization card is an account which is currently logged in by the user through a passport or a user card, and if the target user is someone else, the owner account of the authorization card is the target account; and an authorization card sending module, used to send the authorization card to the terminal device.

The present disclosure further provides a one-way ciphertext key generating device, provided in TEE, the device comprising: a key generation request receiving module, used in such a way that the TEE receives a key generation request sent by an application website through a TEE device provided with the TEE, wherein the key generation request comprises: a first command word and a plaintext key; a one-way ciphertext key generation module, used in such a way that the TEE determines according to the first command word to provide a service of generating a one-way ciphertext key, wherein content of the service comprises: the TEE using a specific key to encrypt the plaintext key to obtain a one-way ciphertext key, and the specific key is only used in the TEE; and a one-way ciphertext key sending module, used in such a way that the TEE sends the one-way ciphertext key to the application website through the TEE device.

The present disclosure further provides a user card application device, provided in a terminal device, the user card application device comprising: an identifier acquisition module, used for deriving a target account of a target user from an undisclosed real-name account of the user if the target user targeted by a user card is the user itself who obtains an authorization card, wherein a derivation path of deriving the target account from the undisclosed real-name account is determined as an identifier of the target account, and if the target user is someone else, a public key of the target account is determined as the identifier of the target account; a first user card application module, used to send a first user card application request to a TEE device provided with a TEE, wherein the first user card application request comprises a third command word, the authorization card and the identifier of the target account, wherein the third command word indicates that the TEE is requested to provide services of generating a user card based on an authorization card, wherein if the target user is the user itself, the first user card application request further comprises a public key of the undisclosed real-name account, a chain code of the undisclosed real-name account, and a derivation path of an owner account of the authorization card; and a first user card receiving module, used to receive a user card sent by the TEE device, wherein the user card comprises a public key of the target account and a signature which is made for the user card by the TEE using its own private key of the second account, and the user card is used to prove that an application website that issues the authorization card has authorized the target user to use services provided by the application website by logging in with the target account.

The present disclosure further provides a user card application device, provided in a TEE, the device comprising: a first user card application request receiving module, used in such a way that the TEE receives, through a TEE device provided with the TEE, a first user card application request which is sent through a terminal device by a user who has obtained an authorization card, wherein the first user card application request comprises a third command word, the authorization card, and an identifier of the target account, wherein if a target user who owns the target account is the user itself, the first user card application request further comprises a public key of an undisclosed real-name account of the user, a chain code of the undisclosed real-name account, and a derivation path of an owner account of the authorization card; a first user card generation module, used in such a way that the TEE determines, according to the third command word, to provide a service of generating a user card based on an authorization card, wherein content of the service comprises: the TEE using the first user card application request to perform an application verification, wherein verification items comprise at least one of following: the TEE using the public key of the account of the application website in the authorization card to verify whether a signature for the authorization card is correct; the TEE determining according to the identifier of the target account whether the target user is the user itself or someone else, wherein if the target user is the user itself, the TEE uses the public key of the undisclosed real-name account, the chain code of the undisclosed real-name account, the identifier of the target account, the authorization card and the derivation path of the owner account of the authorization card to verify whether the owner account belongs to the target user, wherein if results of all verification items are "yes", then the TEE generates a user card, wherein the user card comprises the public key of the target account and a signature which is made for the user card by the TEE using its own private key of the second account, and the user card is used to prove that the application website has authorized the target user to use services provided by the application website by logging in with the target account, wherein if the target user is the user itself, the public key of the target account is obtained when verifying whether the owner account belongs to the target user, and if the target user is someone else, the public key of the target account is the public key of the owner account of the authorization card; and a first user card sending module, used in such a way that the TEE sends the user card to the terminal device through the TEE device.

The present disclosure further provides a user card application device, provided in a terminal device, the user card application device comprising: a second user card application module, used to send a second user card application request to a TEE device provided with TEE, wherein the second user card application request comprises a fourth command word, an authorization card that the user applies for, an identifier of the target account, a public key of a disclosable real-name account of the user, a passport that the user applies for, and a derivation path of an owner account of the authorization card, wherein the fourth command word indicates that the TEE is requested to provide a service of generating a user card based on the passport and the authorization card, and the identifier of the target account is a derivation path of deriving an avatar account in the passport from the disclosable real-name account; a second user card receiving module, used to receive a user card sent by the TEE device, wherein the user card comprises a public key of the target account and a signature which is made for the user card by the TEE using its own private key of the second account, and the user card is used to prove that an application website that issues the authorization card has authorized a target user who has the target account to use services provided by the application website by logging in with the target account.

The present disclosure further provides a user card application device, provided in TEE, the device comprising: a second user card application request receiving module, used in such a way that the TEE receives, through a TEE device provided with the TEE, a second user card application request sent by a user through a terminal device, wherein the second user card application request comprises a fourth command word, an authorization card that a user applies for, an identifier of a target account, a public key of a disclosable real-name account of the user, a passport that the user applies for, and a derivation path of an owner account of the authorization card; a second user card generation module, used in such a way that the TEE determines, according to the fourth command word, to provide a service of generating a user card based on a passport and an authorization card, wherein content of the service comprises: the TEE using the second user card application request to perform an application verification, and verification items comprise at least one of following: the TEE using the public key of the account of the application website in the authorization card to verify whether a signature for the authorization card is correct; the TEE using a public key of the first account of the management website in the passport to verify whether a signature for the passport is correct; and the TEE using a public key of the disclosable real-name account, the passport, the identifier of the target account, the authorization card, and a derivation path of an owner account of the authorization card to verify whether an avatar account in the passport and the owner account both belong to a target user who owns the target account, wherein if results of all verification items are "yes", the TEE generates a user card, and the user card comprises a public key of the target account and a signature which is made for the user card by the TEE using its own private key of the second account, and the user card is used to prove that the application website has authorized the target user to use services provided by the application website through logging in with the target account, wherein the public key of the target account is a public key of the avatar account in the passport; and a second user card sending module, used in such a way that the TEE sends the user card to the terminal device through the TEE device.

The present disclosure further provides a user login device, provided on a terminal device, the user login device comprising: a second login module, used to send a second user login request to an application website, wherein the second user login request comprises a user card generated in TEE, and the user card comprises a public key of a target account that the target user wants to log in and a signature which is made for the user card by the TEE using its own private key of the second account, and the user card is used to prove that the application website has authorized the target user to use services provided by the application website by logging in with the target account.

The present disclosure further provides a user login device, provided on an application website, the device comprising: a second user login request receiving module, used to receive a second user login request sent by a terminal device, wherein the second user login request comprises a user card generated in TEE, and the user card comprises a public key of a target account that the target user wants to log in and a signature which is made for the user card by the TEE using its own private key of the second account, and the user card is used to prove that the application website has authorized the target user to use services provided by the application website by logging in with the target account; a second user login request verification module, configured to use the second user login request to perform a login verification, wherein verification items comprise at least one of following: verifying whether a signature for the user card is correct by using a public key of the second account of the TEE; and a second login response module, used to send a response of successful login to the terminal device if results of all verification items are "yes".

The implementation principles and the produced technical effects of the above devices provided in the present disclosure have been introduced in the foregoing method embodiments. For brief description, the corresponding content in the method embodiments may be referred to, for the parts not mentioned in the device embodiments.

Figure 6:
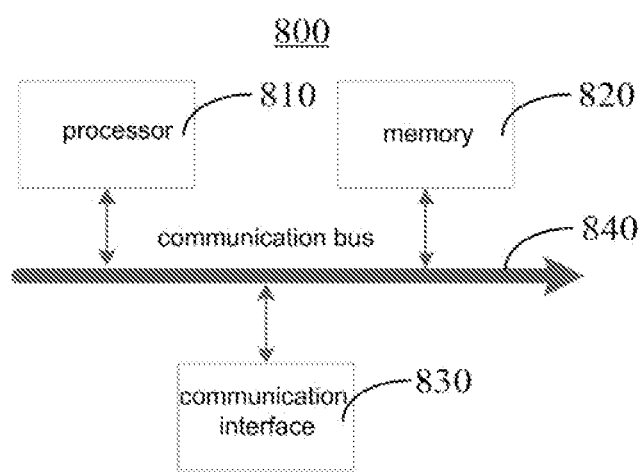
FIG. 6 shows a schematic diagram of an electronic device provided by the present disclosure.

FIG. 6 shows a possible structure of the electronic device 800 provided by the present disclosure. Referring to FIG. 6, an electronic device 800 comprises a processor 810, a memory 820, and a communication interface 830, and these components are interconnected and communicate with each other, through a communication bus 840 and/or other forms of connection mechanisms (not shown).

Herein, one or more memories 820 may be provided (only one is shown in the drawing), which may be, but is not limited to, a random access memory (RAM for short), a read only memory (ROM for short), programmable read-only memory (PROM for short), erasable programmable read-only memory (EPROM for short), electric erasable programmable read-only memory (EEPROM for short) and so on. The processor 810 and possibly other components may access the memory 820, so as to read and/or write the data therein.

One or more processors 810 may be provided (only one is shown in the drawing), which may be an integrated circuit chip, and has the signal processing capability. The above-mentioned processor 810 may be a general-purpose processor, comprising a Central Processing Unit (CPU for short), a Micro Controller Unit (MCU for short), a Network Processor (NP for short), or other conventional processor. It can also be a dedicated processor, comprising Digital Signal Processor (DSP for short), Application Specific Integrated Circuits (ASIC for short), Field Programmable Gate Array (FPGA for short) or other programmable logic devices, discrete gate or transistor logic devices, discrete hardware components.

One or more communication interfaces 830 may be provided (only one is shown in the drawing), which can be used to communicate directly or indirectly with other devices for performing the data interaction. The communication interface 830 can be an Ethernet interface; a high-speed network interface (such as, an Infiniband network); a mobile communication network interface, such as a 3G, 4G, and 5G network interface; various bus interfaces, such as USB, CAN, I2C and SPI bus interface; or other types of interfaces with data transmission and reception functions.

One or more computer program instructions may be stored in the memory 820, and the processor 810 may read and execute these computer program instructions, so as to implement the foregoing methods and other desired functions provided by the present disclosure.

It can be understood that the structure shown in FIG. 6 is only illustrative, and the electronic device 800 may further comprise more or less components than those shown in FIG. 6, or is in different configurations than that shown in FIG. 6. Individual components shown in FIG. 6 may be implemented in hardware, software, or a combination thereof. In the present disclosure, the electronic device 800 may be a terminal device, a website server, a TEE, or the like.

The present disclosure further provide a computer-readable storage medium, wherein computer program instructions are stored on the computer-readable storage medium, wherein when the computer program instructions are read and run by a processor of a computer, the above individual methods provided by the present disclosure are executed. For example, a computer-readable storage medium may be implemented as the memory 820 in the electronic device 800 in FIG. 6.

In the embodiments provided by the present disclosure, it should be understood that the disclosed device and method may be implemented in other manners. The device embodiments described above are only illustrative. For example, the division of the units is only a logical function division. In actual implementation, there may be other division methods. For example, multiple units or components may be combined or integrated into another system, or some features can be ignored, or not executed. On the other hand, the shown or discussed mutual coupling or direct coupling or communication connection may be the indirect coupling or communication connection between devices or units through some communication interfaces, which may be in electrical, mechanical or other forms.

In addition, units described as separate components may or may not be physically separated, and component shown as a unit may or may not be physical unit, that is, may be located in one place, or may be distributed in multiple network units. Some or all of the units may be selected according to actual needs to achieve the purpose of the solution in this embodiment.

Furthermore, individual functional modules in each embodiment of the present disclosure may be integrated together to form an independent part, or each module may exist alone, or two or more than two modules may be integrated to form an independent part.

The above descriptions are merely examples of the present disclosure, and are not intended to limit the protection scope of the present disclosure. For those skilled in the art, various modifications and changes may be made to the present disclosure. Any modifications, equivalent replacements and improvements made within the spirit and principles of the present disclosure shall be included within the protection scope of the present disclosure.

INDUSTRIAL APPLICABILITY

The present disclosure provides a user registration method and a user login method, and a device corresponding thereto. In one solution of the present disclosure, a complete set of mechanisms for applying and using a passport is established. In another solution of the present disclosure, a complete set of mechanisms for applying and using a user card is established.

The identity information of the autonomous identity of the user is recorded on the passport or user card, and the user can use the passport or user card to access the application website, which is different from the traditional access method through the account and password, which is more convenient in operation and does not need to memorize the account and password. In addition, the user can derive plural avatar accounts from the real-name account, and apply for one passport or user card for each avatar account, thus realizing the representation of the relationship between the real name and the avatar of the user in the digital world. In addition, regardless of whether a passport or a user card is used, the solutions of the present disclosure all realize the security isolation and privacy isolation of the identity information of the user.

Finally, in the present disclosure, with the help of the mechanism of the authorization card and user card, the user can either apply for the authority for accessing the application website for itself, and can also grant, to the target user, all or part of the authority of itself for accessing the application website, so that the target user can execute the operations within the specified scope, that is, the authorization and sub-authorization of accessing the website are realized at the same time.

The invention claimed is:

1. A user login method for a user, the method comprising steps of:
 a terminal device sending a second user login request to an application website, wherein the second user login request comprises a user card generated in a Trusted Execution Environment (TEE), and the user card comprises a public key of a target account which a target user wants to log in and a signature which is made for the user card by the Trusted Execution Environment (TEE) using its own private key of a second account, the user card is used to prove that the application website has authorized the target user to use services provided by the application website by logging in with the target account;
 the application website using the second user login request to perform login verification, wherein verification items comprise at least one of following: verifying whether the signature for the user card is correct by using a public key of the second account of the Trusted Execution Environment (TEE); and if the second user login request further comprises a signature which is made for the second user login request by using a private key of the target account, verifying whether the signature for the second user login request is correct by using the public key of the target account;
 wherein if results of verifying the at least one of the verification items is successful, a response of successful login is sent to the terminal device, wherein before the terminal device sends the second user login request to the application website, the method further comprises steps of:
 the terminal device sending an authorization card application request to the application website which the user has logged in, wherein the authorization card application request comprises an identifier of the target account, and the identifier of the target account is the public key of the target account, a derivation path of deriving the target account from an undisclosed real-name account of the user or an empty character string, wherein if the identifier of the target account is the derivation path of deriving the target account from the undisclosed real-name account of the user or the empty character string, it means that the target user having the target account is the user itself, and if the identifier of the target account is the public key of the target account, it means that the target user is someone else; and
 the application website generating an authorization card, and the application website sending the authorization card to the terminal device,
 wherein before the terminal device sends the second user login request to the application website, and after the application website sends the authorization card to the terminal device, the method further comprises steps of:
 the terminal device deriving, if the target user targeted by the user card is the user itself who obtains the authorization card, the target account of the target user from the undisclosed real-name account of the user, and determining the derivation path of deriving the target account from the undisclosed real-name account of the user as the identifier of the target account, and the terminal device determining, if the target user is someone else, the public key of the target account as the identifier of the target account; and
 the terminal device sending a first user card application request to a Trusted Execution Environment (TEE) device provided with the Trusted Execution Environment (TEE), wherein the first user card application request comprises the authorization card and the identifier of the target account.

2. The user login method according to claim 1, wherein before the terminal device sends the second user login request to the application website, the method further comprises steps of:
 the application website determining, according to the identifier of the target account, whether the target user is the user itself or someone else, wherein
 the authorization card generated by the application website comprises a public key of an owner account of the authorization card, a public key of the account of the application website, and a signature which is made for the authorization card by the application website using its own private key, used as a certificate of the user card which is applied by the user from the Trusted Execution Environment (TEE) provided on the Trusted Execution Environment (TEE)-device, so as to be used by the target user, wherein if the target user is the user itself, the owner account of the authorization card is the account into which the user currently logs in using a passport or the user card, and if the target user is someone else, the owner account of the authorization card is the target account.

3. The user login method according to claim 2, wherein the authorization card application request further comprises one or more of following information items:
 a time-period category of the authorization card, a target time of the authorization card, a validity period of the authorization card, a group of the target user and a task of the target user,
 wherein the group of the target user is used to mark a grade that is granted to the target user on the application website, and mark the target user as the user itself or others; or
 the task of the target user is used to describe matters which the target user is authorized to perform on the application website.

4. The user login method according to claim 2, wherein the authorization card further comprises one or more of following information items:
 a verification root code of the authorization card, an identifier of the application website, a group of the target user, a time-period category of the authorization card, a target time of the authorization card, a validity period of the authorization card, a resource identifier which is allocated to the user by the application website, a task of the target user, and a seed cipher of the authorization card,
  wherein if the target user is the user itself, the verification root code of the authorization card is a verification root code in the passport or a user card which is currently used by the user when logging in; and if the target user is someone else, the verification root code of the authorization card is calculated according to a public key of a disclosable real-name account of the user and the public key of the target account;
a time-period category of the authorization card, a target time of the authorization card, a validity period of the authorization card, a group of the target user, and a task of the target user are obtained from the authorization card application request; or
the seed cipher of the authorization card comprises: a one-way ciphertext key, and a ciphertext of a security code which is obtained by encrypting a plaintext of the security code provided by the application website by using a plaintext key corresponding to the one-way ciphertext key, wherein holding of the security code indicates that it is authorized to use services provided by the application website, the one-way ciphertext key is generated in the Trusted Execution Environment (TEE), and the Trusted Execution Environment (TEE) only provides to outside a service of encrypting the plaintext key to be the one-way ciphertext key, but does not provide to the outside a service of decrypting the one-way ciphertext key back to the plaintext key.

5. The user login method according to claim 2, wherein before the terminal device sends the second user login request to the application website, and after the application website sends the authorization card to the terminal device, the method further comprises steps of:
  the terminal device sending the first user card application request to the Trusted Execution Environment (TEE) device, wherein the first user card application request comprises, in addition to the authorization card and the identifier of the target account, a third command word, wherein the third command word represents that the Trusted Execution Environment (TEE) is requested to provide a service of generating the user card based on the authorization card, wherein if the target user is the user itself, the first user card application request further comprises a public key of the undisclosed real-name account, a chain code of the undisclosed real-name account and a derivation path of the owner account of the authorization card;
  the Trusted Execution Environment (TEE) receiving, through the Trusted Execution Environment (TEE)-device, the first user card application request;
  the Trusted Execution Environment (TEE) determining, according to the third command word, to provide a service of generating the user card based on the authorization card, wherein a content of the service comprises: the Trusted Execution Environment (TEE) using the first user card application request to perform an application verification, and verification items comprise at least one of following: (a) the Trusted Execution Environment (TEE) using the public key of the account of the application website in the authorization card to verify whether the signature for the authorization card is correct; and (b) the Trusted Execution Environment (TEE) judging whether the target user is the user itself or someone else according to the identifier of the target account, wherein if the target user is the user itself, the Trusted Execution Environment (TEE) uses the public key of the undisclosed real-name account, the chain code of the undisclosed real-name account, the identifier of the target account, the authorization card, and a derivation path of the owner account of the authorization card to verify whether the owner account belongs to the target user, wherein if result of verifying either of the verification items (a) or (b) is successful, the Trusted Execution Environment (TEE) generates the user card, and wherein the user card comprises the public key of the target account and a signature which is made for the user card by the Trusted Execution Environment (TEE) using its own private key of the second account, and the user card is used to prove that the application website has authorized the target user to use services provided by the application website through logging in with the target account, wherein if the target user is the user itself, the public key of the target account is obtained when verifying whether the owner account belongs to the target user, and if the target user is someone else, the public key of the target account is the public key of the owner account of the authorization card; and
  the Trusted Execution Environment (TEE) sending the user card to the terminal device through the Trusted Execution Environment (TEE) device.

6. The user login method according to claim 5, wherein a disclosable real-name account of the user is derived from the undisclosed real-name account through a preset relative path; and
  if the user logs in by the passport when applying for the authorization card, the derivation path of the owner account of the authorization card is one derivation path which is obtained by splicing a derivation path of deriving the owner account of the authorization card from the disclosable real-name account and the preset relative path, with the undisclosed real-name account as a derivation starting point; and if the user logs in by the user card when applying for the authorization card, the derivation path of the owner account of the authorization card is a derivation path of deriving the owner account of the authorization card from the undisclosed real-name account.

7. The user login method according to claim 5, wherein the first user card application request further comprises one or more of following information items:
  a target time of the user card and a second result encryption key,
  wherein the target time of the user card is a target time of the authorization card; or the second result encryption key is used for the Trusted Execution Environment (TEE) to encrypt a generated user card in the service of generating the user card based on the authorization card.

8. The user login method according to claim 5, wherein if the authorization card does not comprise a verification root code of the authorization card, the step of the Trusted Execution Environment (TEE) using the public key of the undisclosed real-name account, the chain code of the undisclosed real-name account, the identifier of the target account, the authorization card, and the derivation path of the owner account of the authorization card to verify whether the owner account belongs to the target user comprises:
  the Trusted Execution Environment (TEE) deriving the public key of the target account by using the public key of the undisclosed real-name account, the chain code of the undisclosed real-name account, and the identifier of the target account; and the Trusted Execution Environment (TEE) using the public key of the undisclosed real-name account, the chain code of the undisclosed real-name account, and the derivation path of the owner account of the authorization card to derive a public key of a verification account, and judging whether the public key of the verification account is same as the public key of the owner account of the authorization card, wherein if same, it is determined that the owner account belongs to the target user, and otherwise it is determined that the owner account does not belong to the target user, wherein the derivation path of the owner account of the authorization card refers to a derivation path of deriving the owner account of the authorization card from the undisclosed real-name account; and wherein if the authorization card comprises the verification root code of the authorization card, the step of the Trusted Execution Environment (TEE) using the public key of the undisclosed real-name account, the chain code of the undisclosed real-name account, the identifier of the target account, the authorization card, and a derivation path of the owner account of the authorization card to verify whether the owner account belongs to the target user comprises:

the Trusted Execution Environment (TEE) deriving the public key of the target account by using the public key of the undisclosed real-name account, the chain code of the undisclosed real-name account, and the identifier of the target account;

the Trusted Execution Environment (TEE) using the public key of the undisclosed real-name account, the chain code of the undisclosed real-name account, and a relative path pre-provided in the Trusted Execution Environment (TEE) to derive a public key of a disclosable real-name account of the user, wherein the relative path refers to a derivation path of deriving the disclosable real-name account of the user from the undisclosed real-name account;

the Trusted Execution Environment (TEE) calculating a first-verification verification root code according to the public key of the disclosable real-name account of the user and the derivation path of the owner account of the authorization card; and the Trusted Execution Environment (TEE) judging whether the first-verification verification root code is same as the verification root code of the authorization card, where if same, it is determined that the owner account belongs to the target user, and otherwise it is determined that the owner account does not belong to the target user.

9. The user login method according to claim 5, wherein the user card further comprises one or more of following information items:

a verification root code of the user card, an identifier of the application website, a group of the target user, the public key of the account of the application website, a time-period category of the user card, a target time of the user card, a validity period of the user card, a resource identifier which is allocated to the user by the application website, a task of the target user, a time-period derivation code of the user card, and a time-period unique code of the user card, wherein the verification root code of the user card is calculated according to a public key of a disclosable real-name account of the user and the identifier of the target account, and the public key of the disclosable real-name account of the user is generated by derivation by using the public key of the undisclosed real-name account, the chain code of the undisclosed real-name account, and a relative path pre-provided in the Trusted Execution Environment (TEE), and the relative path refers to a derivation path of deriving the disclosable real-name account from the undisclosed real-name account;

the identifier of the application website, the group of the target user, the public key of the account of the application website, the time-period category of the user card, the target time of the user card, the validity period of the user card, the resource identifier which is allocated to the user by the application website and the task of the target user are obtained by copying corresponding information items in the authorization card;

the time-period derivation code of the user card is calculated according to the public key of the disclosable real-name account of the user, a specified character string, a time period in which the target time of the user card is located, an identifier of the application website, and a group of the target user, and a time period in which the target time of the user card is located is calculated according to the target time of the user card and the time-period category of the user card; or the time-period unique code of the user card is calculated according to a security code provided by the application website, the public key of the disclosable real-name account of the user, and the specified character string, wherein the security code is obtained by decrypting a seed cipher of the authorization card, wherein if the user card comprises the validity period of the user card and the target time of the user card, the verification items further comprise:

obtaining a current time of the application website, and verifying whether the current time of the application website is within a time period specified by the validity period of the user card and the target time of the user card;

if the user card comprises the time-period unique code of the user card, the verification items further comprise:

verifying whether the time-period unique code of the user card is different from a time-period unique code in a user card used by any logged-in user; and the method further comprises: the application website sending, if a result of verifying a verification item for the time-period unique code of the user card is unsuccessful, a login failure to the terminal device and when results of verifying all other verification items are successful, a response of successful login sent to the terminal device, and making a logged-in account; and if the user card further comprises, in addition to the time-period unique code of the user card, the time-period derivation code of the user card, the time-period category of the user card, the identifier of the application website, and the group of the target user, the verification items further comprise:

calculating a verification time-period code according to a security code of the application website, the time-period derivation code of the user card, a time period in which a current time of the application website is located, the identifier of the application website, and the group of the target user, and verifying whether the verification time-period code is same as the time-period unique code of the user card, wherein the time period in which the current time of the application website is located is calculated according to the current time of the application website and the time-period category of the user card.

10. The user login method according to claim 9, wherein the step of calculating the verification time-period code according to the security code provided by the application website, the time-period derivation code of the user card, a time period in which the current time of the application website is located, the identifier of the application website and the group of the target user comprises:

calculating the verification time-period code LoginSession' according to a following formula:

LoginSession'=hash(Secret+(hash(TimeSegment '+Domain+Group)^TimeSession))

wherein Secret is the security code of the application website, TimeSegment' is the time period in which the current time of the application website is located, TimeSegment' is calculated according to the current time of the application website and the time-period category of the user card, Domain is the identifier of the application website, Group is the group of the target user, TimeSession is the time-period derivation code of the user card, hash represents Hash operation, + represents character string splicing, and ^ represents XOR operation.

11. The user login method according to claim 9, wherein the specified character string is calculated according to a following formula:

nonce_string=TimeSegment+Domain+Group;

the time-period derivation code of the user card TimeSession is calculated according to a following formula:

TimeSession=hash(OpenPublicKey+nonce_string)^hash(TimeSegment+Domain+Group);
and the time-period unique code of the user card LoginSession is calculated according to a following formula:

LoginSession=hash(Secret+hash(OpenPublicKey+nonce_string)), where TimeSegment is the time period in which the target time of the user card is located, TimeSegment is calculated according to the target time of the user card and the time-period category of the user card, Domain is the identifier of the application website, Group is the group of the target user, OpenPublicKey is the public key of the disclosable real-name account of the user, hash means Hash operation, + means character string splicing, and ^ means XOR operation.

12. The user login method according to claim 2, wherein before the terminal device sends the second user login request to the application website, and after the application website sends the authorization card to the terminal device, the method further comprises steps of:

the terminal device sending a second user card application request to the Trusted Execution Environment (TEE) device, wherein the second user card application request comprises a fourth command word, the authorization card which the user applies for, the identifier of the target account, and a public key of a disclosable real-name account of the user, a passport which the user applies for, and a derivation path of the owner account of the authorization card, wherein the fourth command word indicates that the Trusted Execution Environment (TEE) is requested to provide a service of generating the user card based on the passport and the authorization card, and the identifier of the target account is a derivation path of deriving an avatar account in the passport from the disclosable real-name account of the user;

the Trusted Execution Environment (TEE) receiving through the Trusted Execution Environment (TEE) device the second user card application request;

the Trusted Execution Environment (TEE) determining according to the fourth command word to provide a service of generating the user card based on the passport and the authorization card, wherein a content of the service comprises: the Trusted Execution Environment (TEE) using the second user card application request to perform an application verification, and verification items comprise at least one of following: (c) the Trusted Execution Environment (TEE) using the public key of the account of the application website in the authorization card to verify whether a signature for the authorization card is correct; (d) the Trusted Execution Environment (TEE) using a public key of a first account of a management website in the passport to verify whether a signature for the passport is correct; (e) the Trusted Execution Environment (TEE) using the public key of the disclosable real-name account of the user, the passport, the identifier of the target account, the authorization card, and the derivation path of the owner account of the authorization card to verify whether each of an avatar account in the passport and the owner account belongs to the target user who owns the target account, wherein if results of verifying the at least one of the verification items (c), (d) or (e) is successful, the Trusted Execution Environment (TEE) generates the user card, and wherein the user card comprises the public key of the target account and a signature which is made for the user card by the Trusted Execution Environment (TEE) using its own private key of the second account, and the user card is used to prove that the application website has authorized the target user to use services provided by the application website by logging in with the target account, wherein the public key of the target account is a public key of the avatar account in the passport; and the Trusted Execution Environment (TEE) sending the user card to the terminal device through the Trusted Execution Environment (TEE) device.

13. The user login method according to claim 12, wherein the passport comprises a verification root code of the passport, the authorization card comprises a verification root code of the authorization card, and the step of the Trusted Execution Environment (TEE) using the public key of the disclosable real-name account of the user, the passport, the identifier of the target account, the authorization card, and the derivation path of the owner account of the authorization card to verify whether each of an avatar account in the passport and the owner account belongs to the target user comprises:

the Trusted Execution Environment (TEE) calculating a second-verification verification root code by using the public key of the disclosable real-name account of the user and the derivation path of the owner account of the authorization card, and (f) verifying whether the second-verification verification root code and the verification root code of the authorization card are the same; and the Trusted Execution Environment (TEE) using the public key of the disclosable real-name account of the user and the identifier of the target account to calculate a third-verification verification root code, and (g) verifying whether the third-verification verification root code is same as the verification root code of the passport, wherein if verification results of the above two items (f) and (g) are both successful, the Trusted Execution Environment (TEE) determines that both the avatar account in the passport and the owner account of the authorization card belong to the target user, and otherwise it is determined that the avatar account in the passport and the owner account of the authorization card do not all belong to the target user.

14. The user login method according to claim 12, wherein the user card further comprises one or more of following information items:

a verification root code of the user card, an identifier of the application website, a group of the target user, the public key of the account of the application website, a time-period category of the user card, a target time of the user card, a validity period of the user card, a resource identifier allocated to the user by the application website, a task of the target user, a time-period derivation code of the user card, and a time-period unique code of the user card, wherein the verification root code of the user card is the verification root code of the passport;

the identifier of the application website, the group of the target user, the public key of the account of the application website, the time-period category of the user card, the target time of the user card, the validity period of the user card, the resource identifier allocated to the user by the application website and the task of the target user are obtained by copying corresponding information items in the authorization card;

the time-period derivation code of the user card is calculated based on the public key of the disclosable real-name account of the user, a specified character string, the time-period category of the authorization card, the identifier of the application website in the authorization card, and the group of the target user in the authorization card; or the time-period unique code of the user card is calculated based on a security code provided by the application website, the public key of the disclosable real-name account of the user, and the specified character string, wherein the security code is obtained from decrypting a seed cipher of the authorization card.

* * * * *